US012473598B2

(12) United States Patent
Kalluri

(10) Patent No.: US 12,473,598 B2
(45) Date of Patent: Nov. 18, 2025

(54) IDENTIFICATION OF EPIGENETIC ALTERATIONS IN DNA ISOLATED FROM EXOSOMES

(71) Applicant: BOARD OF REGENTS, THE UNIVERSITY OF TEXAS SYSTEM, Austin, TX (US)

(72) Inventor: Raghu Kalluri, Houston, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 299 days.

(21) Appl. No.: 17/041,993

(22) PCT Filed: Mar. 28, 2019

(86) PCT No.: PCT/US2019/024584
§ 371 (c)(1),
(2) Date: Sep. 25, 2020

(87) PCT Pub. No.: WO2019/191429
PCT Pub. Date: Oct. 3, 2019

(65) Prior Publication Data
US 2021/0139995 A1 May 13, 2021

Related U.S. Application Data

(60) Provisional application No. 62/649,042, filed on Mar. 28, 2018.

(51) Int. Cl.
*C12Q 1/6886* (2018.01)

(52) U.S. Cl.
CPC ..... *C12Q 1/6886* (2013.01); *C12Q 2600/154* (2013.01)

(58) Field of Classification Search
CPC ............ C12Q 1/6886; C12Q 2600/154; C12Q 1/6883
See application file for complete search history.

(56) References Cited

U.S. PATENT DOCUMENTS

| | | |
|---|---|---|
| 3,687,808 A | 8/1972 | Merigan et al. |
| 4,162,282 A | 7/1979 | Fulwyler et al. |
| 4,310,505 A | 1/1982 | Baldeschwieler et al. |
| 4,533,254 A | 8/1985 | Cook et al. |
| 4,728,575 A | 3/1988 | Gamble et al. |
| 4,728,578 A | 3/1988 | Higgins et al. |
| 4,737,323 A | 4/1988 | Martin et al. |
| 4,845,205 A | 7/1989 | Huyng et al. |
| 4,870,287 A | 9/1989 | Cole et al. |
| 4,921,706 A | 5/1990 | Roberts et al. |
| 4,981,957 A | 1/1991 | Lebleu et al. |
| 5,030,453 A | 7/1991 | Lenk et al. |
| 5,118,800 A | 6/1992 | Smith et al. |
| 5,130,302 A | 7/1992 | Spielvogel et al. |
| 5,134,066 A | 7/1992 | Rogers et al. |
| 5,175,273 A | 12/1992 | Bischofberger |
| 5,319,080 A | 6/1994 | Leumann |
| 5,359,044 A | 10/1994 | Cook et al. |
| 5,367,066 A | 11/1994 | Urdea et al. |
| 5,393,878 A | 2/1995 | Leumann |
| 5,432,272 A | 7/1995 | Benner |
| 5,446,137 A | 8/1995 | Maag et al. |
| 5,457,187 A | 10/1995 | Gmeiner et al. |
| 5,459,255 A | 10/1995 | Cook et al. |
| 5,466,786 A | 11/1995 | Buhr et al. |
| 5,484,908 A | 1/1996 | Froehler et al. |
| 5,502,177 A | 3/1996 | Matteucci et al. |
| 5,514,785 A | 5/1996 | Van Ness et al. |
| 5,519,134 A | 5/1996 | Acevedo et al. |
| 5,525,711 A | 6/1996 | Hawkins et al. |
| 5,552,540 A | 9/1996 | Haralambidis |
| 5,567,811 A | 10/1996 | Misiura et al. |
| 5,576,427 A | 11/1996 | Cook et al. |
| 5,587,469 A | 12/1996 | Cook et al. |
| 5,591,722 A | 1/1997 | Montgomery et al. |
| 5,594,121 A | 1/1997 | Froehler et al. |
| 5,595,756 A | 1/1997 | Bally |
| 5,596,091 A | 1/1997 | Switzer |
| 5,597,909 A | 1/1997 | Urdea et al. |
| 5,610,300 A | 3/1997 | Altmann et al. |
| 5,614,617 A | 3/1997 | Cook et al. |
| 5,627,053 A | 5/1997 | Usman et al. |

(Continued)

FOREIGN PATENT DOCUMENTS

| | | |
|---|---|---|
| CA | 3068446 | 1/2019 |
| CN | 1178470 A | 4/1998 |

(Continued)

OTHER PUBLICATIONS

Kisiel (Clinical Cancer Research, 2015 21(19): 4473-81).*
Carmona et al. npj Genomic Medicine, Feb. 2017:13: pp. 1-10.*
Alvarez-Erviti et al., "Delivery of siRNA to the mouse brain by systemic injection of targeted exosomes." *Nature Biotechnology* 2011, 29:341-345.
Baietti et al., "Syndecan-syntenin-ALIX regulated the biogenesis of exosomes." *Nat. Cell Biol.* 2012, 14:677-685.
Boyle, et al., "Gel-free multiplexed reduced representation bisulfite sequencing for large-scale DNA methylation profiling" *Genome Biology* 2012, 13:R92, 10 pages.
Christodoulides et al., "Immunization with recombinant class 1 outer-membrane protein from Neisseria meningitidis: influence of liposomes and adjuvants on antibody avidity, recognition of native protein and the induction of a bactericidal immune response against meningococci." *Microbiology* 1998, 144:3027-3037.
Clayton et al., "Antigen-presenting cell exosomes are protected from complement-mediated lysis by expression of CD55 and CD59." *European Journal of Immunology* 2003, 33:522-531.

(Continued)

*Primary Examiner* — Sarae L Bausch
(74) *Attorney, Agent, or Firm* — Norton Rose Fulbright US LLP

(57) ABSTRACT

The present invention provides methods of diagnosing and prognosing disease by analyzing the methylation status of exosomal DNA. In particular, exosomal DNA, in particular exosomal DNA isolated from exosomes that originated from a diseased cell, is analyzed for either a global methylation fingerprint or for a particular methylation status at one or more genomic loci, thereby providing information regarding the disease-state of the originated cell.

9 Claims, 24 Drawing Sheets

(56) References Cited

U.S. PATENT DOCUMENTS

| | | |
|---|---|---|
| 5,645,985 A | 7/1997 | Froehler et al. |
| 5,646,265 A | 7/1997 | McGee |
| 5,658,873 A | 8/1997 | Bertsh-Frank et al. |
| 5,670,633 A | 9/1997 | Cook et al. |
| 5,681,941 A | 10/1997 | Cook et al. |
| 5,700,920 A | 12/1997 | Altmann et al. |
| 5,739,169 A | 4/1998 | Ocain et al. |
| 5,760,395 A | 6/1998 | Johnstone |
| 5,763,588 A | 6/1998 | Matteucci et al. |
| 5,792,747 A | 8/1998 | Schally et al. |
| 5,801,005 A | 9/1998 | Cheever et al. |
| 5,824,311 A | 10/1998 | Greene et al. |
| 5,830,653 A | 11/1998 | Froehler et al. |
| 5,830,880 A | 11/1998 | Sedlacek et al. |
| 5,846,945 A | 12/1998 | McCormick |
| 5,895,746 A | 4/1999 | Ristell et al. |
| 5,898,031 A | 4/1999 | Crooke |
| 5,962,016 A | 10/1999 | Willis |
| 6,005,096 A | 12/1999 | Matteucci et al. |
| 6,107,094 A | 8/2000 | Crooke |
| 6,303,113 B1 | 10/2001 | Woog et al. |
| 6,506,559 B1 | 1/2003 | Fire et al. |
| 6,531,584 B1 | 3/2003 | Cook et al. |
| 6,573,099 B2 | 6/2003 | Graham |
| 6,600,032 B1 | 7/2003 | Manoharan et al. |
| 6,673,611 B2 | 1/2004 | Thompson et al. |
| 6,680,068 B2 | 1/2004 | Campbell et al. |
| 7,432,249 B2 | 10/2008 | Crooke |
| 7,432,250 B2 | 10/2008 | Crooke |
| 7,629,321 B2 | 12/2009 | Crooke |
| 7,897,356 B2 | 3/2011 | Klass et al. |
| 8,187,601 B2 | 5/2012 | Weng |
| 8,501,161 B2 | 8/2013 | Prencipe et al. |
| 8,905,040 B2 | 12/2014 | Scatterday et al. |
| 9,045,754 B2 | 6/2015 | Bhanot et al. |
| 9,090,698 B2 | 7/2015 | Mukherjee |
| 9,921,223 B2 | 3/2018 | Kalluri et al. |
| 11,007,210 B2 | 5/2021 | Ramunas et al. |
| 11,246,877 B2 | 2/2022 | Lin |
| 2002/0168707 A1 | 11/2002 | Graham |
| 2003/0051263 A1 | 3/2003 | Fire et al. |
| 2003/0055020 A1 | 3/2003 | Fire et al. |
| 2003/0153521 A1 | 8/2003 | McSwiggen |
| 2003/0159161 A1 | 8/2003 | Graham et al. |
| 2004/0019001 A1 | 1/2004 | McSwiggen |
| 2004/0020982 A1 | 2/2004 | Hoffman et al. |
| 2004/0064842 A1 | 4/2004 | Graham et al. |
| 2004/0208921 A1 | 10/2004 | Ho et al. |
| 2004/0265839 A1 | 12/2004 | Mello et al. |
| 2005/0265993 A1 | 12/2005 | Mach et al. |
| 2007/0014788 A1 | 1/2007 | Mathiasen et al. |
| 2007/0259814 A1 | 11/2007 | Lynch |
| 2007/0292866 A1 | 12/2007 | Wang |
| 2010/0055091 A1 | 3/2010 | Ling et al. |
| 2010/0111916 A1 | 5/2010 | Xiang et al. |
| 2010/0196426 A1 | 8/2010 | Olov et al. |
| 2010/0233250 A1 | 9/2010 | Baras et al. |
| 2010/0298409 A1 | 11/2010 | Xie et al. |
| 2010/0303726 A1 | 12/2010 | Watkins et al. |
| 2011/0059502 A1 | 3/2011 | Chalasani |
| 2011/0268750 A1 | 11/2011 | Mamoun et al. |
| 2011/0301045 A1 | 12/2011 | He et al. |
| 2012/0027727 A1 | 2/2012 | Hall et al. |
| 2012/0107317 A1 | 5/2012 | Lau et al. |
| 2012/0202874 A1 | 8/2012 | Karras |
| 2013/0164216 A1 | 6/2013 | Li et al. |
| 2013/0177499 A1 | 7/2013 | Brahmbhatt et al. |
| 2013/0274124 A1 | 10/2013 | Bhatia et al. |
| 2013/0316921 A1 | 11/2013 | Cohen et al. |
| 2014/0220053 A1 | 8/2014 | Muraca et al. |
| 2014/0242154 A1 | 8/2014 | Ramunas et al. |
| 2014/0294929 A1 | 10/2014 | Cunningham |
| 2014/0336282 A1 | 11/2014 | Ewald et al. |
| 2014/0348904 A1 | 11/2014 | Wood et al. |
| 2015/0176073 A1 | 6/2015 | Skog |
| 2015/0182588 A1 | 7/2015 | Kahvejian |
| 2015/0190429 A1 | 7/2015 | Beelen et al. |
| 2015/0232881 A1 | 8/2015 | Glucksmann et al. |
| 2015/0284769 A1 | 10/2015 | Schroeder |
| 2015/0306036 A1 | 10/2015 | Vivas-Mejia et al. |
| 2015/0322532 A1 | 11/2015 | Olov et al. |
| 2016/0115176 A1 | 4/2016 | Enlow et al. |
| 2016/0235788 A1 | 8/2016 | Hicks |
| 2016/0324986 A1 | 11/2016 | Coyle et al. |
| 2017/0049709 A1 | 2/2017 | Horhota et al. |
| 2017/0059572 A1 | 3/2017 | Kalluri et al. |
| 2017/0119682 A1 | 5/2017 | De La Rosa et al. |
| 2017/0121685 A1 | 5/2017 | De La Rosa et al. |
| 2017/0130271 A1 | 5/2017 | Wong |
| 2017/0137528 A1 | 5/2017 | Gardai et al. |
| 2017/0175200 A1 | 6/2017 | Lyden et al. |
| 2017/0258938 A1 | 9/2017 | Lotvall et al. |
| 2017/0298427 A1 | 10/2017 | Yamamoto et al. |
| 2017/0327567 A1 | 11/2017 | Skosos et al. |
| 2017/0342385 A1 | 11/2017 | Sachs et al. |
| 2018/0010133 A1 | 1/2018 | Li |
| 2018/0043027 A1 | 2/2018 | Brahmbhatt et al. |
| 2018/0045728 A1 | 2/2018 | Kalluri et al. |
| 2018/0117173 A1 | 5/2018 | Krizhanovsky |
| 2018/0135012 A1 | 5/2018 | Mata-Fink et al. |
| 2018/0142035 A1 | 5/2018 | Lobb et al. |
| 2018/0177727 A1 | 6/2018 | Kalluri |
| 2018/0360924 A1 | 12/2018 | Nazari-Shafti |
| 2018/0369374 A1 | 12/2018 | Frederick |
| 2019/0117570 A1 | 4/2019 | Kalluri et al. |
| 2019/0179998 A9 | 6/2019 | Frenkel et al. |
| 2019/0382798 A1 | 12/2019 | Cowan et al. |
| 2020/0123258 A1 | 4/2020 | Wargo et al. |
| 2020/0345648 A1 | 11/2020 | Kalluri et al. |
| 2021/0007988 A1 | 1/2021 | Kalluri et al. |
| 2021/0024936 A1 | 1/2021 | Kalluri |
| 2021/0115449 A1 | 4/2021 | Kalluri |
| 2021/0139995 A1 | 5/2021 | Kalluri |
| 2021/0186877 A1 | 6/2021 | Shpall et al. |
| 2021/0369858 A1 | 12/2021 | Kalluri et al. |
| 2021/0371825 A1 | 12/2021 | Kalluri et al. |
| 2022/0136011 A1 | 5/2022 | Kalluri |
| 2022/0137056 A1 | 5/2022 | Kalluri |
| 2022/0144926 A1 | 5/2022 | Kalluri et al. |
| 2022/0144938 A1 | 5/2022 | Kalluri |

FOREIGN PATENT DOCUMENTS

| | | |
|---|---|---|
| CN | 1423659 A | 6/2003 |
| CN | 1602358 A | 3/2005 |
| CN | 104822390 | 8/2015 |
| CN | 105051192 | 11/2015 |
| CN | 106103731 | 11/2016 |
| CN | 106459995 | 2/2017 |
| CN | 106574242 A | 4/2017 |
| CN | 107034188 A | 8/2017 |
| CN | 106714781 | 9/2017 |
| CN | 107735405 A | 2/2018 |
| CN | 107980004 | 5/2018 |
| CN | 111655271 | 9/2020 |
| EP | 0738735 | 10/1996 |
| JP | H08291197 | 11/1996 |
| JP | 2007523074 | 8/2007 |
| JP | 2010529107 | 8/2010 |
| JP | 2010538660 | 12/2010 |
| JP | 2011511807 | 4/2011 |
| JP | 2012524052 | 10/2012 |
| JP | A 2012533619 | 12/2012 |
| JP | 201501694 | 1/2015 |
| JP | 2015521040 | 7/2015 |
| JP | 2016514953 | 5/2016 |
| JP | 2016520056 | 7/2016 |
| JP | 2017503022 | 1/2017 |
| JP | 2017120263 | 7/2017 |
| JP | 2018059865 | 4/2018 |
| JP | 2018520125 | 7/2018 |
| JP | A 2018512397 | 4/2019 |
| WO | WO 1986/000238 | 1/1986 |
| WO | WO 1990/004943 | 5/1990 |

(56) References Cited

FOREIGN PATENT DOCUMENTS

| | | |
|---|---|---|
| WO | WO 2000/026342 | 5/2000 |
| WO | WO 2002/100435 | 12/2002 |
| WO | WO 2003/015757 | 2/2003 |
| WO | WO 2003/046204 | 6/2003 |
| WO | WO 2004/029213 | 4/2004 |
| WO | WO 2004/073319 | 8/2004 |
| WO | WO 2005/121371 | 12/2005 |
| WO | WO 2010/119256 | 10/2010 |
| WO | WO 2011/000551 | 1/2011 |
| WO | WO 2011/149046 | 12/2011 |
| WO | WO 2012/087241 | 6/2012 |
| WO | WO 2013/172793 | 11/2013 |
| WO | WO 2014/043311 | 3/2014 |
| WO | WO 2014/152622 | 3/2014 |
| WO | WO 2014/130909 | 8/2014 |
| WO | WO 2014/144600 | 9/2014 |
| WO | WO 2015/002956 | 1/2015 |
| WO | WO 2015/016718 | 2/2015 |
| WO | WO 2015/070083 | 5/2015 |
| WO | WO2015/085096 A1 * | 6/2015 ............... A61K 9/00 |
| WO | WO 2015/089419 | 6/2015 |
| WO | WO 2015/100269 | 7/2015 |
| WO | 2015/153732 | 10/2015 |
| WO | WO 2015/161184 | 10/2015 |
| WO | WO 2016/016269 | 2/2016 |
| WO | WO 2016/062722 | 4/2016 |
| WO | 2016/139192 | 9/2016 |
| WO | WO 2016/183183 | 11/2016 |
| WO | WO 2016/183482 | 11/2016 |
| WO | WO 2016/187717 | 12/2016 |
| WO | WO 2016/201323 | 12/2016 |
| WO | WO 2017/023689 | 2/2017 |
| WO | WO 2017/040686 | 3/2017 |
| WO | 2017/087560 | 5/2017 |
| WO | WO 2017/079442 | 5/2017 |
| WO | WO 2017/091702 | 6/2017 |
| WO | WO 2017/096327 | 6/2017 |
| WO | WO 2017/117585 | 7/2017 |
| WO | WO 2017/139694 | 8/2017 |
| WO | WO 2017/149515 | 9/2017 |
| WO | WO 2017/161010 | 9/2017 |
| WO | WO 2017/176894 | 10/2017 |
| WO | WO 2017/201528 | 11/2017 |
| WO | WO 2017/203260 | 11/2017 |
| WO | WO 2018/009525 | 1/2018 |
| WO | WO 2018/013918 | 1/2018 |
| WO | WO 2018067925 | 4/2018 |
| WO | 2018/043724 | 8/2018 |
| WO | WO 2018/175422 | 9/2018 |
| WO | WO 2019/094692 | 5/2019 |
| WO | WO 2019/118826 | 6/2019 |
| WO | WO 2019/133934 | 7/2019 |
| WO | WO 2019157535 | 8/2019 |
| WO | WO 2019/191444 | 10/2019 |
| WO | WO 2020/257296 | 12/2020 |
| WO | WO 2021/113761 | 6/2021 |
| WO | WO 2021/158966 | 8/2021 |
| WO | WO 2021/195113 | 9/2021 |
| WO | WO 2022/032238 | 2/2022 |

OTHER PUBLICATIONS

Du et al., "A systematic analysis of the silencing effects of an active siRNA at all single-nucleotide mismatched target sites." Nucleic Acids Research 2005, 33:1671-1677.

El-Andaloussi et al., "Exosome-mediated delivery of siRNA in vitro and in vivo." Nature Protocols 2012, 7:2112-2126.

El-Andaloussi et al., "Extracellular vesicles: biology and emerging therapeutic opportunities." Nature Reviews Drug Discovery 2013, 12:347-357.

Gomes-da-Silva et al., "Lipid-based nanoparticles for siRNA delivery in cancer therapy: paradigms and challenges." Accounts of Chemical Research 2012, 45:1163-1171.

International Search Report and Written Opinion issued in corresponding PCT Application No. PCT/US2019/024584, dated Sep. 16, 2019.

Johnsen et al., "A comprehensive overview of exosomes as drug delivery vehicles—endogenous nanocarriers for targeted cancer therapy." Biochimica et Biophysica Acta 2014, 1846, 75-87.

Jones, Peter A. and Stephen B. Baylin, "The Epigenomics of Cancer" Cell 2007, 128:683-692.

Kowal et al., "Biogenesis and secretion of exosomes." Current Opinion in Cell Biology 2014, 29:116-125.

Laird, Peter W., "Principles and challenges of genome-wide DNA methylation analysis" Nat Review Genet. Nov. 2010, 191-203.

Losche et al., "Platelet-derived microvesicles transfer tissue factor to monocytes but not to neutrophils" Platelets 2004, 15:2, 109-115.

Lu, et al., "Elevated glypican-1 expression is associated with an unfavorable prognosis in pancreatic ductal adenocarcinoma." Cancer Med. 2017, 6(6), 1181-1191.

Luga et al., "Exosomes mediate stromal mobilization of autocrine Wnt-PCP signaling in breast cancer cell migration." Cell 2012, 151, 1542-1556.

Marcus, Michelle E. and Joshua N. Leonard, "FedExosomes: Engineering Therapeutic Biological Nanoparticles that Truly Deliver." Pharmaceuticals 2013, 6:659-680.

Meissner et al., "Reduced representation bisulfite sequencing for comparative high-resolution DNA methylation analysis" Nucleic Acids Research 2005, 33(18):5868-5877.

Melo et al., "Glypican-1 identifies cancer exosomes and detects early pancreatic cancer." Nature 2015, 523, 177-182.

Mesri, Mehdi and Dario C. Altieri, "Endothelial Cell Activation by Leukocyte Microparticles" J Immunol 1998; 161, 4382-4387.

Morel et al., "Cellular microparticles: a disseminated storage pool of bioactive vascular effectors" Current Opinion in Hematology 2004, 11(3), 156-164.

Pecot et al., "Therapeutic Silencing of KRAS using Systemically Delivered siRNAs." Molecular Cancer Therapeutics 2014, 13:2876-2885.

Robertson, Keith D., "DNA methylation and human disease" Nat Review Genet 2005, 6:597-610.

Simões et al., "Cationic liposomes for gene delivery" Expert Opinion on Drug Delivery 2005, 2:237-254.

Théry et al., "Exosomes: composition, biogenesis and function." Nature Reviews Immunology 2002, 2:569-579.

Valadi et al., "Exosome-mediated transfer of mRNAs and microRNAs is a novel mechanism of genetic exchange between cells." Nature Cell Biology 2007, 9:654-659.

Van den Boorn et al., "Exosomes as nucleic acid nanocarriers." Advanced Drug Delivery Reviews 2013, 65:331-335.

Van der Meel et al., "Extracellular vesicles as drug delivery systems: Lessons from the liposome field." Journal of Controlled Release 2014, 195:72-85.

Veillard, et al., "Diagenode Premium RRBS technology: cost-effective DNA methylation mapping with superior coverage" Nature Methods 2016, 13, p. 184.

Wahlgren et al., "Plasma exosomes can deliver exogenous short interfering RNA to monocytes and lymphocytes." Nucleic Acids Research 2012, 40:e130, 12 pages.

Yamamoto, et al., "BARHL2 Methylation Using Gastric Wash DNA or Gastric Juice Exosomal DNA is a Useful Marker For Early Detection of Gastric Cancer in an H. pylori-Independent Manner" Clin Transl Gastroenterol. 2016, 7(7), p. e184 (pp. 1-11).

Yuan et al., "Development of siRNA payloads to target KRAS-mutant cancer." Cancer Discovery 2014, 4:1182-1197.

Guochaoli et al., "Liquid Biopsy: Advances, Limitations and Clinical Applications." JSM Biotechnology & Biomedical Engineering, vol. 4, 30 p. 1078, Jun. 2017.

Extended European Search Report and Written Opinion issued in corresponding European Patent Application No. 19775635.8, dated Jan. 4, 2022.

Bock, C. et al., "Genome-wide mapping of DNA methylation: a quantitative technology comparison", Nature Biotechnol., 28(10), pp. 1106-1114, 2010.

Office Action issued in corresponding Japanese Application No. 2020-551828, dated Mar. 13, 2023.

(56) References Cited

OTHER PUBLICATIONS

Aagaard et al., RNAi Therapeutics: Principles, Prospects and Challenges. Advanced Drug Delivery Reviews 59:75-86, 2007.
Aakalu et al., "Dynamic visualization of local protein in hippocampal neurons", Neuron, 30:489-502, 2001.
Agorku et al. Isolation and analysis of tumor cells from human solid tumor tissue extracted by needle biopsy. Miltenyi Biotec, pp. 1-3., 2017.
Aheget et al., "Exosomes: Their Role In Pathogenesis, Diagnosis, and Treatment of Diseases" Cancers, 13(84), 45 pages, 2021.
Almoguera et al., "Most human carcinomas of the exocrine pancreas contain mutant c-K-ras genes", Cell, 53:549-554, 1988.
Al-Nedawi et al., "Endothelial expression of autocrine VEGF upon the uptake of tumor-derived microvesicles containing oncogenic EGFR", Proceeding of the National Academy of Sciences of the United States of Americal, 106:3794-3799, 2009.
Annibali et al. "Myc inhibition is effective against glioma and reveals a role for Myc in proficient mitosis", *Nature Communications*, 2014.
Apte, et al., "Pancreatic Stellate Cells: A Starring Role in Normal and Diseased Pancreas," Frontiers in Physiology, 3: 344, 2012.
Armstrong et al., "Type I collagen promotes the malignant phenotype of pancreatic ductal adenocarcinoma." Clinical cancer research: an official journal of the American Association for Cancer Research 2004, 10, 7427-7437.
Arriazu et al., "Signaling via the osteopontin and high mobility group box—I axis drives the fibrogenic response to liver injury.", Gut., 66(6):1123-37,x 2017.
Assudani D et al. "Immunotherapeutic potential of DISC-HSY and OX40L in cancer." Cancer Immunology; vol. 55, No. 1; 27, pp. 104-111, 2005.
Auerbach et al., Angiogenesis assays: Problems and pitfalls, Cancer and Metastasis Reviews, 2000, 19: 167-172, 2000.
Bachem, et al., "Pancreatic Carcinoma Cells Induce Fibrosis by Stimulating Proliferation and Matrix Synthesis of Stellate Cells," Gastroenterology, 128: 907-921.
Baglio et al., "Human bone marrow- and adipose-mesenchymal stem cells secrete exosomes enriched in distinctive miRNA and tRNA species", Stem Cell Research & Therapy 2015, 6(127), pp. 1-20.
Barlie et al. "Exosomes: Therapy delivery tools and biomarkers of diseases", Pharmacol Ther, vol. 174, pp. 63-78, 2017.
Bartneck et al., "Therapeutic targeting of liver inflammation and fibrosis by nanomedicine.", Hepatobiliary Surg Nutr., 3(6):364-76, 2014.
Barros-Silva, et al. "Profiling DNA methylation based on next-generation sequencing approaches: New insights and clinical applications", *Genes*, vol. 9, No. 429, 2018.
Bastos et al., "Exosomes in cancer: Use them or target them?", Semin Cell Dev Biol., 78:13-21, 2017.
Bataller et al., "Liver Fibrosis.", J Clin Invest., 115(2):209-18, 2005.
Batrakova et al. "development and regulation of exosome-based therapy products", WIREs Nanomed Nanobiotechnol, vol. 8, pp. 744-757, 2016.
Beans C. "Targeting metastasis to halt cancer's spread," PNAS, 115(50): 12539-12543, 2018.
Beebe et al., "Two decades of research in discovery of anticancer drugs targeting STAT3, how close are we?", Pharmacol Ther., 191:74-91, 2018.
Bhowmick, et al., TGF-beta Signaling in Fibroblasts Modulates the Oncogenic Potential of Adjacent Epithelia, Science, 303: 848-851, 2004.
Blazquez et al., "Immunomodulatory Potential of Human Adipose Mesenchymal Stem Cells Derived Exosomes on in vitro Stimulated T Cells", Frontiers In Immunology, vol. 5, pp. 1-9, 2014.
Boj et al., "Organoid models of human and mouse ductal pancreatic cancer," Cell, 160:324-338; 2015.
Bonnans et al., "Remodelling the extracellular matrix in development and disease." Nature reviews Molecular cell biology 2014, 15, 786-801.

Borges et al., "TGF-betal-containing exosomes from injured epithelial cells activate fibroblasts to initiate tissue regenerative responses and fibrosis." Journal of the American Society of Nephrology, 24:385-392, 2013.
Bork P. Powers and Pitfalls in Sequence Analysis: The 70% Hurdle. Genome Research, 10:398-400, 2000.
Breitkopf et al., "Thrombospondin 1 acts as a strong promoter of transforming growth factor beta effects via two distinct mechanisms in hepatic stellate cells.", Gut., 54(5):673-81, 2005.
Brown et al., Tolerance of single, but not multiple, amino acid replacements in antibody VH CDR 2: a means of minimizing B cell wastage from somatic hypermutation? J Immunol., 156(9):3285-91, 1996.
Bukowski et al., "Signal transduction abnormalities in T lymphocytes from patients with advanced renal carcinoma: clinical relevance and effects of cytokine therapy." Clin. Cancer Res., 4:2337-2347, 1998.
Bunggulawa et al. "Recent advancements in the use of exosomes as drug delivery systems", J Nanobiotechnol 16:81, 2018.
Burgess et al. Possible Dissociation of the Heparin-binding and Mitogenic Activities of Heparin-binding (Acidic Fibroblast) Growth Factor-1 from Its Receptor-binding Activities by Site-directed Mutagenesis of a Single Lysine Residue. J. Cell Biol. 111:2129-2138,1990.
Carmona et al., "Empirical comparison of reduced representation bisulfite sequencing and Infinium BeadChip reproducibility and coverage of DNA methylation in humans", *npj Genomic Medicine*, 2:13: pp. 1-10, 2017.
Cagnet et al., "Signaling events mediated by α3β1 integrin are essential for mammary tumorigenesis" Oncogene 2013, 33(34), 4286-4295.
Carey et al., "Three-dimensional collagen matrix induces a mechanosensitive invasive epithelial phenotype." Scientific Reports. 7:42088, 1014, 2017.
Chakraborty et al., "Activation of STAT3 integrates common profibrotic pathways to promote fibroblast activation and tissue fibrosis.", Nat Commun., 8(1):1130, 2017.
Chen, et al., "Crucial Role of p53-Dependent Cellular Senescence in Suppression of Pten-Deficient Tumorigenesis," Nature, 436: 725-730, 2005.
Chiappinelli et al. "Inhibiting DNA Methylation Causes an Interferon Response in Cancer via dsRNA Including Endogenous Retroviruses" (vol. 162, Issue 5(27):974-986, 2015.
Choi et al., "A novel STAT3 inhibitor, STX-0119, attenuates liver fibrosis by inactivating hepatic stellate cells in mice.", Biochem Biophys Res Commun., 513(1):49-55, 2019.
Choi et al., "The protein interaction network of extracellular vesicles derived from human colorectal cancer cells" J Proteome Res., 11:1144-1151, 2012.
Clark et al., Discovery and development of Janus kinase (JAK) inhibitors for inflammatory disease. J. Med. Chem., 57(12):5023-5038, 2014.
Collins et al., "Metastatic pancreatic cancer is dependent on oncogenic Kras in mice." PLoS One, 7:e49707, 2012b.
Collins et al., "Oncogenic Kras is required for both the initiation and maintenance of pancreatic cancer in mice." The Journal of Clinical Investigation, 122:639-653, 2012a/.
Colombo et al., "Biogenesis, secretion, and intercellular interactions of exosomes and other extracellular vesicles." Annu Rev Cell Dev Biol, 30:255-289, 2014.
Combes, et al., "A New Flow Cytometry Method of Platelet-Derived Microvesicle Quantitation in Plasma," Thromb Haemost, 77: 220, 1997.
Cooper et al., "Systemic exosomal siRNA delivery reduced alpha-synuclein aggregates in brains of transgenic mice." Movement Disorders, 29:1476-1485, 2014.
Costa-Silva et al., Pancreatic cancer exosomes initiate pre-metastatic niche formation in the liver. Nature Cell Biol. 17(6):816-826, 2015.
Cox, et al. "Therapeutic genome editing: prospects and challenges", Nat Med., vol. 21, pp. 121-131, 2015.
Croft et al., "The Reactome pathway knowledgebase." Nucleic Acids Res., 42:D472-477, 2014.

(56) References Cited

OTHER PUBLICATIONS

Curti et al. OX40 is a potent immune-stimulating target in late-stage cancer patients. Cancer Res, vol. 15, 2013.
Duval, et al. "Modeling Physiology events in 2d vs. 3d cell culture", Physiology, 32:266-277, 2017.
Egeblad et al., "Dynamic interplay between the collagen scaffold and tumor evolution." Curr Opin Cell Biol 2010, 22, 697-706.
Emery, David C. et al., "16S rRNA Next Generation Sequencing Analysis Shows Bacteria in Alzheimer's Post-Mortem Brain", Frontiers in Aging Neuroscience, vol. 9, Jun. 20, 2017, pp. 1-13.
Eser et al., "Oncogenic KRAS signaling in pancreatic cancer." British Journal of Cancer, 111:817-822, 2014.
Estellar, M., "Cancer epigenomics: DNA methylomes and histone-modification maps." Nat Review Genet, 8:286-298, 2007.
Feig et al., "Targeting CXCL 12 from FAP-expressing carcinoma-associated fibroblasts synergizes with anti-PD-L 1 immunotherapy in pancreatic cancer," Proc. Natl. Acad. Sci. U.S.A., 110:20212-20217 (2013).
Feinberg et al., "Hypomethylation distinguishes genes of some human cancers from their normal counterparts," Nature, 301:89-92, 1983.
Fernando, et al., "New evidence that a large proportion of human blood plasma cell-free DNA is localized in exosomes", PLOS One, 2017.
Ferreira et al. "Duct- and Acinar-Derived Pancreatic Ductal Adenocarcinomas Show Distinct Tumor Progression and Marker Expression". Cell Rep. 21 (4): 966-978., 2017.
Fischer et al. "Indication of horizontal DNA gene transfer by extracellular vesicles", PLOS One, 2016.
Fritz Joelle V. et al., "Sources and Functions of Extracellular Small RNAs in Human Circulation", Annual Review of Nutrition, vol. 36, No. 1, Jul. 17, 2016 (Jul. 17, 2016), pp. 301-336.
Fujita et al. "Clinical application of mesenchymal stem cell-derived extracellular vesicle-based therapeutics for inflammatory lung disease", *Journal of Clinical Medicine*, vol. 7, No. 10, 2018.
Fujita et al., "Tumor-stromal interactions With direct cell contacts enhance proliferation of human pancreatic carcinoma cells." Cancer science 2009, 100, 2309-2317.
Golan et al., RNAi therapy targeting KRAS in combination with chemotherapy for locally advanced pancreatic cancer patients. Oncotarget, 2015, 6:24560-24570.
Gong et al., "Overexpression of miR-126 inhibits the activation and migration of HSCs through targeting CRK.", Cell Physiol Biochem., 33(1):97-106, 2014.
Gonzales et al., "Large-scale proteomics and phosphoproteomics of urinary exosomes." Journal of the American Society of Nephrology, 20: 363-379, 2009.
Gravanis et al., The changing world of cancer drug development: the regulatory bodies' perspective, Chin Clin Oncal, 2014, 3, pp. 1-5; 2014.
Greco K A et al., "PLK-1 Silencing in Bladder Cancer by siRNA Delivered with Exosomes." Urology, vol. 91, Feb. 12, 2016.
Greenspan et al. 1999 Defining epitopes: It's not as easy as it seems. Nature Biotechnology, 17:936-937, 1999.
Guido et al., Virtual screening and its integration with modern drug design technologies. Curr Med Chem. 15(1):37-46, 2008.
Guo, et al., "Anti-Tumour Effects of Exosomes in Combination with Cyclophosphamide and Polyinosinic-Polycytidylic Acid," J In Med Res, 36(6): 1342-1353, 2008.
Gura T. Systems for Identifying New Drugs are Often Faulty, Science, 278(5340):1041-1042, 1997.
Gutkin et al., "Tumor cells derived exosomes contain hTERT mRNA and transform nonmalignant fibroblasts into telomerase positive cells", Oncotarget, vol. 7, No. 37: 59173-59188, 2016.
Haber, et al., "Activation of Pancreatic Stellate Cells in Human and Experimental Pancreatic Fibrosis," The American Journal of Pathology, 155: 1087-1095, 1999.
Hait W., Anticancer drug development: the grand challenges, Nature Reviews/Drug Discovery. 9:253-254, 2010.
Han et al., "Molecular Mechanism of Type I Collagen Homotrimer Resistance to Mammalian Collagenases," J of Bio Chem, vol. 285, No. 29, pp. 22276-22281.
Han et al., "Segregation of type I collagen homo- and heterotrimers in fibrils" J Mol Biol. 2008, 383(1): 122-132.
Hanibuchi et al., "Therapeutic efficacy of mouse-human chimeric anti-ganglioside GM2 monoclonal antibody against multiple organ micrometastases of human lung cancer in NK cell-depleted SCID mice." Int. J. Cancer, 78:480-485, 1998.
Harley et al., "A Natural Product Telomerase Activator As Part of a Health Maintenance Program", *Rejuvenation Research*, 14(1):45-56, 2011.
Hazan-Halevy et al., "Cell specific uptake of mantle cell lymphoma-derived exosomes by malignant and non-malignant B-lymphocytes." Cancer Lett., 364:59-69, 2015.
He et al., "Gene set enrichment analysis and meta-analysis indentified 12 key genes regulating and controlling the prognosis of lung adenocarcinoma.", Oneal Lett., 17(6):5608-18, 2019.
Hellstrand et al., "Histamine and cytokine therapy." Acta Oncol., 37:347-353, 1998.
Helmink et al., "B cells and tertiary lymphoid structures promote immunotherapy response" Nature, 577, 549-555, 2020.
Heppner et al., Tumor heterogeneity: biological implications and therapeutic consequences, Cancer Metastasis Reviews 2: May 23, 1983.
Hernandez-Gea et al., "Pathogenesis of liver fibrosis.", Annu Rev Pathol., 6:425-56, 2011.
Hingorani et al., "Trp53R172H and KrasG12D cooperate to promote chromosomal instability and widely metastatic ductal adenocarcinoma in mice." Cancer Cell., 7:469-483, 2005.
Hollander, N., "Immunotherapy for B-cell lymphoma: current status and prospective advances." FrontImmunol., 3:3, 2013.
Hood, "The association of exosomes with lymph nodes", Semin Cell Dev Biol, vol. 37, 2016.
Hosen N., "Chimeric antigen receptor T cell therapy against cancer," Seikagaku Journal of Japanese Biochemical Society, vol. 90, No. 4, pp. 495-498, 2018. (No Translation Available).
Hruban et al., "K-ras oncogene activation in adenocarcinoma of the human pancreas. A study of 82 carcinomas using a combination of mutant-enriched polymerase chain reaction analysis and allele-specific oligonucleotide hybridization." The American Journal of Pathology, 143:545-554, 1993.
Huang et al. "Interleukin-6 Induces vascular endothelial growth factor-c expression via src-FAK-STAT3 signaling in lymphathic endothelial cells", PLOS One, 2016.
Huang et al. Ductal pancreatic cancer modeling and drug screening using human pluripotent stem cell- and patient-derived tumor organoids Nature Medicine, 21, pp. 1364-1373, 2015.
Huang et al., "Epidermal growth factor receptor-containing exosomes induce tumor-specific regulatory T cells." Cancer Invest., 31:330-335, 2013.
Huang et al. "Cell-free DNA methylation profiling analysis-technologies and bioinformatics", *Cancers*, vol. 11, 2019.
Hui et al., "Pathways for Potentiation of Immunogenicity during Adjuvant-Assisted Immunizations with Plasmodium falciparum Major Merozoite Surface Protein 1." Infec. Immun., 66:5329-5336, 1998.
Ijichi H et al., "Aggressive pancreatic ductal adenocarcinoma in mice caused by pancreas-specific blockade of transforming growth factor-beta signaling in cooperation with active Kras expression," Genes Dev., 20:3147-3160, 2006.
International Search Report and Written Opinion issued in corresponding International Application No. PCT/US2019/024603 dated Jun. 11, 2019.
International Search Report and Written Opinion issued in corresponding International application PCT/US2019/026557 mailed Jul. 17, 2019.
International Search Report and Written Opinion issued in corresponding International application PCT/US2019/056576 mailed Mar. 10, 2020.
International Search Report and Written Opinion issued in Corresponding PCT Application No. PCT/US2020/017224, dated Apr. 28, 2020.

(56) References Cited

OTHER PUBLICATIONS

International Search Report and Written Opinion issued in Corresponding PCT Application No. PCT/US2020/038158, dated Sep. 25, 2020.
International Search Report and Written Opinion issued in Corresponding PCT Application No. PCT/US2021/016887, dated May 7, 2021.
International Search Report and Written Opinion issued in Corresponding PCT Application No. PCT/US2021/23731, dated Aug. 6, 2021.
International Search Report and Written Opinion Issued in Corresponding PCT Patent Application No. PCT/US2019/021871, dated Jul. 9, 2019.
International Search Report and Written Opinion Issued in PCT Patent Application No. PCT/US2018/065642, dated May 7, 2019.
International Search Report and Written Opinion mailed Feb. 21, 2020 issued in PCT Application No. PCT/US2019/056577.
International Search Report issued in corresponding PCT Application No. PCT/US20/63475 dated May 6, 2021.
Ishihama et al., "Exponentially modified protein abundance index (emPAI) for estimation of absolute protein amount in proteomics by the number of sequenced peptides per protein." Mol Cell Proteomics, 4(9):1265-1272, 2005.
Iyer, SV et al., "Allele-specific silencing of mutant p53 attenuates dominant-negative and gain-of-function activities" Oncotarget, vol. 7, No. 5, pp. 5401-5415, 2015.
Jain RK, Barriers to Drug Delivery in Solid Tumors, 1994, Scientific American, pp. 58-645, 1994.
Ji et al., "Ras activity levels control the development of pancreatic diseases." Gastroenterology, 137:1072-1082, 82 e1-6, 2009.
Jiemin QI et al., "Expression and Significance if Intergrin α5β1, HPA in PSTT and Choriocarcinoma".
Jung et al., "Multifunctional Effects of a Small-Molecule STAT3 Inhibitor on NASH and Hepatocellular Carcinoma in Mice.", Clin Cancer Res., 23(18):5537-46, 2017.
Kahlert et al., "Identification of Double Stranded Genomic DNA Spanning all Chromosomes with Mutated KRAS and p53 DNA in the Serum Exosomes of Patients with Pancreatic Cancer." J Biol Chem., 289(7):3869-3875, 2014.
Kalluri et al., "The biology and function of exosomes in cancer." J Clin Invest., 126(4):1208-1215, 2016.
Kamerkar et al., Exosomes facilitate therapeutic targeting of oncogenic KRAS in pancreatic cancer. Nature, vol. 546, pp. 498-503, Jun. 2017, doi:10-1038/nature22341.
Katsuda et al.. "Potential application of mesenchymal stem cell-derived exosomes as a novel therapeutic drug", *Drug Delivery System*, vol. 29, No. 2, pp. 140-151, 2014.
Kawataki et al. "Laminin isoforms and their integrin receptors in glioma cell migration and invasiveness: evidence for a role of [alpha] 5-laminin(s) and [alpha]3 [beta]1 integrin", Experimental Cell Research, vol. 313, No. 18, pp. 381-3831, 2007.
Khvalevsky et al., "Mutant KRAS is a druggable target for pancreatic cancer." Proc Natl Acad Sci U S A., 110:20723-20728, 2013.
Kisiel et al., "New DNA Methylation Markers for Pancreatic Cancer: Discovery, Tissue Validation, and Pilot Testing in Pancreatic Juice", *Clinical Cancer Research*, 21(19):4473-81, 2015.
Kopp, et al., Identification of Sox9-dependent acinar-to-ductal reprogramming as the principal mechanism for initiation of pancreatic ductal adenocarcinoma. Cancer cell 22:737-750.2012.
Kramer et al., "The ribosome as a platform for cotranslational processing, folding and targeting of newly synthesized proteins." Nat Struct Mol Biol, 16:589-597, 2009.
Krishna, M., "Patterns of necrosis in liver disease.", Clin Liver Dis (Hoboken), 10(2):53-6,2017.
Kulmanov et al., DEEPGO: predicting protein functions from sequence and interactions using a deep ontology-aware classifier. Bioinformatics, 34(4), 2018, 660-668, 2018.
Lai et al. "Exosomes for drug delivery—a novel application for the mesenchymal stem cell", *Biotechnology Advances*, vol. 31, No. 5, pp. 543-551, 2012.

Laklai, et al., Genotype Tunes Pancreatic Ductal Adenocarcinoma Tissue Tension to Induce Matricellular Fibrosis and Tumor Progression, Nature Medicine, 22: 497-505, 2016.
Lamichhane T N et al., "Oncogene Knockdown via Active Loading of Small RNAs into Extracellular Vesicles by Sonication." Cellular and Mol Bioeng, vol. 9, No. 3, pp. 315-324, Jul. 7, 2016.
Lazar et al. Transforming Growth Factor alpha: Mutation of Aspartic Acid 47 and Leucine 48 Results in Different Biological Activities. Mol. Cell. Biol., 8:1247-1252, 1988.
Lapin et al. "Extracellular vesicles as a potential source of tumor-derived DNA in advanced pancreatic cancer", *PLOS One*, 2023.
Lebleu, et al., Origin and function of myofibroblasts in kidney fibrosis. Nature medicine 19: 1047-1053, 2013.
Lee, et al., "Generation of Primary Tumors with Flp Recombinase in FRT-Flanked p53 Mice," Disease models & mechanisms 5: 397-402, 2012.
Leikina et al., "Type I collagen is thermally unstable at body temperature." PNAS, 99(3), 1314-1318, 2002.
Lener et al. "Applying extracellular vesicles based therapeutics in clinical trials—an ISEV position paper", Journal of Extracellular Vesicles, 4:30087; 2015.
Levental et al., "Matrix crosslinking forces tumor progression by enhancing integrin signaling." Cell 2009, 139, 891-906.
Li et al. "BCMab1, a monoclonal antibody against aberrantly glycosylated integrin [alpha] 23[beta]1, has potent antitumor activity of bladder cancer in vivo", Clinical Cancer Research, vol. 20, No. 15, pp. 4001-4013, 2014.
Li et al., "Exosomes derived from gefitinib-treated EGFR-mutant lung cancer cells alter cisplatin sensitivity via up-regulating autophagy." Oncotarget, 7(17):24585-24595, 2016.
Li, Fei et al., "Mast Cell-Derived Exosomes Promote Th2 Cell Differentiation via OX40L-OX40 Ligation." Journal Of Immunology Research, vol. 2016, pp. 1-10, 2016.
Li et al., "Liquid Biopsy: advances, limitations and clinical applications." *JSM Biotechnology & Biomedical Engineering*, vol. 4, p. 1078, 2017.
Lillo et al. "A human single-chain antibody specific for integrin [alpha] 3[beta]1 capable of cell internalization and delivery of antitumor agents", Chemistry & Biology, vol. 11, No. 7, pp. 897-906, 2004.
Lim et al., "EGFR Signaling Enhances Aerobic Glycolysis in Triple-Negative Breast Cancer Cells to Promote Tumor Growth and Immune Escape." Cancer Res., 76(5):1284-1296, 2016.
Lin et al., "Lipid-Based Nanoparticles in the Systemic Delivery of siRNA," Nanomedicine, 9(1):105-120, 2014.
Liu, et al. "Integration of stem cell-derived exosomes with in situ hydrogel glue as a promising tissue patch for articular cartilage regeneration", Nanoscale, 9, pp. 4430-4438, 2017.
Liu, Yunhua et al. "Targeting tumor suppressor genes for cancer therapy." BioEssays : news and reviews in molecular, cellular and developmental biology vol. 37, 12, 1277-86, 2015.
Livak et al., "Analysis of relative gene expression data using real-time quantitative PCR and the 2(-Delta Delta C(T)) Method." Methods, 25(4):402-408, 2001.
Lo et al., "Fibroblast activation protein augments progression and metastasis of pancreatic ductal adenocarcinoma," JCI Insight, 2:92232, 2017.
Lorch et al., "Role of DNA sequence in chromatin remodeling and the formation of nucleosome-free regions." Genes Dev. 28:2492-2497, 2014.
Lou et al., "MiR-199a-modified exosomes from adipose tissue-derived mesenchymal stem cells improve hepatocellular carcinoma chemosensitivity through mTOR pathway.", J Exp Clin Cancer Res., 39(1):4, 2020.
Lu et al., "A cAbl-MRTF—A Feedback Loop Contributes to Hepatic Stellate Cell Activation.", Front Cell Dev Biol., 7:243, 2019.
Lunavat, T R et al., "RNAi delivery by exosome-mimetic nanovesicles-Implications for targeting c-Myc in cancer." Biomaterials, vol. 102, pp. 231-238, Jun. 15, 2016.
Mace et al. "IL-6 and PD-L1 antibody blockade combination therapy reduces tumor progression in murine models of pancreatic cancer", Gut Microbiota, vol. 67, No. 2, pp. 320-332, 2016.

(56) References Cited

OTHER PUBLICATIONS

Makareeva et al. "Carcinomas Contain a Matrix Metalloproteinase-Resistant Isoform of Type I Collagen Exerting Selective Support to Invasion" Cancer Research 2010, 70(11), 4366-4374.
Malina et al., "Repurposing CRISPR/Cas9 for in situ functional assays." Genes & Development, 27:2602-2614, 2013.
Martins Cavaco et al., "The Interaction between Laminin-332 and α3β1 Integrin Determines Differentiation and Maintenance of CAFs, and Supports Invasion of Pancreatic Duct Adenocarcinoma Cells".
Matias, O. et al., "Rab27a and Rab27b control different steps of the exosome secretion pathway." Nature Cell Biology. vol. 12, No. 1, pp. 19-30. (2009).
McAndrews, K. et al., "Exosome-mediated delivery of CRISPR/Cas9 for targeting of oncogenic Kras G12D in pancreatic cancer." Life Science Alliance. vol. 4, No. 9 (2021).
McKeague et al., Challenges and Opportunities for Small Molecule Aptamer Development; J Nucleic Acids. 2012;2012:748913. Epub 2012.
Mederacke et al., "Fate tracing reveals hepatic stellate cells as dominant contributors to liver fibrosis independent of itsaetiology.", Nat. Commun., 4:2823, 2013.
Melo et al., "Glypican1 identifies cancer exosomes and facilitates early detection of cancer" Nature 2015, 523:177-182.
Melo et al., "Cancer exosomes perform cell-independent microRNA biogenesis and promote tumorigenesis." Cancer Cell, 26:707-721, 2014.
Mendt et al., "Generation and testing of clinical-grade exosomes for pancreatic cancer.", JC/Insight., 3(8), 2018.
Meng et al., "TGF-beta: the master regulator of fibrosis.", Nat Rev Nephrol., 12(6):325-38, 2016.
Millipore Sigma, "DMEM/F-12 Plus Basal Medium" Data Sheet.
Miosge LA et al. Comparison of predicted and actual consequences of missense mutations, PNAS; 112(37):E5189-98, 2015.
Mitchell et al. "Suppression of Integrin α3β1 in breast cancer cells reduces cyclooxygenase-2 gene expression and inhibits tumorigenesis, invasion, and cross-talk to endothelial cells", Cancer Res. (2010) vol. 70, issue 15, p. 6359-6367.
Mitsunaga et al. "Serum levels of IL-6 and IL-1 [beta] can predict the efficacy of gemcitabine in patients with advanced pancreatic cancer", British Journal of Cancer, vol. 108, No. 10, pp. 2063-2069, 2013.
Morgillo et al., "Mechanisms of resistance to EGFR-targeted drugs: lung cancer." ESMO Open, 1: e000060, 2016.
Morino et al., "Eukaryotic translation initiation factor 4E (eIF4E) binding site and the middle one-third of eIF4GI constitute the core domain for cap-dependent translation, and the C-terminal one-third functions as a modulatory region." Mol Cell Biol., 20:468-477, 2000.
Mueller et al., "Friends or Foes—Bipolar Effects of the Tumour Strama in Cancer," Nature Reviews Cancer, 4: 839-849 2004.
Nagai et al., "Chromatin potentiates transcription." Proc Natl Acad Sci U S A., 114(7):1536-1541, 2017.
Nagathihalli et al., "Pancreatic stellate cell secreted IL-6 stimulates STAT3 dependent invasiveness of pancreatic intraepithelial neoplasia and cancer cells," Oncotarget, 7:65982-65992, 2016.
Nair VS et al. "Immune checkpoint inhibitors in cancer therapy: a focus on T-regulatory cells", Immunology and Cell Biology, vol. 96, No. 1, pp. 21-33, 2018.
Nakada et al., "Integrin α3 is overexpressed in glioma stem-like cells and promotes invasion" BJC 2013, 108(12), 2516-2524.
Nakai et al., "A perspective on anti-EGFR therapies targeting triple-negative breast cancer." Am J Cancer Res., 6:1609-1623, 2016.
Nakase et al., Active macropinocytosis induction by stimulation of epidermal growth factor receptor and oncogenic Ras expression potentiates cellular uptake efficacy of exosomes. Scientific Reports 5:10300; 2005.
Naslund et al. "Dendritic cell-derived exosomes need to activate both T and B cells to induce antitumor immunity", The Journal of Immunology, pp. 2712-2719, 2013.

Neesse, et al., "Stromal Biology and Therapy in Pancreatic Cancer: A Changing Paradigm," Gut, 64: 1476-1484, 2015.
Nicholson et al. "EGFR and cancer prognosis", Eur J Cancer 37, Suppl 4:S9-15, 2001.
Normanno et al., "Epidermal growth factor receptor (EGFR) signaling in cancer." Gene, 366:Feb. 16, 2006.
Ohlund, et al., "Distinct Populations of Inflammatory Fibroblasts and Myofibroblasts in Pancreatic Cancer," Journal of Experimental Medicine, 214: 579-596, 2017.
Ohlund, et al., "Fibroblast Heterogeneity in the Cancer Wound," The Journal of Experimental Medicine, 211: 1503-1523, 2014.
Ohno et al., "Systemically Injected Exosomes Targeted to EGFR Deliver Antitumor MicroRNA to Breast Cancer Cells", Molecular Therapy vol. 21, No. 1, pp. 185-191, Jan. 2013.
Olive, et al., "Inhibition of Hedgehog Signaling Enhances Delivery of Chemotherapy in a Mouse Model of Pancreatic Cancer," Science, 324: 1457-1461, 2009.
Ostrowski M et al., "Rab27a and Rab27b control different steps of the exosome secretion pathway." Nature Cell Biology. vol. 12, No. 1, pp. 19-30. (2009).
Oudin et al. Physical and Chemical Gradients in the Tumor Microenvironment Regulate Tumor Cell Invasion, Migration, and Metastasis. Cold Spring Harb Symp Quant Biol, 81: 189-205, 2016.
Ozdemir et al. Depletion of carcinoma-associated fibroblasts and fibrosis induces immunosuppression and accelerates pancreas cancer with reduced survival. Cancer Cell., 25:719-734, 2014.
Pachler et al., "A Good Manufacturing Practice-grade standard protocol for exclusively human mesenchymal stromal cell-derived extracellular vesicles," Cytotherapy, 19(4):458-472, 2017.
Pardoll, D.M., "The blockade of immune checkpoints in cancer immunotherapy," Nat Rev Cancer, 12(4):252-64, 2012.
Park et al. "Musashi-2 controls cell fate, lineage bias, and TGF-B signaling in HSCs.", Journal of Experimental Medicine, 211(1):71-87, 2014.
Park, et al., "Metagenome Analysis of Bodily Microbiota in a Mouse Model of Alzheimer Disease Using Bacteria-derived Membrane Vesicles in Blood." Experimental Neurobiology, vol. 26, No. 6; Jan. 1, 2017, p. 369.
Parrales A, Iwakuma T. "Targeting Oncogenic Mutant p53 for Cancer Therapy", Front Oneal. 2015.
Passaro, Antonio et al. "Cancer biomarkers: Emerging trends and clinical implications for personalized treatment." Cell vol. 187,7 1617-1635, 2024.
Pechkovsky et al., "STAT3-mediated signaling dysregulates lung fibroblast-myofibroblast activation and differentiation in UIP/IPF.", Am J Pathol., 180(4):1398-412, 2012.
Peinado et al., "Melanoma exosomes educate bone marrow progenitor cells toward a pro-metastatic phenotype through MET." Nature Medicine, 18:883-891, 2012.
Percia et al. Adoptive T cell immunotherapy for cancer, Rambam Maimonides Medical Journal, vol. 6, No. 1, pp. 1-9, 2015.
Perdigão et al., "Unexpected features of the dark proteome." Proc Natl Acad Sci U S A., 112:15898-15903, 2015.
Pernasetti et al. "A novel CXCR4 Antagonist IgG1 antibody (PF-06747143) for the treatment of hematological malignancies", Blood, vol. 124, No. 21, pp. 2311, 2014.
Perret et al., "Prolyl hydroxylation of collagen type I is required for efficient binding to integrin alpha 12 beta 1 and platelet glycoprotein VI but not to alpha 2 beta 1." The Journal of Biological Chemistry. 278(32), 29873-29879; 2003.
Pisitkun et al.,"Identification and proteomic profiling of exosomes in human urine." Proc Natl Sci U S A., 101:13368-13373, 2004.
Poulin et al., "4E-BP3, a new member of the eukaryotic initiation factor 4E-binding protein family." J Biol Chem, 273:14002-14007, 1998.
Provenzano, et al., "Enzymatic Targeting of the Strama Ablates Physical Barriers to Treatment of Pancreatic Ductal Adenocarcinoma," Cancer Cell, 21: 418-429.2012.
Qian et al., "The Role of Extracellular Vesicles: An Epigenetic View of the Cancer Movement." BioMed Research International, vol. 2015, Art ID 649161, 2015.

(56) References Cited

OTHER PUBLICATIONS

Qin et al., "Interferon-beta gene therapy inhibits tumor formation and causes regression of established tumors in immune-deficient mice." Proc. Natl. Acad. Sci. U.S.A., 95:14411-14416, 1998.
Qu et al., "Exosomes derived from miR-181-5p-modified adipose-derived mesenchymal stem cells prevent liver fibrosis via autophagy activation.", J Cell Mal Med., 21(10):2491-502, 2017.
Que et al., "Recombinant collagen scaffolds as substrates for human neural stem/progenitor cells" Journal of Biomedical Materials Research 2018, 106(5), 1363-1372.
Quintana et al., "Astrocyte-specific deficiency of interleukin-6 and its receptor reveal specific roles in survival, body weight and behavior," Brain, Behavior, and Immunity, 27:162-173, 2013.
Rachagani et al., "Activated KrasG12D is associated with invasion and metastasis of pancreatic cancer cells through inhibition of E-cadherin." Br. J. Cancer, 104(6):1038-1048, 2011.
Ramunas J., Telomere Extension Using Modified Tert mRNA to Lengthen Healthspan, Stanford University, Dissertation, 2014.
Raposo et al., "Extracellular vesicles: exosomes, microvesicles, and friends." J Cell Biol., 200:373-383, 2013.
Rejiba et al., "K-ras oncogene silencing strategy reduces tumor growth and enhances gemcitabine chemotherapy efficacy for pancreatic cancer treatment." Cancer Science, 98:1128-1136, 2007.
Rhim, et al., "Stromal Elements Act to Restrain, Rather Than Support, Pancreatic Ductal Adenocarcinoma," Cancer Cell, 25: 735-747, 2014.
Roberts et al., "Depletion of stromal cells expressing fibroblast activation protein-alpha from skeletal muscle and bone marrow results in cachexia and anemia," J. Exp. Med., 210:1137-1151, 2013.
Roberts-Pilgrim et al. "Deficient degradation of homotrimeric type I collagen, alpha 1(I) 3 glomerulopathy in oim mice." Mol Genet Metab., vol. 104, No. 3. pp 373-382, Nov. 2011.
Rodriquez et al., Minimal "Self" Peptides That Inhibit Phagocytic Clearance and Enhance Delivery of Nanoparticles. Science, 339: 971-975.
Rong et al. Human bone marrow mesenchymal stem cells-derived exosomes alleviate liver fibrosis through the Wnt/β-catenin pathway, Stem Cell Research & Therapy, vol. 10, No. 1, 2019.
Ronquist et al., "Human prostasomes express glycolytic enzymes with capacity for ATP production." Am J Physiol Endocrinol Metab., 304:E576-582, 2013b.
Ronquist et al., "Prostasomes from four different species are able to produce extracellular adenosine triphosphate (ATP)." Biochim Biophys Acta. 1830:4604-4610, 2013a.
Rothstein et al., "Targeting signal 1 through CD45RB synergizes with CD40 ligand blockade and promotes long term engraftment and tolerance in stringent transplant models." J Immunol, 166:322-329, 2001.
Roy, et al., "HIV Type 1 Can Act as an APC Upon Acquisition from the Host Cell of Peptide-Loaded HLA-DR and CD86 Molecules," Journal of Immunology, 174(8): 4779-4788, 2005.
Ruoslahti, E. "Integrins" The Journal of clinical investigation 1991, 87, 1-5.
Schonhuber, et al., "A Next-Generation Dual-Recombinase System for Time- and Host-Specific Targeting of Pancreatic Cancer," Nature Medicine, 20: 1340-1347, 2014.
Scrace et al., Abstract 700: Investigating KRAS synthetic lethal/co-dependency interactions using siRNA and CRISPR. Cancer Res, 2015, 75 (15_Supplement):700.
Sengupta, et al., "DNA Hypermethylation Near the Transcription Start Site of Collagen Alpha2(1) Gene Occurs in Both Cancer Cell Lines and Primary Colorectal Cancers," Cancer Research, 63: 1789-1797, 2003.
Seymour, et al., "SOX9 is Required for Maintenance of the Pancreatic Progenitor Cell Pool," PNAS, 104(6): 1865-1870, 2007.
Shen et al., "The early cryptic transmission and evolution of SARS-CoV-2 in human hosts." Aug. 2019,https://www.oyeyeah.com/wp-content/uploads/2020/11/SSRN-id3724275.pdf.
Shin-Ichiro et al., "Systematically Injected Exosomes Targeted to EGFR Deliver Antitumor MicroRNA to Breast Cancer Cells." Molecular Therapy, vol. 21 No 1, pp. 185-191, Jan. 2013.
Sidi et al. "Exosomes: provide naturally occurring endogenous nanocarriers for effective drug delivery strategies", Progress in Chemistry, 28(2-3),:353-362, 2016.
Siegel et al., "Cancer statistics 2014." CA Cancer J Clin., 64:9-29, 2014.
Sinkovics et al., "The cell survival pathways of the primordial RNA-DNA complex remain conserved in the extant genomes and may function as proto-oncogenes." Eur J MicrobiolImmunol (Bp)., 5:25-43, 2015.
Skogberg et al., "Characterization of human thymic exosomes." PLoS One, 8(7),:e67554, 2013.
Skoudy et al. "Pancreatic ductal adenocarcinoma and transcription factors: Role of c-Myc", J Gastrointest Cane, vol. 42, pp. 76-84, 2011.
Skolnick et al., "From genes to protein structure and function: novel applications of computational approaches in the genomic era", Trends Biotechnol., 18(1):34-9, 2000.
Sporn et al., "Chemoprevention of Cancer", Carcinogenesis, 21(3):525-530, 2000.
Smakman et al., "Dual effect of Kras(D12) knockdown on tumorigenesis: increased immune-mediated tumor clearance and abrogation of tumor malignancy." Oncogene, 24:8338-8342, 2005.
Smith et al., "Local protein synthesis in neurons." Curr Biol., 11:R901-903, 2001.
Song et al., "Cancer Cell-derived Exosomes Induce Mitogen-activated Protein Kinase dependent Monocyte Survival by Transport of Functional Receptor Tyrosine Kinases." J Biol Chem., 291:8453-8464, 2016.
Spiess et al., "Alternative molecular formats and therapeutic applications for bispecific antibodies", Molecular Immunology, 67:95-106, 2015.
Srinivasan, et al., "TLR-Exosomes Exhibit Distinct Kinetics and Effector Function," Scientific Reports, 7: 41623, 2017.
Steward et al., "Preferential localization of polyribosomes under the base of dendritic spines in granule cells of the dentate gyrus." J Neurosci., 2(3):284-291, 1982.
Stackpole et al. "Cost-effective methylome sequencing of cell-free DNA for accurately detecting and locating cancer", Nature Communications, vol. 13, 2022.
Su et al., "Sorafenib and its derivative SC-1 exhibit antifibrotic effects through signal transducer and activator of transcription 3 inhibition.", Proc Natl Acad Sci USA., 112(23):7243-8, 2015.
Sun et al., "Characterization of the Mutations of the K-ras, p53, p16, and SMAD4 Genes in 15 Human Pancreatic Cancer Cell Lines", Oncology Reports, 8:89-92, 2001.
Suto et al. "Dominant-negative mutant of c-Jun gene transfer: a novel therapeutic strategy for colorectal cancer", Gene Ther 1, 2004.
Syn, N.L., et al. "Exosomes in Cancer Nanomedicine and Immunotherapy: Prospects and Challenges." Trends in Biology, Elsevier Publications. Vo. 35, No. 7, pp. 665-676 (2017).
Takada et al., "The integrins" Genome Biol 2007, 8:215, 9 pages.
Thakuri et al. Biomaterials-Based Approaches to Tumor Spheroid and Organoid Modeling (2017) Adv Healthc Mater., 7(6):1-21, 2017.
Thakur et al. "Double-stranded DNA in exosomes: a novel biomarker in cancer detection", Cell Research, vol. 24, pp. 766-769, 2014.
Theodoraki et al. "Clinical significance of PD-I1 exosomes in plasma of head and neck cancer patients", Clinical Cancer Res, vol. 34, pp. 896-905, 2018.
Thery et al., "Isolation and characterization of exosomes from cell culture supernatants and biological fluids." Curr Protoc Cell Biol., Chapter 3, Unit 3.22, 2006.
Tian, Chenxi et al. "Suppression of pancreatic ductal adenocarcinoma growth and metastasis by fibrillar collagens produced selectively by tumor cells." Nature Communications, vol. 12, No. 1, Apr. 20, 2021.
Tomas et al., "EGF receptor trafficking: consequences for signaling and cancer." Trends Cell Biol., 24:26-34, 2014.
Tyagi et al. "Cancer PPD: a database of anti-cancer peptides and proteins." Nucleic Acids Research, vol. 43, D837-D843, 2015.

(56) References Cited

OTHER PUBLICATIONS

Tzng et al., Current challenges surrounding exosome treatments. J Extracellular Vesicles 2:100023, 2023.

Ung et al. "Exosome proteomics reveals transcriptional regulator proteins with potential to mediate downstream pathways." Cancer Sci., 105:1384-1392, 2014.

Vajdos et al., Comprehensive functional maps of the antigen-binding site of an anti-ErbB2 antibody obtained with shotgun scanning mutagenesis. J Mol Biol.5;320(2):415-28 at 416, 2002.

Velders et al. "The impact of antigen density and antibody affinity on antibody-dependent cellular cytotoxicity: relevance for immunotherapy of carcinomas". British Journal of Cancer 78(4), 478-483), 1998.

Vinas et al., "Human hepatic stellate cells show features of antigen-presenting cells and stimulate lymphocyte proliferation.", Hepatology, 38(4):919-29, 2003.

Von Ahrens et al., "The role of stromal cancer-associated fibroblasts in pancreatic cancer." Journal of hematology & oncology Oct. 2017:76, 8 pages.

Wang et al. "Preparation of Hox40I transfected call and mouse ant-human OX40L monoclonal antibody and study for their biological functions", China Master's Theses, E059-195, No. 1, 2005.

Wang et al., "Hepatoprotective versus oncogenic functions of STAT3 in liver tumorigenesis.", Am J Pathol., 179(2):714-24, 2011.

Wang et al., "Signal transducer and activator of transcription 3 in liver diseases: a novel therapeutic target.", Int J Biol Sci., 7(5):536-50, 2011.

Wang et al., "Exosome-Based Cancer Therapy: Implication for Targeting Cancer Stem Cells." Frontiers In Pharmacology; vol. 7(1):533, 2016.

Wang et al. "High resolution profiling of human exon methylation by liquid hybridization capture-based bisulfite sequencing", *BMC Genomics*, vol. 12, No. 597, 2011.

Warzocha et al., Antisense Strategy: Biological Utility and Prospects in the Treatment of Hematological Malignancies. Leukemia & Lymphoma, 24(3-4):267-281,1997.

Watson et al., "Efficient production and enhanced tumor delivery of engineered extracellular vesicles," Biomaterials, 105:195-205, 2016.

Watts Jk, Corey. "Silencing disease genes in the laboratory and the clinic", J Pathol. Vol. 226, No. 2, pp. 365-379, 2012.

Wen et al. "Genome-scale detection of hypermethylated CpG islands in circulating cell-free DNA of hepatocellular carcinoma patients", *Cell Research*, vol. 25, pp. 1250-1264, 2015.

Westphal et al., "EGFR as a Target for Glioblastoma Treatment: An Unfulfilled Promise." CNS Drugs, 31(9):723-735, 2017.

Whittaker et al., "Quantitative assessment of myocardial collagen with picrosirius red staining and circularly polarized light.", Basic Res Cardiol., 89(5):397-410, 1994.

Willms et al., "Cells release subpopulations of exosomes with distinct molecular and biological properties." Sci Rep., 6:22519, 2016.

Wormann et al., "Loss of P53 Function Activates JAK2-STAT3 Signaling to Promote Pancreatic Tumor Growth, Strama Modification, and Gemcitabine Resistance in Mice and Is Associated With Patient Survival," Gastroenterology, 151:180-193.e12, 2016.

Wykes et al., "Immune checkpoint blockade in infectious diseases." Nat. Rev. Immunology, 18:91-104, 2018.

Xiang, et al., "The HLF/IL-6/STAT3 feedforward circuit drives hepatic stellate cell activation to promote liver fibrosis.", Gut., 67(9):1704-15, 2018.

Xing et al. "Suppression of IL-6 Gene by shRNA Augments gemcitabine chemosensitization in pancreatic adenocarcinoma cells", Biomed Research International, vol. 2018, pp. 1-10, 2018.

Xu et al. "Epidermal growth factor receptor in glioblastoma (Review)", *Oncology Letters*, vol. 14, pp. 512-516, 2017.

Xue et al., Small RNA combination therapy for lung cancer. Proc Natl Acad Sci U S A, 111(34):E3553-3561, 2014.

Xue, et al., The Gatekeeper Effect of Epithelial-mesenchymal Transition Regulates the Frequency of Breast Cancer Metastasis, Cancer Research, 63: 3386-3394, 2003.

Yamada et al., "Cell Infectivity in Relation to Bovine Leukemia Virus gp51 and p24 in Bovine Milk Exosomes." *PLoS One*, 8:e77359, 2013.

Yang et al., "The advances and challenges in utilizing exosomes for delivering cancer therapeutics.", *Front. Pharmacol.*, 9:735, 2018.

Yeh et al., "A tale of two collagen receptors, integrin β1 and discoidin domain receptor 1, in epithelial cell differentiation." Am J Physiol Cell Physiol 2012, 303, C1207-C1217.

Yildiz et al., "Mucus Barriers to Microparticles and Microbes are Altered in Hirschprung's Disease" Macromolecular Bioscience 15(5):712-718, 2015.

Ying et al., "Oncogenic Kras maintains pancreatic tumors through regulation of anabolic glucose metabolism." Cell, 149:656-670, 2012.

Yunzhuo, Ren et al. "The Sirt1 activator, SRT1720, attenuates renal fibrosis by inhibiting CTGF and oxidative stress." International Journal of Molecular Medicine, vol. 39, No. 5, 22, Mar. 2017.

Zhai et al., "A novel technique to prepare a single cell suspension of isolated quiescent human hepatic stellate cells.", Sci Rep., 9(1):12757, 2019.

Zhang et al., "A mechanism for the upregulation of EGF receptor levels in glioblastomas." Cell Rep, 3(6):2008-2020, 2013.

Zhang et al., "Exosome-delivered EGFR regulates liver microenvironment to promote gastric cancer liver metastasis." Nat Commun., 8:15016, 2017.

Zhou et al., "Network Analyst 3.0: a visual analytics platform for comprehensive gene expression profiling and meta-analysis.", Nucleic Acids Res., 47(WI):W234-W41, 2019.

Zhou et al. "Unique somatic variants in DNA from urine exosomes of individuals with bladder cancer", *Molecular Therapy: Methods & Clinical Development*, vol. 22, 2021.

Zilfou et al. "Tumor suppressive functions of p53." Cold Spring Harb Perspect Biol., 1(5):a001883, 2009.

Zorde Khavalesky, et al., "Mutant KRAS is Druggable Target for Pancreatic Cancer," PNAS USA, 110: 20723-20728, 2013.

Zuberek, Ket al., "Comparable in vivo efficacy of CD28/B7, ICOS/GL50, and ICOS/GL50B costimulatory pathways in murine tumor models: IFN & gamma;-dependent enhancement of CTL priming, effector functions, and tumor specific memory CTL", Cellular Immunology, vol. 225, No. 1(1):53-63, 2003.

\* cited by examiner

| | | | | |
|---|---|---|---|---|
| Total Reads | 0 | 20 | 40 | · · ·⋮· 🖸··· 🖸 ·· 80 · |
| Total Passed QC | 0 | 20 | 40 | · · ·⋮· 🖸··· 🖸 ·· 80 · |
| Secondary Alignments | | 20 | 40 | 60 | 80 |
| Supplementary Alignments | | 20 | 40 | 60 | 80 |
| Duplicates | 0 | 20 | · · ·🖸· | 60 ··🖸··· | 80 · |
| Paired in Sequencing | | 20 | 40 | 60 | 80 |
| Self and mate mapped | | 20 | 40 | 60 | 80 |
| Mate mapped to diff chr | | 20 | 40 | 60 | 80 |
| Diff chr (mapQ >= 5) | | 20 | 40 | 60 | 80 |

*FIG. 4*

Distance method: "correlation"; Clustering method: "ward"

Distance method: "correlation"; Clustering method: "ward"

IDENTIFICATION OF EPIGENETIC ALTERATIONS IN DNA ISOLATED FROM EXOSOMES

REFERENCE TO RELATED APPLICATIONS

This present application is a national phase application under 35 U.S.C. § 371 of PCT/US2019/024584 filed on Mar. 28, 2019, which claims the priority benefit of U.S. provisional application No. 62/649,042, filed Mar. 28, 2018, the entire contents of which are incorporated herein by reference.

BACKGROUND

1. Field

The present invention relates generally to the field of medicine and oncology. More particularly, it concerns the detection of methylation marks in exosomes DNA. Even more particularly, it concerns the detection of methylation marks in exosomes DNA in biomarker analysis and treatment of disease.

2. Description of Related Art

Epigenomics, i.e., the study of the complete set of epigenetic modifications on the genetic material of a cell, has revealed that epigenetic modifications (e.g., DNA methylation) can play a role in mammalian development and disease. For example, DNA methylation is implicated in embryonic development, genomic imprinting and X-chromosome inactivation through regulation of transcriptional activity, chromatin structure and chromatin stability (Robertson, 2005). Increased DNA methylation (hypermethylation) at promoter regions of genes can be associated with transcriptional silencing, whereas decreased methylation (hypomethylation) at promoter regions can be associated with increased gene activity. Aberrant methylation patterns can be associated with various human pathologies, including tumor formation and progression (Feinberg and Fogelstein, 1983; Esteller, 2007; Jones and Paylin, 2007). Therefore, analysis of DNA methylation status across the human genome can be of interest.

SUMMARY

Therefore, the present invention provides methods of analyzing and detecting epigenetic changes of genomic DNA found in exosomes isolated from human serum samples. In one embodiment, methods are provided for diagnosing a disease in a patient, the method comprising (a) obtaining a body fluid sample from a patient; (b) isolating an exosomes fraction of the body fluid sample; and (c) determining a methylation or hydroxymethylation status of at least one DNA molecule or a modification of a histone present in the exosomes fraction, wherein if the methylation status corresponds to the methylation or hydroxymethylation status of a disease state, then the patient is diagnosed as having the disease.

In some aspects, the methylation or hydroxymethylation status is the methylation or hydroxymethylation status at a single genomic locus. In some aspects, the methylation or hydroxymethylation status is the methylation or hydroxymethylation status at least 2, 3, 4, 5, 6, 7, 8, 9, 10, 11, 12, 13, 14, 15, 20, 25, 30, 35, 40, 45, or 50 genomic loci. In some aspects, the methylation or hydroxymethylation status is a global methylation or hydroxymethylation fingerprint. In some aspects, the methylation or hydroxymethylation status is hypermethylation. In some aspects, the methylation or hydroxymethylation status is hypomethylation.

In some aspects, the determining step comprises performing reduced representation bisulfite sequencing. In some aspects, the determining step comprises comparing the methylation status to a methylation status known to be associated with the disease.

In some aspects, the patient is in remission and the method is a method of detecting relapse. In some aspects, the body fluid sample is blood, lymph, saliva, sputum, urine, cerebrospinal fluid, bone marrow aspirates, eye exudate/tears, or serum.

In some aspects, the disease is a disease known to be associated with and/or caused by epigenetic changes. In some aspects, the disease is a cancer, a genetic imprinting disorder, a neurological disorder, an autoimmune disease, or a metabolic disorder. In certain aspects, the disease is cancer, wherein the method further comprises isolating glypican 1-containing exosomes from the exosomes fraction. In certain aspects, the cancer is a breast cancer, lung cancer, head & neck cancer, prostate cancer, esophageal cancer, tracheal cancer, brain cancer, liver cancer, bladder cancer, stomach cancer, pancreatic cancer, ovarian cancer, uterine cancer, cervical cancer, testicular cancer, colon cancer, rectal cancer or skin cancer. In some aspects, the genetic imprinting disorder is Angelman's syndrome, Prader-Willi syndrome, or Beckwith-Wiedemann syndrome. In some aspects, the neurological disorder is Alzheimer's disease, autism, Fragile X syndrome, Huntington disease, Parkinson disease, schizophrenia, ATR-X syndrome, ICF syndrome, BWS, Rett syndrome, alpha-Thalassaemia, Rubinstein-Taybi syndrome, or Coffin-Lowry syndrome. In some aspects, the autoimmune disease is systemic lupus erythematosus or rheumatoid arthritis. In some aspects, the metabolic disorder is type 2 diabetes.

In some aspects, the method further comprises administering to the patient a therapeutic agent. In certain aspects, the disease is cancer, wherein the therapeutic agent is an anti-cancer therapy. In some aspects, the patient is a human. In some aspects, the method further comprises performing the method a second time. In certain aspects, the second time is at least one day, one week, or one month after the initial performance of the method.

In some aspects, the method further comprises reporting the diagnosis of the patient. In certain aspects, reporting comprises preparing a written or electronic report. In certain aspects, further comprising providing the report to the patient, a doctor, a hospital, or an insurance company.

As used herein, "essentially free," in terms of a specified component, is used herein to mean that none of the specified component has been purposefully formulated into a composition and/or is present only as a contaminant or in trace amounts. The total amount of the specified component resulting from any unintended contamination of a composition is therefore well below 0.01%. Most preferred is a composition in which no amount of the specified component can be detected with standard analytical methods.

As used herein the specification, "a" or "an" may mean one or more. As used herein in the claim(s), when used in conjunction with the word "comprising," the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

Throughout this application, the term "about" is used to indicate that a value includes the inherent variation of error for the device, the method being employed to determine the value, or the variation that exists among the study subjects.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 4. Alignment rates graphically represented using Samtools Flagstat.

FIG. 11A. is BXPC3. FIG. 11B is Capan1. FIG. 11C is HPDE. FIG. 11D is HPNE. FIG. 11E is MiaPaCa2. FIG. 11F is Panc1. FIG. 11G is PSN1. FIG. 11H is T3M4.

DETAILED DESCRIPTION

Figure 1:
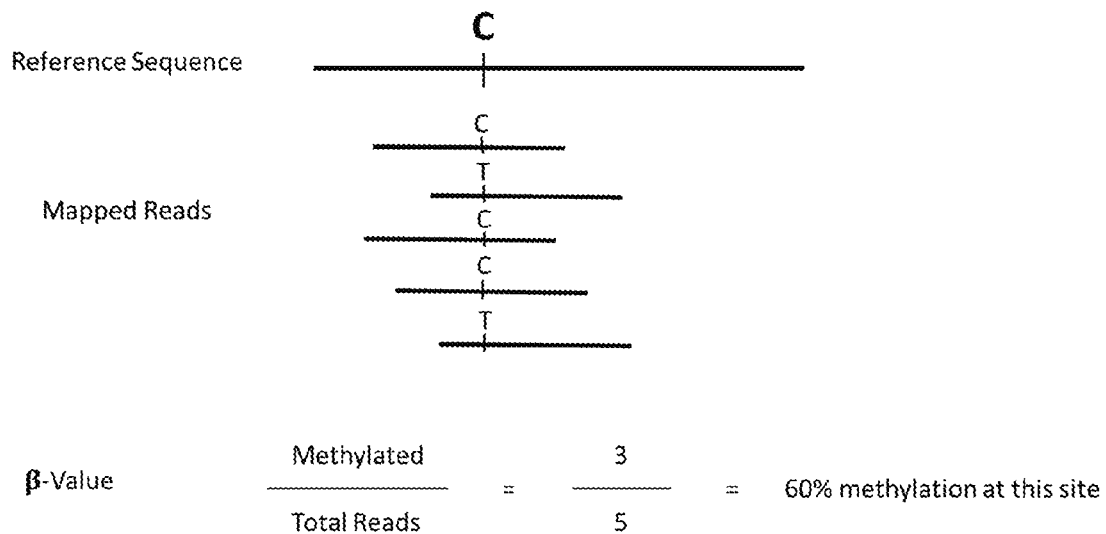
FIG. 1. Reduced representation bisulfite sequencing analysis pipeline.

Exosomal DNA preserves cellular DNA methylation marks, identified by DNA bisulfite sequencing, found in the cells shedding the exosomes. As such, the detection of differential methylation of exosomal DNA from liquid biopsies (blood, urine, saliva, sputum) offers novel precision in early disease detection, differential diagnosis, and disease monitoring and prognosis.

I. EXOSOMES

The terms "microvesicle" and "exosomes," as used herein, refer to a membranous particle having a diameter (or largest dimension where the particles is not spheroid) of between about 10 nm to about 5000 nm, more typically between 30 nm and 1000 nm, and most typically between about 50 nm and 750 nm, wherein at least part of the membrane of the exosomes is directly obtained from a cell. Most commonly, exosomes will have a size (average diameter) that is up to 5% of the size of the donor cell. Therefore, especially contemplated exosomes include those that are shed from a cell.

Exosomes may be detected in or isolated from any suitable sample type, such as, for example, body fluids. As used herein, the term "isolated" refers to separation out of its natural environment and is meant to include at least partial purification and may include substantial purification. As used herein, the term "sample" refers to any sample suitable for the methods provided by the present invention. The sample may be any sample that includes exosomes suitable for detection or isolation. Sources of samples include blood, bone marrow, pleural fluid, peritoneal fluid, cerebrospinal fluid, urine, saliva, amniotic fluid, malignant ascites, broncho-alveolar lavage fluid, synovial fluid, breast milk, sweat, tears, joint fluid, and bronchial washes. In one aspect, the sample is a blood sample, including, for example, whole blood or any fraction or component thereof. A blood sample suitable for use with the present invention may be extracted from any source known that includes blood cells or components thereof, such as venous, arterial, peripheral, tissue, cord, and the like. For example, a sample may be obtained and processed using well-known and routine clinical methods (e.g., procedures for drawing and processing whole blood). In one aspect, an exemplary sample may be peripheral blood drawn from a subject with cancer.

Exosomes may also be isolated from tissue samples, such as surgical samples, biopsy samples, tissues, feces, and cultured cells. When isolating exosomes from tissue sources it may be necessary to homogenize the tissue in order to obtain a single cell suspension followed by lysis of the cells to release the exosomes. When isolating exosomes from tissue samples it is important to select homogenization and lysis procedures that do not result in disruption of the exosomes. Exosomes contemplated herein are preferably isolated from body fluid in a physiologically acceptable solution, for example, buffered saline, growth medium, various aqueous medium, etc.

Exosomes may be isolated from freshly collected samples or from samples that have been stored frozen or refrigerated. In some embodiments, exosomes may be isolated from cell culture medium. Although not necessary, higher purity exosomes may be obtained if fluid samples are clarified before precipitation with a volume-excluding polymer, to remove any debris from the sample. Methods of clarification include centrifugation, ultracentrifugation, filtration, or ultrafiltration. Most typically, exosomes can be isolated by numerous methods well-known in the art. One preferred method is differential centrifugation from body fluids or cell culture supernatants. Exemplary methods for isolation of exosomes are described in (Losche et al., 2004; Mesri and Altieri, 1998; Morel et al., 2004). Alternatively, exosomes may also be isolated via flow cytometry as described in (Combes et al., 1997).

One accepted protocol for isolation of exosomes includes ultracentrifugation, often in combination with sucrose density gradients or sucrose cushions to float the relatively low-density exosomes. Isolation of exosomes by sequential differential centrifugations is complicated by the possibility of overlapping size distributions with other microvesicles or macromolecular complexes. Furthermore, centrifugation may provide insufficient means to separate vesicles based on their sizes. However, sequential centrifugations, when combined with sucrose gradient ultracentrifugation, can provide high enrichment of exosomes.

Isolation of exosomes based on size, using alternatives to the ultracentrifugation routes, is another option. Successful purification of exosomes using ultrafiltration procedures that are less time consuming than ultracentrifugation, and do not require use of special equipment have been reported. Similarly, a commercial kit is available (EXOMIR™, Bioo Scientific) which allows removal of cells, platelets, and cellular debris on one microfilter and capturing of vesicles bigger than 30 nm on a second microfilter using positive pressure to drive the fluid. However, for this process, the exosomes are not recovered, their RNA content is directly extracted from the material caught on the second microfilter, which can then be used for PCR analysis. HPLC-based protocols could potentially allow one to obtain highly pure exosomes, though these processes require dedicated equipment and are difficult to scale up. A significant problem is that both blood and cell culture media contain large numbers of nanoparticles (some non-vesicular) in the same size range as exosomes. For example, some miRNAs may be contained within extracellular protein complexes rather than exosomes; however, treatment with protease (e.g., proteinase K) can be performed to eliminate any possible contamination with "extraexosomal" protein.

In another embodiment, cancer cell-derived exosomes may be captured by techniques commonly used to enrich a sample for exosomes, such as those involving immunospecific interactions (e.g., immunomagnetic capture). Immunomagnetic capture, also known as immunomagnetic cell separation, typically involves attaching antibodies directed to proteins found on a particular cell type to small paramagnetic beads. When the antibody-coated beads are mixed with a sample, such as blood, they attach to and surround the particular cell. The sample is then placed in a strong magnetic field, causing the beads to pellet to one side. After removing the blood, captured cells are retained with the beads. Many variations of this general method are well-known in the art and suitable for use to isolate exosomes. In one example, the exosomes may be attached to magnetic beads (e.g., aldehyde/sulphate beads) and then an antibody is added to the mixture to recognize an epitope on the surface of the exosomes that are attached to the beads. Exemplary proteins that are known to be found on cancer cell-derived exosomes include ATP-binding cassette sub-family A member 6 (ABCA6), tetraspanin-4 (TSPAN4), SLIT and NTRK-like protein 4 (SLITRK4), putative protocadherin beta-18 (PCDHB18), myeloid cell surface antigen CD33 (CD33), and glypican-1 (GPC1) (U.S. Pat. No. 9,921, 223, which is incorporated herein by reference in its entirety). Cancer cell-derived exosomes may be isolated using, for example, antibodies or aptamers to one or more of these proteins.

As used herein, analysis includes any method that allows direct or indirect visualization of exosomes and may be in vivo or ex vivo. For example, analysis may include, but not limited to, ex vivo microscopic or cytometric detection and visualization of exosomes bound to a solid substrate, flow cytometry, fluorescent imaging, and the like. In an exemplary aspect, cancer cell-derived exosomes are detected using antibodies directed to one or more of ATP-binding cassette sub-family A member 6 (ABCA6), tetraspanin-4 (TSPAN4), SLIT and NTRK-like protein 4 (SLITRK4), putative protocadherin beta-18 (PCDHB18), myeloid cell surface antigen CD33 (CD33), glypican-1 (GPC1), Histone H2A type 2-A (HIST1H2AA), Histone H2A type 1-A (HIST1H1AA), Histone H3.3 (H3F3A), Histone H3.1 (HIST1H3A), Zinc finger protein 37 homolog (ZFP37), Laminin subunit beta-1 (LAMB1), Tubulointerstitial nephritis antigen-like (TINAGL1), Peroxiredeoxin-4 (PRDX4), Collagen alpha-2(IV) chain (COL4A2), Putative protein C3P1 (C3P1), Hemicentin-1 (HMCN1), Putative rhophilin-2-like protein (RHPN2P1), Ankyrin repeat domain-containing protein 62 (ANKRD62), Tripartite motif-containing protein 42 (TRIM42), Junction plakoglobin (JUP), Tubulin beta-2B chain (TUBB2B), Endoribonuclease Dicer (DICER1), E3 ubiquitin-protein ligase TRIM71 (TRIM71), Katanin p60 ATPase-containing subunit A-like 2 (KATNAL2), Protein S100-A6 (S100A6), 5'-nucleotidase domain-containing protein 3 (NT5DC3), Valine-tRNA ligase (VARS), Kazrin (KAZN), ELAV-like protein 4 (ELAVL4), RING finger protein 166 (RNF166), FERM and PDZ domain-containing protein 1 (FRMPD1), 78 kDa glucose-regulated protein (HSPA5), Trafficking protein particle complex subunit 6A (TRAPPC6A), Squalene monooxygenase (SQLE), Tumor susceptibility gene 101 protein (TSG101), Vacuolar protein sorting 28 homolog (VPS28), Prostaglandin F2 receptor negative regulator (PTGFRN), Isobutyryl-CoA dehydrogenase, mitochondrial (ACAD8), 26S protease regulatory subunit 6B (PSMC4), Elongation factor 1-gamma (EEF1G), Titin (TTN), Tyrosine-protein phosphatase type 13 (PTPN13), Triosephosphate isomerase (TPI1), or Carboxypeptidase E (CPE) and subsequently bound to a solid substrate and/or visualized using microscopic or cytometric detection.

It should be noted that not all proteins expressed in a cell are found in exosomes secreted by that cell. For example, calnexin, GM130, and LAMP-2 are all proteins expressed in MCF-7 cells but not found in exosomes secreted by MCF-7 cells (Baietti et al., 2012). As another example, one study found that 190/190 pancreatic ductal adenocarcinoma patients had higher levels of GPC1+ exosomes than healthy controls (Melo et al., 2015, which is incorporated herein by reference in its entirety). Notably, only 2.3% of healthy controls, on average, had GPC1+ exosomes.

A. Exemplary Protocol for Collecting Exosomes from Cell Culture

On Day 1, seed enough cells (e.g., about five million cells) in T225 flasks in media containing 10% FBS so that the next day the cells will be about 70% confluent. On Day 2, aspirate the media on the cells, wash the cells twice with PBS, and then add 25-30 mL base media (i.e., no PenStrep or FBS) to the cells. Incubate the cells for 24-48 hours. A 48 hour incubation is preferred, but some cells lines are more sensitive to serum-free media and so the incubation time should be reduced to 24 hours. Note that FBS contains exosomes that will heavily skew NanoSight results.

On Day 3/4, collect the media and centrifuge at room temperature for five minutes at 800×g to pellet dead cells and large debris. Transfer the supernatant to new conical tubes and centrifuge the media again for 10 minutes at 2000×g to remove other large debris and large vesicles. Pass the media through a 0.2 μm filter and then aliquot into ultracentrifuge tubes (e.g., 25×89 mm Beckman Ultra-Clear) using 35 mL per tube. If the volume of media per tube is less than 35 mL, fill the remainder of the tube with PBS to reach 35 mL. Ultracentrifuge the media for 2-4 hours at 28,000 rpm at 4° C. using a SW 32 Ti rotor (k-factor 266.7, RCF max 133,907). Carefully aspirate the supernatant until there is roughly 1-inch of liquid remaining. Tilt the tube and allow remaining media to slowly enter aspirator pipette. If desired, the exosomes pellet can be resuspended in PBS and the ultracentrifugation at 28,000 rpm repeated for 1-2 hours to further purify the population of exosomes.

Finally, resuspend the exosomes pellet in 210 μL PBS. If there are multiple ultracentrifuge tubes for each sample, use the same 210 μL PBS to serially resuspend each exosomes pellet. For each sample, take 10 μL and add to 990 μL $H_2O$ to use for nanoparticle tracking analysis. Use the remaining 200 μL exosomes-containing suspension for downstream processes or immediately store at −80° C.

B. Exemplary Protocol for Extracting Exosomes from Serum Samples

First, allow serum (or other body fluid) samples to thaw on ice. Then, dilute 250 μL of cell-free serum samples in 11 mL PBS; filter through a 0.2 μm pore filter. Ultracentrifuge the diluted sample at 150,000×g overnight at 4° C. The following day, carefully discard the supernatant and wash the exosomes pellet in 11 mL PBS. Perform a second round of ultracentrifugation at 150,000×g at 4° C. for 2 hours. Finally, carefully discard the supernatant and resuspend the exosomes pellet in 100 μL PBS for analysis.

II. DNA METHYLATION

The term "CpG island," as used herein, refers to any DNA region wherein the calculated CG % composition is over 50%.

The term "methylation biomarker," "disease-specific methylated restriction site pattern," or "methylation fingerprint," as used herein, refers to any sequence of nucleotides, preferably CpG rich, where the 5' position of any cytosine base becomes methylated. These regions may be found in any nucleotide sequence including, but not limited to, promoters, regulatory elements, enhancers, and gene coding sequences. Changes in any methylation fingerprint may be an indicator of genome instability and may be useful in the diagnosis of disease. Without being bound by any theory, changes in a methylation fingerprint may alter the accessibility of the DNA binding proteins to bind to the DNA.

The term "hypomethylation," as used herein, refers to the presence of any cytosine in a CG or CNG di- or tri-nucleotide site that does not contain a 5' methyl group.

The term "hypermethylation," as used herein, refers to the presence any cytosine in a CG or CNG di- or tri-nucleotide site that does contain a 5' methyl group.

The term "global methylation," as used herein, refers to genome-wide methylation events associated with all CG dinucleotides, all restriction enzyme cutting sites for specific methylation sensitive/insensitive enzyme(s), or all priming events with statistically designed primer set(s).

Epigenetics may be defined as a stable and potentially heritable form of cellular information that influences gene expression but does not involve a change in the DNA sequence (i.e., is non-mutagenic). This cellular information is in the form of covalent modifications applied to histones and nucleic acids. In histone proteins, one form of this cellular information may be exemplified by post-translation modifications including, but not limited to, phosphorylation, acetylation, methylation, poly-ADP ribosylation and ubiquination. In nucleic acids, one form of this cellular information may be exemplified by nucleic acids comprising 5' methylated cytosines.

There are at least three inter-related types of epigenetic inheritance: i) nucleic acid methylation; ii) genomic imprinting; and iii) histone protein modification. Nucleic acid methylation occurs at CpG dinucleotides and plays a role in the regulation of gene expression as well as the silencing of repeat elements in the genome. Genomic imprinting comprises parent-of-origin-specific allele silencing mediated by differentially methylated regions within or near imprinted genes that may be normally reprogrammed in the germline. Histone modifications include, but are not limited to, methylation, acetylation, and phosphorylation are involved in transcriptional regulation wherein many histone modifications are stably maintained during cell division. Enzymes that mediate histone modifications are often associated within the same genomic complexes as those that regulate nucleic acid methylation (i.e., for example, CpG Islands).

Epigenetic regulation at the nucleic acid level has been reported to be mediated by covalent modifications (i.e., for example, 5' cytosine methylation). For example, a methyl group may be added to a cytosine carbon-5 position that is part of a symmetrical group of CpG dinucleotides. Many 5-methylcytosines have been found in retrotransposons, endogenous retroviruses, and repetitive sequences, which may have evolved as a host defense mechanism to prevent the mobilization of these elements and reduce the occurrence of chromosomal rearrangements.

Unmethylated CpG dinucleotides may be found in short CpG-rich sequences, commonly referred to as CpG islands. CpGiIslands have been observed to cluster in or around promoter regions of genes. Over 40% of protein encoding genes have at least one CpG island that is found within the vicinity of their promoters.

CpG island methylation may reduce the competency of expression of nearby genes. Further, if hypermethylation occurs, it is possible that the gene might become completely switched off. Consequently, epigenetic regulation may be able to respond to environmental influences by gradually changing a gene's methylation status. The removal of such environmental influences would then be expected to reverse a gene's methylation status and appropriately adjust the expression profile of that gene in the cell. Thus, epigenetic regulation may be elastic in nature and able to dynamically respond to fluctuations in the environment. It is not believed that a nucleic acid genotype is capable of such a control system.

Since epigenetic regulation may exert an influence on genotypic expression, this capability has the potential to activate an at-risk gene haplotype or a protective gene haplotype. Consequently, epigenetic modification of genotypic expression may help to explain the broad spectrum of phenotypes observed in patients affected with complex diseases (i.e., for example, cancer).

Data supporting a link between nucleic acid instability and disease is becoming increasingly stronger. For instance, epigenetic nucleic acid regulation plays a part in the physiologic and pathologic events associated with aging and cancer.

To maintain the stability of the genome, two major alterations in nucleic acid methylation have been observed: hypomethylation and hypermethylation. In some diseases, one or the other of these methylation states may be prevalent depending upon the gene locus. In neoplasia, for example, an overall genomic hypomethylation is present, in conjunction with a hypermethylation of promoter-associated CpG islands. The hypomethylated state is believed to silence some tumor-suppressive gene activity. Consequently, both hypomethylation and hypermethylation represent epigenetic dysregulation that is responsible for the development, expression and maintenance of cancer and/or tumors.

Genome-wide (global) loss of 5'-methyl cytosine is one of the earliest molecular abnormalities described in human neoplasia. Global demethylation has been shown to occur mostly outside of promoters in CpG-depleted areas as well as in repetitive elements and pericentric bulk DNA. Hypomethylation has mechanistic implications and can play a role in neoplasia through the activation and over-expression of growth promoting genes (i.e., for example, HRAS). Also, hypomethylation has been shown to play a role in the induction of chromosomal instability leading to neoplasia. The pericentromeric satellite regions are vulnerable to hypomethylation causing unbalanced chromosomal translocations, which have been observed in ovarian and breast carcinomas. Hypomethylation of L1 retrotransposons has been shown to be correlated with chromosomal instability colorectal cancer cell lines.

Sixty percent of expressed genes have 5' regions and upstream promoters that are located in 0.5 to 3.0 Kb nucleic acid stretches unusually rich in CpG dinucleotides. These clusters of CpG sites are known as CpG Islands and are generally free of DNA methylation. De novo nucleic acid methylation of gene promoters has been a consistent abnormality in human neoplasia. Promoter methylation has been linked to the inactivation of tumor-suppressor genes (i.e., for example, RB1, P16, BRCA1 and VHL), DNA repair genes (i.e., for example, hMLH1 and MGMT), angiogenesis inhibitors (i.e., for example, THBS1), and growth regulators (i.e., for example, ER and PGR).

For example, hypermethylated biomarkers to detect cancer can include: For acute lymphoblastic leukemia, DLC-1, PCDHGA12A, CDH1, HOXD10, RPIB9, CD44, COX2, SOX2, KLF4, SLC26A, RECK, HOXA9, HOXD11, HOXA6, ADAM12, and HOXC4; for chronic lymphocytic leukemia, DLC-1, PCDHGA12A, HOXD10, CD44, COX2, HOXA9, HOXA4, HOXD11, and HOXA6; for follicular lymphoma, DLC-1, PCDHGA12A, CDH1, HOXD10, RPIB9, COX2, KLF4, HOXA9, HOXA6, HOXC4, and SLC26A4; for mantle cell lymphoma, DLC-1, PCDHGA12A, HOXD10, HOXA9, HOXD11, and HOXA6; for Burkett lymphoma, DLC-1, PCDHGA12A, CDH1, HOXD10, RPIB9, CD44, COX2, KLF4, HOXA9, HOXD11, HOXA6, HOXC4, and SLC26A4; for diffuse large B-cell lymphoma, DLC-1, PCDHGA12A, CDH1, HOXD10, RPIB9, COX2, KLF4, HOXA6, and SLC26A4; for multiple myeloma, DLC-1, PCDHGA12A, CDH1, COX2, KLF4, HOXA9, HOXD11, HOXA6, HOXC4, HOXD10, and SLC26A; for acute myeloid leukemia, PCDHGA12A, CDH1, HOXD10, CD44, CXCR1, KLF4, SLC26A, CDH13, HOXA9, HOXD11, HOXA6, HOXC4, ADAM12, and SLC26A4; for myelodysplastic syndrome, PCDHGA12A, SOCS-1, and HIN1; for breast cancer, DLC-1, PCDHGA12A, HOXD10, RPIB9, COX2, RECK, HOXA11, HOXA7, HOXA9, HOXD9, HOXD11, PCDHB15, PCDHA6, PCDHA13, PTPN6, HIC1, CDH13, GSTP1, ADAM12, p16, GABRBA, and APC; for lung cancer, PCDHGA12A, HOXD10, HOXA7, HOXA6, HOXA9, PCDHB15, PCDHA6, PCDHA13, PTPN6, GSTP1, and HIC1; for colon cancer, DLC-1, PCDHGA12A, HOXD10, RPIB9, CD44, COX2, SOX2, CXCR1, SLC26A, RECK, HOXA7, HOXA6, HOXA9, PCDHB15, PCDHA6, PCDHA13, PTPN6, ADAM12, p16, and HIC1; for ovarian cancer, PCDHGA12A, HOXD10, SLC26A, CDH13, and RECK; for prostate cancer, PCDHGA12A, HOXD10, COX2, HOXA7, HOXA6, HOXA9, HOXD11, HOXD9, PCDHB15, PCDHA6, PTPN6, HIC1, APC, CDH13, CDH5, HOXA11, GSTP1, p16, GABRBA, and HOXA7; and for melanoma, PCDHGA12A, HOXD10, KLF4, and COX2.

Additional diseases and disorders associated with known loci of methylation changes include genetic imprinting disorders, such as Prader-Willi syndrome (1511-13 region of human chromosome 15, small nuclear ribonuclearprotein polypeptide N (SNRPN)), Angelman syndrome (15q11-q13 region of human chromosome 15, small nuclear ribonuclearprotein polypeptide N (SNRPN)), Beckwith-Wiedemann syndrome (chromosome region 11p15.5, loss of methylation at DMR2), and Silver-Russell syndrome (chromosome region Ip15.5, loss of methylation at DMR2); and neurodevelopmental disorders, such as Autism spectrum disorder (proline-rich transmembrane protein 1 (PRRT1)).

In addition, methylation signatures for these and other disease or disorders can be identifying by examining the methylation marks in exosomes isolated from patients known to have a certain disease or disorder.

Modification of histones by methylation, acetylation and phosphorylation has been shown to play a role in maintaining the stability of the genome by silencing genes. However, silencing inappropriate genes by histone modification can have adverse effects. For example, the methylation of lysine 9 (Lys9) of histone H3 has been shown to silence the CDKN2A tumor suppressor gene in some cancer cells.

The machinery that is responsible for the modification of chromatin and nucleic acids work in a co-operative manner to silence genes in normal and malignant cells. There is evidence to indicate that there is cross-talk between histone and nucleic acid methylation machinery that makes this multi-protein complex a likely target for environmental carcinogens. (Feinberg A P. 2004. Seminars in Cancer Biology 14:427-432).

Methods to detect global methylation and methylation biomarkers include those provided in U.S. Pat. Appln. Pubn. US2007/0292866, which is incorporated by reference herein in its entirety. Methods for measuring DNA methylation at specific genomic loci include, for example, immunoprecipitation of methylated DNA, methyl-binding protein enrichment of methylated fragments, digestion with methylation-insensitive restriction enzymes, and bisulfite conversion followed by Sanger sequencing (reviewed in Laird, Nat Review Genet 11: 191-203, 2010). Bisulfite treatment can convert unmethylated cytosine residues into uracils (the readout of which can be thymine after amplification with a polymerase). Methylcytosines can be protected from conversion by bisulfitetreatment to uracils. Following bisulfite treatment, methylation status of a given cytosine residue can be inferred by comparing the sequence to an unmodified reference sequence.

Techniques have been developed for profiling methylation status of the whole genome, i.e., the methylome, at a single-base resolution using high throughput sequencing technologies. Bisulfite conversion of genomic DNA combined with next generation sequencing (NGS), or BS-seq, is one strategy. Because of the high cost still associated with genome-wide methylation sequencing, variations of BS-seq technology that enable genome partitioning to enrich for regions of interest can be used. One such variation is reduced representation BS-seq (RRBS), which can involve digestion of a DNA sample with a methylation-insensitive restriction endonuclease that has CpG dinucleotide as a part of its recognition site, followed by bisulfite sequencing of the selected fragments (Meissner et al., *Nucleic Acids Res.* 33(18):5868-5877, 2005). RRBS provides less coverage than whole genome bisulfite sequencing, but allows the researcher to obtain quantitative DNA methylation information across many features with approximately 50-fold fewer sequencing reads, resulting in substantial sequencing cost reduction. Since the RRBS technique was first described (Meissner, et al. (2005) *Nucleic Acids Res* 33(18):5868, which is incorporated herein by reference in its entirety), there have been many enhancements and improvements (see for example, Boyle, et al. (2012) *Genome Biol* 13:R92). One approach utilizes the methylation insensitive restriction enzyme MspI, which recognizes CCGG. As a result of partial fragmentation during bisulfite conversion, PCR, and efficiency of cluster generation, only a subset of these fragments, typically under 300 bp in length, can be sequenced. However these smaller fragments are derived from genomic DNA that has a high frequency of MspI sites and therefore a high frequency of potential CpG methylation sites. See U.S. Pat. Appln. Publn. US2015/0284769, which is incorporated herein by reference in its entirety.

III. DIAGNOSIS, PROGNOSIS, AND TREATMENT OF DISEASES

Detection, isolation, and characterization of exosomes, using the methods of the invention, is useful in assessing disease diagnosis and prognosis and in monitoring therapeutic efficacy for early detection of treatment failure that may lead to disease relapse. In addition, exosomes analysis according to the invention enables the detection of early relapse in presymptomatic patients who have completed a course of therapy. This is possible because the presence of diseased cell-derived exosomes may be associated and/or correlated with disease progression, poor response to therapy, relapse of disease, and/or decreased survival over a period of time. Thus, enumeration and characterization of exosomes provides methods to stratify patients for baseline characteristics that predict initial risk and subsequent risk based upon response to therapy.

For example, cancer cell-derived exosomes isolated according to the methods disclosed above may be analyzed to diagnose or prognose cancer in the subject. As such, the methods of the present invention may be used, for example, to evaluate cancer patients and those at risk for cancer by comparing the methylation states of cancer cell-derived exosomes and exosomes originated from non-cancerous cells. In any of the methods of diagnosis or prognosis described herein, either the presence or the absence of one or more indicators of cancer, such as a cancer-specific methylation mark or signature, or of any other disorder, may be used to generate a diagnosis or prognosis.

In one aspect, a body fluid (e.g., blood, urine, saliva, etc.) sample is drawn from the patient and disease cell-derived exosomes are detected and/or isolated as described herein. For example, the exosomes may be labeled with one or more antibodies or aptamers that bind to ATP-binding cassette sub-family A member 6 (ABCA6), tetraspanin-4 (TSPAN4), SLIT and NTRK-like protein 4 (SLITRK4), putative protocadherin beta-18 (PCDHB18), myeloid cell surface antigen CD33 (CD33), and/or glypican-1 (GPC1), and the antibodies may have a covalently bound fluorescent label. Analysis may then be performed to determine the number and characterization of cancer cell-derived exosomes in the sample, and from this measurement, the number of cancer cell-derived exosomes present in the initial blood sample may be determined. Exosomes identified as cancer cell-derived exosomes may be verified as such through the detection of a second (or more) marker known to be found selectively or specifically in cancer cell-derived exosomes, such as, for example, Histone H2A type 2-A (HIST1H2AA), Histone H2A type 1-A (HIST1H1AA), Histone H3.3 (H3F3A), Histone H3.1 (HIST1H3A), Zinc finger protein 37 homolog (ZFP37), Laminin subunit beta-1 (LAMB1), Tubulointerstitial nephritis antigen-like (TINAGL1), Peroxiredoxin-4 (PRDX4), Collagen alpha-2(IV) chain (COL4A2), Putative protein C3P1 (C3P1), Hemicentin-1 (HMCN1), Putative rhophilin-2-like protein (RHPN2P1), Ankyrin repeat domain-containing protein 62 (ANKRD62), Tripartite motif-containing protein 42 (TRIM42), Junction plakoglobin (JUP), Tubulin beta-2B chain (TUBB2B), Endoribonuclease Dicer (DICER1), E3 ubiquitin-protein ligase TRIM71 (TRIM71), Katanin p60 ATPase-containing subunit A-like 2 (KATNAL2), Protein S100-A6 (S100A6), 5'-nucleotidase domain-containing protein 3 (NT5DC3), Valine-tRNA ligase (VARS), Kazrin (KAZN), ELAV-like protein 4 (ELAVL4), RING finger protein 166 (RNF166), FERM and PDZ domain-containing protein 1 (FRMPD1), 78 kDa glucose-regulated protein (HSPA5), Trafficking protein particle complex subunit 6A (TRAPPC6A), Squalene monooxygenase (SQLE), Tumor susceptibility gene 101 protein (TSG101), Vacuolar protein sorting 28 homolog (VPS28), Prostaglandin F2 receptor negative regulator (PTGFRN), Isobutyryl-CoA dehydrogenase, mitochondrial (ACAD8), 26S protease regulatory subunit 6B (PSMC4), Elongation factor 1-gamma (EEF1G), Titin (TTN), Tyrosine-protein phosphatase type 13 (PTPN13), Triosephosphate isomerase (TPI1), or Carboxypeptidase E (CPE). The number of cancer cell-derived exosomes may be determined by cytometric or microscopic techniques to visually quantify and characterize the exosomes. Cancer cell-derived exosomes may be detected and quantified by other methods known in the art (e.g., ELISA).

In various aspects, analysis of a subject's cancer cell-derived exosomes number and methylation signature characterization may be made over a particular time course in various intervals to assess a subject's progression and pathology. For example, analysis may be performed at regular intervals such as one day, two days, three days, one week, two weeks, one month, two months, three months, six months, or one year, in order to track the level and characterization of cancer cell-derived exosomes as a function of time. In the case of existing cancer patients, this provides a useful indication of the progression of the disease and assists medical practitioners in making appropriate therapeutic choices based on the increase, decrease, or lack of change in cancer cell-derived exosomes. Any increase, be it 2-fold, 5-fold, 10-fold or higher, in cancer cell-derived exosomes over time decreases the patient's prognosis and is an early indicator that the patient should change therapy. Similarly, any increase, be it 2-fold, 5-fold, 10-fold or higher, indicates that a patient should undergo further testing such as imaging to further assess prognosis and response to therapy. Any decrease, be it 2-fold, 5-fold, 10-fold or higher, in cancer cell-derived exosomes over time shows disease stabilization and a patient's response to therapy, and is an indicator to not change therapy. For those at risk of cancer, a sudden increase in the number of cancer cell-derived exosomes detected may provide an early warning that the patient has developed a tumor thus providing an early diagnosis. In one embodiment, the detection of cancer cell-derived exosomes increases with the staging of the cancer.

In any of the methods provided herein, additional analysis may also be performed to characterize cancer cell-derived exosomes to provide additional clinical assessment. For example, in addition to image analysis and bulk number measurements, PCR techniques may be employed, such as multiplexing with primers specific for particular cancer markers to obtain information such as the type of tumor from which the cancer cell-derived exosomes originated, metastatic state, and degree of malignancy. Additionally, DNA or RNA analysis, proteome analysis, or metabolome analysis may be performed as a means of assessing additional information regarding characterization of the patient's cancer.

For example, an epigenetic analysis may provide data sufficient to make determinations of responsiveness of a subject to a particular therapeutic regime, or for determining the effectiveness of a candidate agent in the treatment of cancer. Accordingly, the present invention provides a method of determining responsiveness of a subject to a particular therapeutic regime or determining the effectiveness of a candidate agent in the treatment of cancer by detecting/isolating cancer cell-derived exosomes of the subject as described herein and analyzing said cancer cell-derived exosomes. For example, once a drug treatment is administered to a patient, it is possible to determine the efficacy of the drug treatment using the methods of the invention. For example, a sample taken from the patient before the drug treatment, as well as one or more samples taken from the patient concurrently with or subsequent to the drug treatment, may be processed using the methods of the invention. By comparing the results of the analysis of each processed sample, one may determine the efficacy of the drug treatment or the responsiveness of the patient to the agent. In this manner, early identification may be made of failed compounds or early validation may be made of promising compounds.

Certain aspects of the present invention can be used to prevent or treat a disease or disorder based on the presence of methylation marks found in genomic DNA isolated from exosomes. Certain aspects of the present invention provide for treating a patient with exosomes that express or comprise a therapeutic agent or a diagnostic agent. A "therapeutic agent" as used herein is an atom, molecule, or compound that is useful in the treatment of cancer or other conditions. Examples of therapeutic agents include, but are not limited to, drugs, chemotherapeutic agents, therapeutic antibodies and antibody fragments, toxins, radioisotopes, enzymes, nucleases, hormones, immunomodulators, antisense oligonucleotides, chelators, boron compounds, photoactive agents, and dyes. A "diagnostic agent" as used herein is an atom, molecule, or compound that is useful in diagnosing, detecting or visualizing a disease. According to the embodiments described herein, diagnostic agents may include, but are not limited to, radioactive substances (e.g., radioisotopes, radionuclides, radiolabels or radiotracers), dyes, contrast agents, fluorescent compounds or molecules, bioluminescent compounds or molecules, enzymes and enhancing agents (e.g., paramagnetic ions).

In some aspects, a therapeutic recombinant protein may be a protein having an activity that has been lost in a cell of the patient, a protein having a desired enzymatic activity, a protein having a desired inhibitory activity, etc. For example, the protein may be a transcription factor, an enzyme, a proteinaceous toxin, an antibody, a monoclonal antibody, etc. The monoclonal antibody may specifically or selectively bind to an intracellular antigen. The monoclonal antibody may inhibit the function of the intracellular antigen and/or disrupt a protein-protein interaction. Other aspects of the present invention provide for diagnosing a disease based on the presence of certain methylation marks found in the DNA of cancer cell-derived exosomes in a patient sample.

The term "subject" as used herein refers to any individual or patient to which the subject methods are performed. Generally the subject is human, although as will be appreciated by those in the art, the subject may be an animal. Thus other animals, including mammals, such as rodents (including mice, rats, hamsters, and guinea pigs), cats, dogs, rabbits, farm animals (including cows, horses, goats, sheep, pigs, etc.), and primates (including monkeys, chimpanzees, orangutans, and gorillas) are included within the definition of subject.

"Treatment" and "treating" refer to administration or application of a therapeutic agent to a subject or performance of a procedure or modality on a subject for the purpose of obtaining a therapeutic benefit of a disease or health-related condition. For example, a treatment may include administration of chemotherapy, immunotherapy, or radiotherapy, performance of surgery, or any combination thereof.

The term "therapeutic benefit" or "therapeutically effective" as used herein refers to anything that promotes or enhances the well-being of the subject with respect to the medical treatment of this condition. This includes, but is not limited to, a reduction in the frequency or severity of the signs or symptoms of a disease. For example, treatment of cancer may involve, for example, a reduction in the invasiveness of a tumor, reduction in the growth rate of the cancer, or prevention of metastasis. Treatment of cancer may also refer to prolonging survival of a subject with cancer.

It is also recognized that the present invention may also be used to diagnose a non-cancerous disease, and in particular to diagnose any disease known to be associated with alterations in DNA methylation. See Jin and Liu, *Genes & Diseases*, 5:1-8, 2018, which is incorporated herein by reference in its entirety, for a review of human diseases associated with alterations in DNA methylation. For example, the present invention may be used to diagnose an autoimmune disease (e.g., rheumatoid arthritis, systemic lupus erythematosus, multiple sclerosis), a metabolic disorder (hyperglycemis, hyperlipidemia, cardiovascular disease, diabetes), a neurological disease (e.g., autism spectrum disorder, Rett symdrome, Parkinson's disease, schizophrenia), or a psychological disorder.

An effective response of a patient or a patient's "responsiveness" to treatment refers to the clinical or therapeutic benefit imparted to a patient at risk for, or suffering from, a disease or disorder. Such benefit may include cellular or biological responses, a complete response, a partial response, a stable disease (without progression or relapse), or a response with a later relapse. For example, an effective response can be reduced tumor size or progression-free survival in a patient diagnosed with cancer.

Treatment outcomes can be predicted and monitored and/or patients benefiting from such treatments can be identified or selected via the methods described herein.

Regarding neoplastic condition treatment, depending on the stage of the neoplastic condition, neoplastic condition treatment involves one or a combination of the following therapies: surgery to remove the neoplastic tissue, radiation therapy, and chemotherapy. Other therapeutic regimens may be combined with the administration of the anticancer agents, e.g., therapeutic compositions and chemotherapeutic agents. For example, the patient to be treated with such anti-cancer agents may also receive radiation therapy and/or may undergo surgery.

For the treatment of disease, the appropriate dosage of a therapeutic composition will depend on the type of disease to be treated, as defined above, the severity and course of the disease, the patient's clinical history and response to the agent, and the discretion of the attending physician. The agent is suitably administered to the patient at one time or over a series of treatments.

Therapeutic and prophylactic methods and compositions can be provided in a combined amount effective to achieve the desired effect. A tissue, tumor, or cell can be contacted with one or more compositions or pharmacological formulation(s) comprising one or more of the agents, or by contacting the tissue, tumor, and/or cell with two or more distinct compositions or formulations. Also, it is contemplated that such a combination therapy can be used in conjunction with chemotherapy, radiotherapy, surgical therapy, or immunotherapy.

In some aspects, the disease is a cancer. The term "cancer," as used herein, may be used to describe a solid tumor, metastatic cancer, or non-metastatic cancer. In certain embodiments, the cancer may originate in the bladder, blood, bone, bone marrow, brain, breast, colon, esophagus, duodenum, small intestine, large intestine, colon, rectum, anus, gum, head, kidney, liver, lung, nasopharynx, neck, ovary, pancreas, prostate, skin, stomach, testis, tongue, or uterus.

The cancer may specifically be of the following histological type, though it is not limited to these: neoplasm, malignant; carcinoma; carcinoma, undifferentiated; giant and spindle cell carcinoma; small cell carcinoma; papillary carcinoma; squamous cell carcinoma; lymphoepithelial carcinoma; basal cell carcinoma; pilomatrix carcinoma; transitional cell carcinoma; papillary transitional cell carcinoma; adenocarcinoma; gastrinoma, malignant; cholangiocarcinoma; hepatocellular carcinoma; combined hepatocellular carcinoma and cholangiocarcinoma; trabecular adenocarcinoma; adenoid cystic carcinoma; adenocarcinoma in adenomatous polyp; adenocarcinoma, familial polyposis coli; solid carcinoma; carcinoid tumor, malignant; branchiolo-alveolar adenocarcinoma; papillary adenocarcinoma; chromophobe carcinoma; acidophil carcinoma; oxyphilic adenocarcinoma; basophil carcinoma; clear cell adenocarcinoma; granular cell carcinoma; follicular adenocarcinoma; papillary and follicular adenocarcinoma; nonencapsulating sclerosing carcinoma; adrenal cortical carcinoma; endometroid carcinoma; skin appendage carcinoma; apocrine adenocarcinoma; sebaceous adenocarcinoma; ceruminous adenocarcinoma; mucoepidermoid carcinoma; cystadenocarcinoma; papillary cystadenocarcinoma; papillary serous cystadenocarcinoma; mucinous cystadenocarcinoma; mucinous adenocarcinoma; signet ring cell carcinoma; infiltrating duct carcinoma; medullary carcinoma; lobular carcinoma; inflammatory carcinoma; paget's disease, mammary; acinar cell carcinoma; adenosquamous carcinoma; adenocarcinoma w/squamous metaplasia; thymoma, malignant; ovarian stromal tumor, malignant; thecoma, malignant; granulosa cell tumor, malignant; androblastoma, malignant; sertoli cell carcinoma; leydig cell tumor, malignant; lipid cell tumor, malignant; paraganglioma, malignant; extramammary paraganglioma, malignant; pheochromocytoma; glomangiosarcoma; malignant melanoma; amelanotic melanoma; superficial spreading melanoma; malignant melanoma in giant pigmented nevus; epithelioid cell melanoma; blue nevus, malignant; sarcoma; fibrosarcoma; fibrous histiocytoma, malignant; myxosarcoma; liposarcoma; leiomyosarcoma; rhabdomyosarcoma; embryonal rhabdomyosarcoma; alveolar rhabdomyosarcoma; stromal sarcoma; mixed tumor, malignant; mullerian mixed tumor; nephroblastoma; hepatoblastoma; carcinosarcoma; mesenchymoma, malignant; brenner tumor, malignant; phyllodes tumor, malignant; synovial sarcoma; mesothelioma, malignant; dysgerminoma; embryonal carcinoma; teratoma, malignant; struma ovarii, malignant; choriocarcinoma; mesonephroma, malignant; hemangiosarcoma; hemangioendothelioma, malignant; kaposi's sarcoma; hemangiopericytoma, malignant; lymphangiosarcoma; osteosarcoma; juxtacortical osteosarcoma; chondrosarcoma; chondroblastoma, malignant; mesenchymal chondrosarcoma; giant cell tumor of bone; ewing's sarcoma; odontogenic tumor, malignant; ameloblastic odontosarcoma; ameloblastoma, malignant; ameloblastic fibrosarcoma; pinealoma, malignant; chordoma; glioma, malignant; ependymoma; astrocytoma; protoplasmic astrocytoma; fibrillary astrocytoma; astroblastoma; glioblastoma; oligodendroglioma; oligodendroblastoma; primitive neuroectodermal; cerebellar sarcoma; ganglioneuroblastoma; neuroblastoma; retinoblastoma; olfactory neurogenic tumor; meningioma, malignant; neurofibrosarcoma; neurilemmoma, malignant; granular cell tumor, malignant; malignant lymphoma; hodgkin's disease; hodgkin's; paragranuloma; malignant lymphoma, small lymphocytic; malignant lymphoma, large cell, diffuse; malignant lymphoma, follicular; mycosis fungoides; other specified non-hodgkin's lymphomas; malignant histiocytosis; multiple myeloma; mast cell sarcoma; immunoproliferative small intestinal disease; leukemia; lymphoid leukemia; plasma cell leukemia; erythroleukemia; lymphosarcoma cell leukemia; myeloid leukemia; basophilic leukemia; eosinophilic leukemia; monocytic leukemia; mast cell leukemia; megakaryoblastic leukemia; myeloid sarcoma; and hairy cell leukemia.

In these aspects, therapy includes chemotherapy, radiation therapy, immunotherapy, and surgery. A wide variety of chemotherapeutic agents may be used in accordance with the present embodiments. The term "chemotherapy" refers to the use of drugs to treat cancer. A "chemotherapeutic agent" is used to connote a compound or composition that is administered in the treatment of cancer. These agents or drugs are categorized by their mode of activity within a cell, for example, whether and at what stage they affect the cell cycle. Alternatively, an agent may be characterized based on its ability to directly cross-link DNA, to intercalate into DNA, or to induce chromosomal and mitotic aberrations by affecting nucleic acid synthesis.

Examples of chemotherapeutic agents include DNA damage checkpoint inhibitors, such as CHK inhibitors (AZD7762, Prexasertib, GDC-0575, CCT245737), ATR inhibitors (AZD6738, BAY1895344, M4344, Berzosertib), Wee1 inhibitors (AZD1775), DNA-PK inhibitors (M9831, Nedisertib, CC-115); alkylating agents, such as thiotepa and cyclosphosphamide; alkyl sulfonates, such as busulfan, improsulfan, and piposulfan; aziridines, such as benzodopa, carboquone, meturedopa, and uredopa; ethylenimines and methylamelamines, including altretamine, triethylenemelamine, trietylenephosphoramide, triethiylenethiophosphoramide, and trimethylolomelamine; acetogenins (especially bullatacin and bullatacinone); a camptothecin (including the synthetic analogue topotecan); temozolomide; bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards, such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, and uracil mustard; nitrosureas, such as carmustine, chlorozotocin, fotemustine, lomustine, nimustine, and ranimnustine; antibiotics, such as the enediyne antibiotics (e.g., calicheamicin, especially calicheamicin gammaII and calicheamicin omegaI1); dynemicin, including dynemicin A; bisphosphonates, such as clodronate; an esperamicin; as well as neocarzinostatin chromophore and related chromoprotein enediyne antiobiotic chromophores, aclacinomysins, actinomycin, authrarnycin, azaserine, bleomycins, cactinomycin, carabicin, carminomycin, carzinophilin, chromomycinis, dactinomycin, daunorubicin, detorubicin, 6-diazo-5-oxo-L-norleucine, doxorubicin (including morpholino-doxorubicin, cyanomorpholino-doxorubicin, 2-pyrrolino-doxorubicin and deoxydoxorubicin), epirubicin, esorubicin, idarubicin, marcellomycin, mitomycins, such as mitomycin C, mycophenolic acid, nogalarnycin, olivomycins, peplomycin, potfiromycin, puromycin, quelamycin, rodorubicin, streptonigrin, streptozocin, tubercidin, ubenimex, zinostatin, and zorubicin; anti-metabolites, such as methotrexate and 5-fluorouracil (5-FU); folic acid analogues, such as denopterin, pteropterin, and trimetrexate; purine analogs, such as fludarabine, 6-mercaptopurine, thiamiprine, and thioguanine; pyrimidine analogs, such as ancitabine, azacitidine, 6-azauridine, carmofur, cytarabine, dideoxyuridine, doxifluridine, enocitabine, and floxuridine; androgens, such as calusterone, dromostanolone propionate, epitiostanol, mepitiostane, and testolactone; anti-adrenals, such as mitotane and trilostane; folic acid replenisher, such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids, such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSKpolysaccharide complex; razoxane; rhizoxin; sizofiran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; taxoids, e.g., paclitaxel and docetaxel gemcitabine; 6-thioguanine; mercaptopurine; platinum coordination complexes, such as cisplatin, oxaliplatin, and carboplatin; vinblastine; platinum; etoposide (VP-16); ifosfamide; mitoxantrone; vincristine; vinorelbine; novantrone; teniposide; edatrexate; daunomycin; aminopterin; xeloda; ibandronate; irinotecan (e.g., CPT-11); topoisomerase inhibitor RFS 2000; difluorometlhylornithine (DMFO); retinoids, such as retinoic acid; capecitabine; carboplatin, procarbazine, plicomycin, gemcitabien, navelbine, farnesyl-protein tansferase inhibitors, transplatinum, and pharmaceutically acceptable salts, acids, or derivatives of any of the above.

Other factors that cause DNA damage and have been used extensively include what are commonly known as γ-rays, X-rays, and/or the directed delivery of radioisotopes to tumor cells. Other forms of DNA damaging factors are also contemplated, such as microwaves, proton beam irradiation (U.S. Pat. Nos. 5,760,395 and 4,870,287), and UV-irradiation. It is most likely that all of these factors affect a broad range of damage on DNA, on the precursors of DNA, on the replication and repair of DNA, and on the assembly and maintenance of chromosomes. Dosage ranges for X-rays range from daily doses of 50 to 200 roentgens for prolonged periods of time (3 to 4 wk), to single doses of 2000 to 6000 roentgens. Dosage ranges for radioisotopes vary widely, and depend on the half-life of the isotope, the strength and type of radiation emitted, and the uptake by the neoplastic cells.

The skilled artisan will understand that additional immunotherapies may be used in combination or in conjunction with methods of the embodiments. In the context of cancer treatment, immunotherapeutics, generally, rely on the use of immune effector cells and molecules to target and destroy cancer cells. Rituximab (RITUXAN®) is such an example. The immune effector may be, for example, an antibody specific for some marker on the surface of a tumor cell. The antibody alone may serve as an effector of therapy or it may recruit other cells to actually affect cell killing. The antibody also may be conjugated to a drug or toxin (chemotherapeutic, radionuclide, ricin A chain, cholera toxin, pertussis toxin, etc.) and serve as a targeting agent. Alternatively, the effector may be a lymphocyte carrying a surface molecule that interacts, either directly or indirectly, with a tumor cell target. Various effector cells include cytotoxic T cells and NK cells Antibody-drug conjugates have emerged as a breakthrough approach to the development of cancer therapeutics. Cancer is one of the leading causes of deaths in the world. Antibody-drug conjugates (ADCs) comprise monoclonal antibodies (MAbs) that are covalently linked to cell-killing drugs. This approach combines the high specificity of MAbs against their antigen targets with highly potent cytotoxic drugs, resulting in "armed" MAbs that deliver the payload (drug) to tumor cells with enriched levels of the antigen (Carter et al., 2008; Teicher 2014; Leal et al., 2014). Targeted delivery of the drug also minimizes its exposure in normal tissues, resulting in decreased toxicity and improved therapeutic index. The approval of two ADC drugs, ADCETRIS® (brentuximab vedotin) in 2011 and KADCYLA® (trastuzumab emtansine or T-DM1) in 2013 by FDA validated the approach. There are currently more than 30 ADC drug candidates in various stages of clinical trials for cancer treatment (Leal et al., 2014). As antibody engineering and linker-payload optimization are becoming more and more mature, the discovery and development of new ADCs are increasingly dependent on the identification and validation of new targets that are suitable to this approach (Teicher 2009) and the generation of targeting MAbs. Two criteria for ADC targets are upregulated/high levels of expression in tumor cells and robust internalization.

In one aspect of immunotherapy, the tumor cell must bear some marker that is amenable to targeting, i.e., is not present on the majority of other cells. Many tumor markers exist and any of these may be suitable for targeting in the context of the present embodiments. Common tumor markers include CD20, carcinoembryonic antigen, tyrosinase (p97), gp68, TAG-72, HMFG, Sialyl Lewis Antigen, MucA, MucB, PLAP, laminin receptor, erb B, and p155. An alternative aspect of immunotherapy is to combine anticancer effects with immune stimulatory effects. Immune stimulating molecules also exist including: cytokines, such as IL-2, IL-4, IL-12, GM-CSF, gamma-IFN, chemokines, such as MIP-1, MCP-1, IL-8, and growth factors, such as FLT3 ligand.

Examples of immunotherapies currently under investigation or in use are immune adjuvants, e.g., *Mycobacterium bovis, Plasmodium falciparum*, dinitrochlorobenzene, and aromatic compounds (U.S. Pat. Nos. 5,801,005 and 5,739,169; Hui and Hashimoto, 1998; Christodoulides et al., 1998); cytokine therapy, e.g., interferons α, β, and γ, IL-1, GM-CSF, and TNF (Bukowski et al., 1998; Davidson et al., 1998; Hellstrand et al., 1998); gene therapy, e.g., TNF, IL-1, IL-2, and p53 (Qin et al., 1998; Austin-Ward and Villaseca, 1998; U.S. Pat. Nos. 5,830,880 and 5,846,945); and monoclonal antibodies, e.g., anti-CD20, anti-ganglioside GM2, and anti-p185 (Hollander, 2012; Hanibuchi et al., 1998; U.S. Pat. No. 5,824,311). It is contemplated that one or more anti-cancer therapies may be employed with the antibody therapies described herein.

In some embodiments, the immunotherapy may be an immune checkpoint inhibitor. Immune checkpoints are molecules in the immune system that either turn up a signal (e.g., co-stimulatory molecules) or turn down a signal. Inhibitory checkpoint molecules that may be targeted by immune checkpoint blockade include adenosine A2A receptor (A2AR), B7-H3 (also known as CD276), B and T lymphocyte attenuator (BTLA), cytotoxic T-lymphocyte-associated protein 4 (CTLA-4, also known as CD152), indoleamine 2,3-dioxygenase (IDO), killer-cell immunoglobulin (KIR), lymphocyte activation gene-3 (LAG3), programmed death 1 (PD-1), programmed death ligand 1 (PD-L1), T-cell immunoglobulin domain and mucin domain 3 (TIM-3) and V-domain Ig suppressor of T cell activation (VISTA). In particular, the immune checkpoint inhibitors target the PD-1 axis and/or CTLA-4.

The immune checkpoint inhibitors may be drugs such as small molecules, recombinant forms of ligand or receptors, or, in particular, are antibodies, such as human antibodies (e.g., International Patent Publication WO2015016718; Pardoll 2012; both incorporated herein by reference). Known inhibitors of the immune checkpoint proteins or analogs thereof may be used, in particular chimerized, humanized or human forms of antibodies may be used. As the skilled person will know, alternative and/or equivalent names may be in use for certain antibodies mentioned in the present disclosure. Such alternative and/or equivalent names are interchangeable in the context of the present invention. For example it is known that lambrolizumab is also known under the alternative and equivalent names MK-3475 and pembrolizumab.

In some embodiments, the PD-1 binding antagonist is a molecule that inhibits the binding of PD-1 to its ligand binding partners. In a specific aspect, the PD-1 ligand binding partners are PDL1 and/or PDL2. In another embodiment, a PDL1 binding antagonist is a molecule that inhibits the binding of PDL1 to its binding partners. In a specific aspect, PDL1 binding partners are PD-1 and/or B7-1. In another embodiment, the PDL2 binding antagonist is a molecule that inhibits the binding of PDL2 to its binding partners. In a specific aspect, a PDL2 binding partner is PD-1. The antagonist may be an antibody, an antigen binding fragment thereof, an immunoadhesin, a fusion protein, or oligopeptide. Exemplary antibodies are described in U.S. Pat. Nos. 8,735,553, 8,354,509, and 8,008,449, all incorporated herein by reference. Other PD-1 axis antagonists for use in the methods provided herein are known in the art such as described in U.S. Patent Application No. 20140294898, 2014022021, and 20110008369, all incorporated herein by reference.

In some embodiments, the PD-1 binding antagonist is an anti-PD-1 antibody (e.g., a human antibody, a humanized antibody, or a chimeric antibody). In some embodiments, the anti-PD-1 antibody is selected from the group consisting of nivolumab, pembrolizumab, and CT-011. In some embodiments, the PD-1 binding antagonist is an immunoadhesin (e.g., an immunoadhesin comprising an extracellular or PD-1 binding portion of PDL1 or PDL2 fused to a constant region (e.g., an Fc region of an immunoglobulin sequence). In some embodiments, the PD-1 binding antagonist is PDR-001 (spartalizumab), AMP-224 or AMP-514. Nivolumab, also known as MDX-1106-04, MDX-1106, ONO-4538, BMS-936558, and OPDIVO, is an anti-PD-1 antibody described in W2006/121168. Pembrolizumab, also known as MK-3475, Merck 3475, lambrolizumab, KEYTRUDA®, and SCH-900475, is an anti-PD-1 antibody described in WO2009/114335. CT-011, also known as hBAT or hBAT-1, is an anti-PD-1 antibody described in WO2009/101611. AMP-224, also known as B7-DCIg, is a PDL2-Fc fusion soluble receptor described in WO2010/027827 and WO2011/066342. In some embodiments, the PD-1 axis inhibitor is an anti-PD-L1 antibody, such as atezolizumab, avelumab, durvalumab, BMS-936559, or CK-301.

Another immune checkpoint that can be targeted in the methods provided herein is the cytotoxic T-lymphocyte-associated protein 4 (CTLA-4), also known as CD152. The complete cDNA sequence of human CTLA-4 has the Genbank accession number L15006. CTLA-4 is found on the surface of T cells and acts as an "off" switch when bound to CD80 or CD86 on the surface of antigen-presenting cells. CTLA4 is a member of the immunoglobulin superfamily that is expressed on the surface of Helper T cells and transmits an inhibitory signal to T cells. CTLA4 is similar to the T-cell co-stimulatory protein, CD28, and both molecules bind to CD80 and CD86, also called B7-1 and B7-2 respectively, on antigen-presenting cells. CTLA4 transmits an inhibitory signal to T cells, whereas CD28 transmits a stimulatory signal. Intracellular CTLA4 is also found in regulatory T cells and may be important to their function. T cell activation through the T cell receptor and CD28 leads to increased expression of CTLA-4, an inhibitory receptor for B7 molecules.

In some embodiments, the immune checkpoint inhibitor is an anti-CTLA-4 antibody (e.g., a human antibody, a humanized antibody, or a chimeric antibody), an antigen binding fragment thereof, an immunoadhesin, a fusion protein, or oligopeptide.

Anti-human-CTLA-4 antibodies (or VH and/or VL domains derived therefrom) suitable for use in the present methods can be generated using methods well known in the art. Alternatively, art recognized anti-CTLA-4 antibodies can be used. For example, the anti-CTLA-4 antibodies disclosed in: U.S. Pat. No. 8,119,129, WO 01/14424, WO 98/42752; WO 00/37504 (CP675,206, also known as tremelimumab; formerly ticilimumab), U.S. Pat. No. 6,207,156; Hurwitz et al., 1998; Camacho et al., 2004; Mokyr et al., 1998 can be used in the methods disclosed herein. The teachings of each of the aforementioned publications are hereby incorporated by reference. Antibodies that compete with any of these art-recognized antibodies for binding to CTLA-4 also can be used. For example, a humanized CTLA-4 antibody is described in International Patent Application No. WO2001014424, WO2000037504, and U.S. Pat. No. 8,017,114; all incorporated herein by reference.

An exemplary anti-CTLA-4 antibody is ipilimumab (also known as 10DI, MDX-010, MDX-101, and Yervoy®) or antigen binding fragments and variants thereof (see, e.g., WOO 1/14424). In other embodiments, the antibody comprises the heavy and light chain CDRs or VRs of ipilimumab. Accordingly, in one embodiment, the antibody comprises the CDR1, CDR2, and CDR3 domains of the VH region of ipilimumab, and the CDR1, CDR2 and CDR3 domains of the VL region of ipilimumab. In another embodiment, the antibody competes for binding with and/or binds to the same epitope on CTLA-4 as the above-mentioned antibodies. In another embodiment, the antibody has at least about 90% variable region amino acid sequence identity with the above-mentioned antibodies (e.g., at least about 90%, 95%, or 99% variable region identity with ipilimumab).

Other molecules for modulating CTLA-4 include CTLA-4 ligands and receptors such as described in U.S. Pat. Nos. 5,844,905, 5,885,796 and International Patent Application Nos. WO1995001994 and WO1998042752; all incorporated herein by reference, and immunoadhesions such as described in U.S. Pat. No. 8,329,867, incorporated herein by reference.

Approximately 60% of persons with cancer will undergo surgery of some type, which includes preventative, diagnostic or staging, curative, and palliative surgery. Curative surgery includes resection in which all or part of cancerous tissue is physically removed, excised, and/or destroyed and may be used in conjunction with other therapies, such as the treatment of the present embodiments, chemotherapy, radiotherapy, hormonal therapy, gene therapy, immunotherapy, and/or alternative therapies. Tumor resection refers to physical removal of at least part of a tumor. In addition to tumor resection, treatment by surgery includes laser surgery, cryosurgery, electrosurgery, and microscopically-controlled surgery (Mohs' surgery).

Upon excision of part or all of cancerous cells, tissue, or tumor, a cavity may be formed in the body. Treatment may be accomplished by perfusion, direct injection, or local application of the area with an additional anti-cancer therapy. Such treatment may be repeated, for example, every 1, 2, 3, 4, 5, 6, or 7 days, or every 1, 2, 3, 4, and 5 weeks or every 1, 2, 3, 4, 5, 6, 7, 8, 9, 10, 11, or 12 months. These treatments may be of varying dosages as well.

It is contemplated that other agents may be used in combination with certain aspects of the present embodiments to improve the therapeutic efficacy of treatment. These additional agents include agents that affect the upregulation of cell surface receptors and GAP junctions, cytostatic and differentiation agents, inhibitors of cell adhesion, agents that increase the sensitivity of the hyperproliferative cells to apoptotic inducers, or other biological agents. Increases in intercellular signaling by elevating the number of GAP junctions would increase the anti-hyperproliferative effects on the neighboring hyperproliferative cell population. In other embodiments, cytostatic or differentiation agents can be used in combination with certain aspects of the present embodiments to improve the anti-hyperproliferative efficacy of the treatments. Inhibitors of cell adhesion are contemplated to improve the efficacy of the present embodiments. Examples of cell adhesion inhibitors are focal adhesion kinase (FAKs) inhibitors and Lovastatin. It is further contemplated that other agents that increase the sensitivity of a hyperproliferative cell to apoptosis, such as the antibody c225, could be used in combination with certain aspects of the present embodiments to improve the treatment efficacy.

In some aspects, the disease is a genetic imprinting disorder, such as Angelman syndrome, Prader-Willi syndrome, or Beckwith-Wiedemann syndrome. In these aspects, therapy includes anti-seizure medication (e.g., sodium valproate (Epilim), clonazepam (Rivotril), lamotrigine (Lamictal) and levetiracetam (Keppra)), indotecan, physical therapy, communication therapy, behavior therapy, piracetam (Nootropil), carbamazepine (Tegretol), a ketogenic diet, vagus nerve stimulation (VNS), human growth hormone replacement therapy, sex hormone replacement therapy, and surgery.

In some aspects, the disease is a neurological disorder, such as Alzheimer's disease, autism, Fragile X syndrome, Huntington disease, Parkinson disease, schizophrenia, ATR-X syndrome, ICF syndrome, BWS, Rett syndrome, alpha-Thalassaemia, Rubinstein-Taybi syndrome, or Coffin-Lowry syndrome. In these aspects, therapy includes cholinesterase inhibitors (e.g., donepezil (Aricept), rivastigmine (Exelon), galantamine (Razadyne)), memantine, levodopa, carbidopa, and antipsychotics (e.g., Aripiprazole (Abilify), Asenapine (Saphris), Brexpiprazole (Rexulti), Cariprazine (Vraylar), Clozapine (Clozaril), Iloperidone (Fanapt), Lurasidone (Latuda), Olanzapine (Zyprexa), Paliperidone (Invega), Pimavanserin (Nuplazid), Quetiapine (Seroquel), Risperidone (Risperdal), Ziprasidone (Geodon)).

In some aspects, the disease is an autoimmune disease, such as systemic lupus erythematosus or rheumatoid arthritis. In these aspects, therapy includes nonsteroidal anti-inflammatory drugs (e.g., ibuprofen, naproxen), antimalarial drugs (e.g., hydroxychloroquine), corticosteroids and immune suppressants (e.g., azathioprine, cyclophosphamide, cyclosporine), belimumab, antirheumatic drugs (e.g., methotrexate, leflunomide, sulfasalazine), batacept (Orencia), adalimumab (Humira), anakinra (Kineret), baricitinib (Olumiant), certolizumab (Cimzia), etanercept (Enbrel), golimumab (Simponi), infliximab (Remicade), rituximab (Rituxan), sarilumab (Kevzara), tocilizumab (Actemra), and tofacitinib (Xeljanz).

In some aspects, the disease is a metabolic disorder, such as type 2 diabetes. In these aspects, therapy includes metformin, sulfonylureas (e.g., glyburide, glipizide, glimepiride), meglitinides (e.g., repaglinide, nateglinide), thiazolidinediones (e.g., rosiglitazone, pioglitazone), DPP-4 inhibitors (e.g., sitagliptin, saxagliptin, linagliptin), and GLP-1 receptor agonists (e.g., exenatide, liraglutide, semaglutide), SGLT2 inhibitors (canagliflozin, dapagliflozin, empagliflozin), and insulin.

IV. KITS AND DIAGNOSTICS

In various aspects of the invention, a kit is envisioned containing the necessary components to purify exosomes from a body fluid or tissue culture medium. In yet other aspects, a kit is envisioned containing the necessary components to isolate exosomes and determine the presence of one or more disease cell-derived exosome-specific methylation mark(s) within the isolated exosomes.

The kit may comprise one or more sealed vials containing any of such components. In some embodiments, the kit may also comprise a suitable container means, which is a container that will not react with components of the kit, such as an eppendorf tube, an assay plate, a syringe, a bottle, or a tube. The container may be made from sterilizable materials such as plastic or glass. The kit may further include an instruction sheet that outlines the procedural steps of the methods set forth herein, and will follow substantially the same procedures as described herein or are known to those of ordinary skill. The instruction information may be in a computer readable media containing machine-readable instructions that, when executed using a computer, cause the display of a real or virtual procedure of purifying exosomes from a sample, and/or identifying one or more disease cell-derived methylation mark(s) therein.

V. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—Detection of DNA Methylation in Exosomal DNA

The most widely used technique to investigate DNA methylation is Bisulfite Sequencing, which utilizes sodium bisulfite treatment to convert unmethylated cytosines to uracils, which are then converted to thymidines during PCR amplification. Methylated cytosines remain intact after bisulfite treatment; therefore, when compared back to the original genome for reference, methylated sites can be determined by observing where the sequence contains a "C" instead of a "T" (Meissner et al., 2005).

While the bisulfite technique can be used for genome-wide cytosine methylation analysis, CpG islands only reside in ~2% of the genome, making whole genome bisulfite sequencing extremely inefficient. Therefore, a common CpG enrichment strategy is reduced representation bisulfite sequencing, which targets CpG rich regions, capturing at least 70% of CpG islands and requiring only small quantities of input DNA, which is extremely useful for fragmented or low-concentration samples, such as exosomal DNA. After bisulfite conversion, a primer library is used that targets the CpG rich areas of the genome, generating site-specific fragments of DNA. During analysis, these fragments, or "reads" are mapped to specific regions of DNA using reference sequences. The number of C-to-T conversions is then counted for all of the mapped reads, generating a beta value for methylation at each site. Samples can then be compared in a site-specific manner between conditions, for example between exosomal and cellular DNA (FIG. 1).

Figure 2:
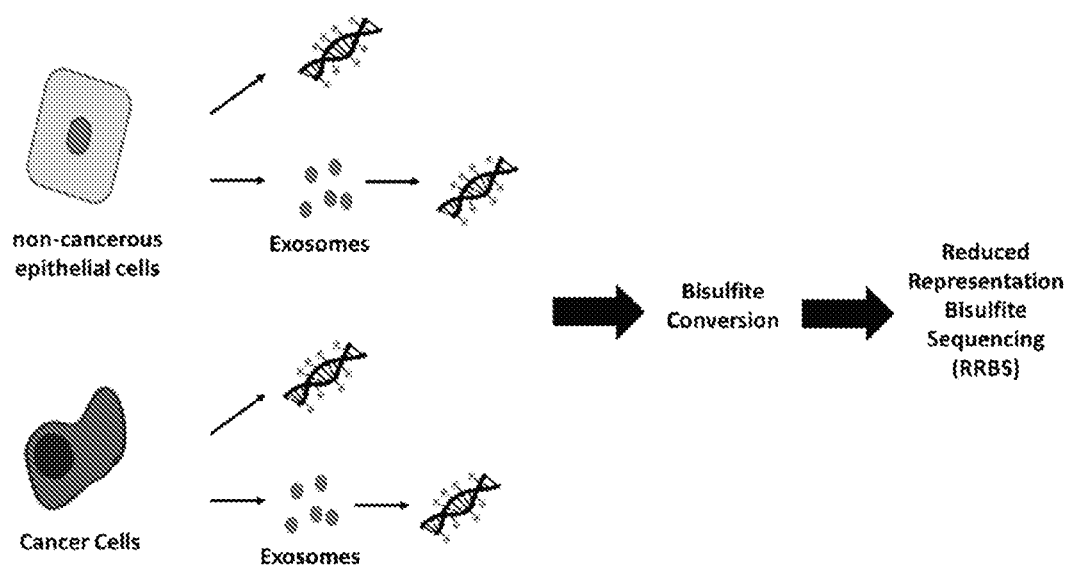
FIG. 2. Plan for isolating cellular and exosomal DNA from different cell types, having bisulfite conversion performed on the samples, and performing reduced representation bisulfite sequencing to determine the methylation patterns present on the DNA FIGS. 3A-B. Detection of DNA methylation in exosomal DNA.

For these experiments, the plan was to isolate cellular and exosomal DNA from different cell types, have bisulfite conversion performed on the samples, and perform reduced representation bisulfite sequencing to determine the methylation patterns present on the DNA (FIG. 2). The first experiment aimed to determine if exosomal DNA can faithfully recapitulate the methyl landscape of the cell of origin, and whether this can be detected by sequencing. For the initial pilot experiment, DNA was isolated from non-tumorigenic HPDE cells and PDAC panc1 cells. DNA was then isolated from the exosomes of those same cells. The DNA was then subjected to bisulfite conversion, which changes unmethylated cytosines into uracils, which become thymines during PCR amplification, allowing them to be detected by sequencing. Methylated cytosines remain unchanged. The limitations of bisulfite—high temp and low pH required to deaminate unmethylated cytosines—can degrade DNA, which is a challenge with already fragmented exosomal DNA. As such, this method reduces read sequencing which can help maximize results from low quality input DNA.

Figure 3A:
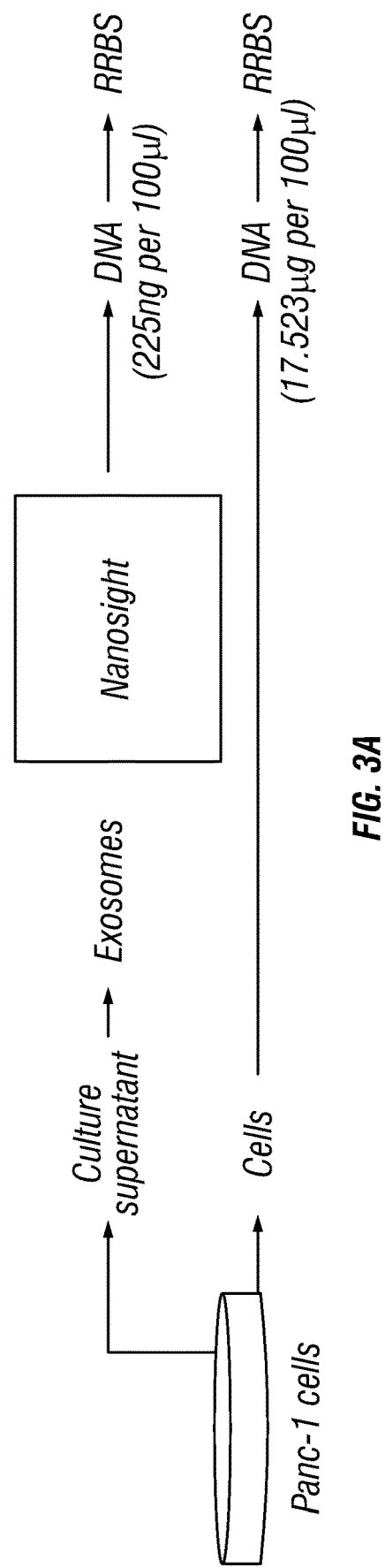
FIG. 3A provides a schematic representing the protocol used to prepare cellular and exosomal DNA for reduced representation bisulfite sequencing (RRBS).
Figure 3B:
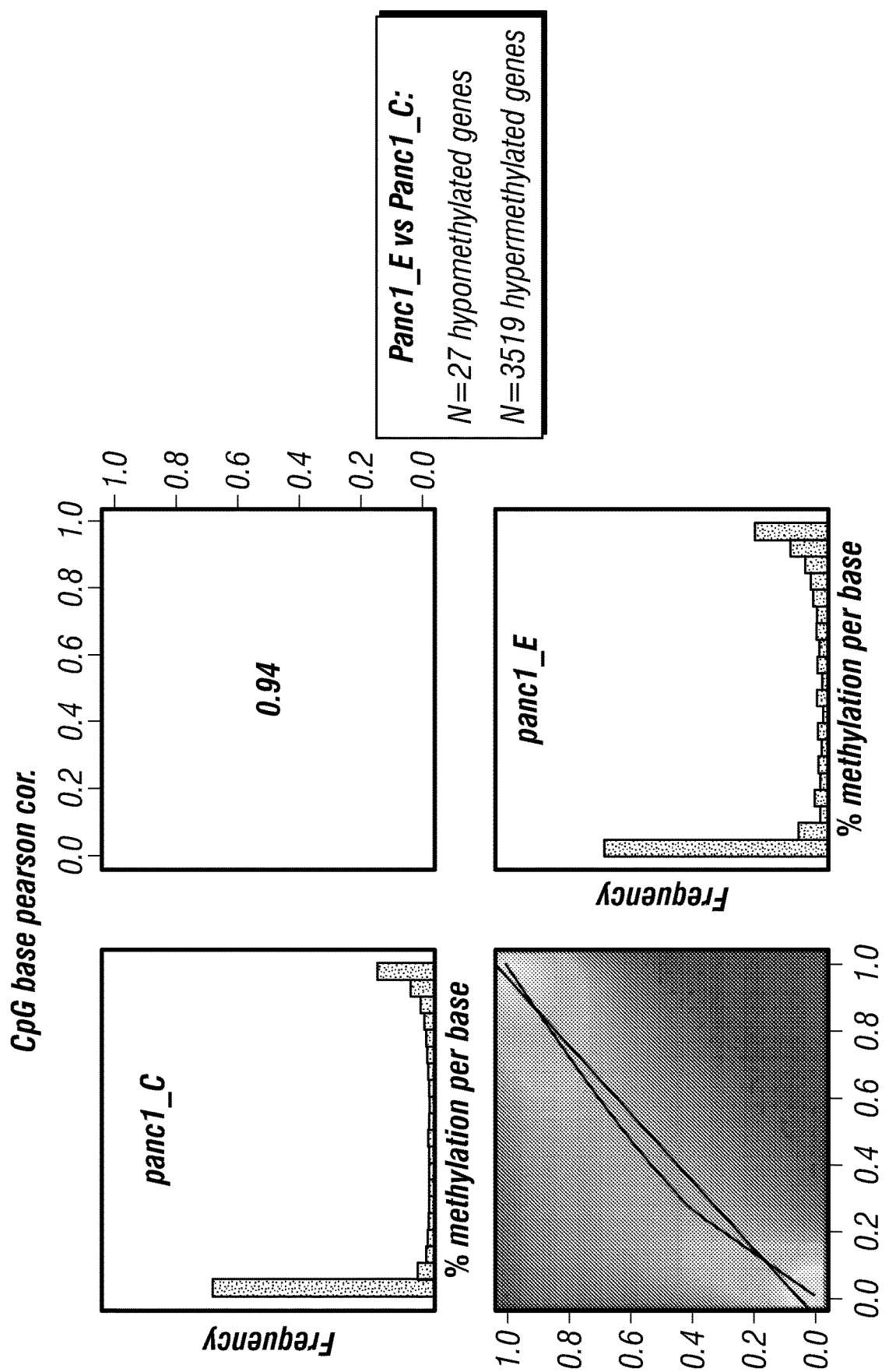
FIG. 3B provides an analysis of the resulting data. Panel panc1_C provides a histograms of % CpG methylation (frequency vs. % methylation per base) for both the cellular DNA. Panel panc1_E provides a histograms of % CpG methylation (frequency vs. % methylation per base) for both the exosomes DNA. Sample correlation was determined and expressed with the depicted scatter plot (lower left panel) and correlation coefficient (0.94, Person correlation test).

In one experiment, cellular DNA was extracted from Panc-1 cells, and the culture supernatant from the cells was harvested and processed for exosomes enrichment (Nano-Sight™ analysis), after which exosomes DNA was extracted (FIG. 3A). The samples (C, cells; and E, Exosomes) were processed for reduced representation bisulfite sequencing (RRBS), enabling the analysis of genome-wide DNA methylation profiles at a single nucleotide resolution level (FIG. 3A). The histograms of % CpG methylation (frequency vs. % methylation per base) for both the cellular and exosomes DNA (panels panc1_C and panc1_E, respectively), indicate a similar methylation pattern (FIG. 3B). Sample correlation was ascertained and expressed with the depicted scatter plot and correlation coefficient (0.94, Pearson correlation test, FIG. 3B). The results indicate a very high correlation, with strongly matching DNA methylation fingerprint patterns between the two samples (FIG. 3B). Detailed comparative analyses indicated N=27 differential hypomethylated genes in exosomes vs. cells, and N=3519 differential hypermethylated genes in exosomes vs. cells. The exosomes DNA is thus slightly enriched for hypermethylated DNA, possibly due to the protection of exosomes DNA from demethylating enzymes.

Figure 5:
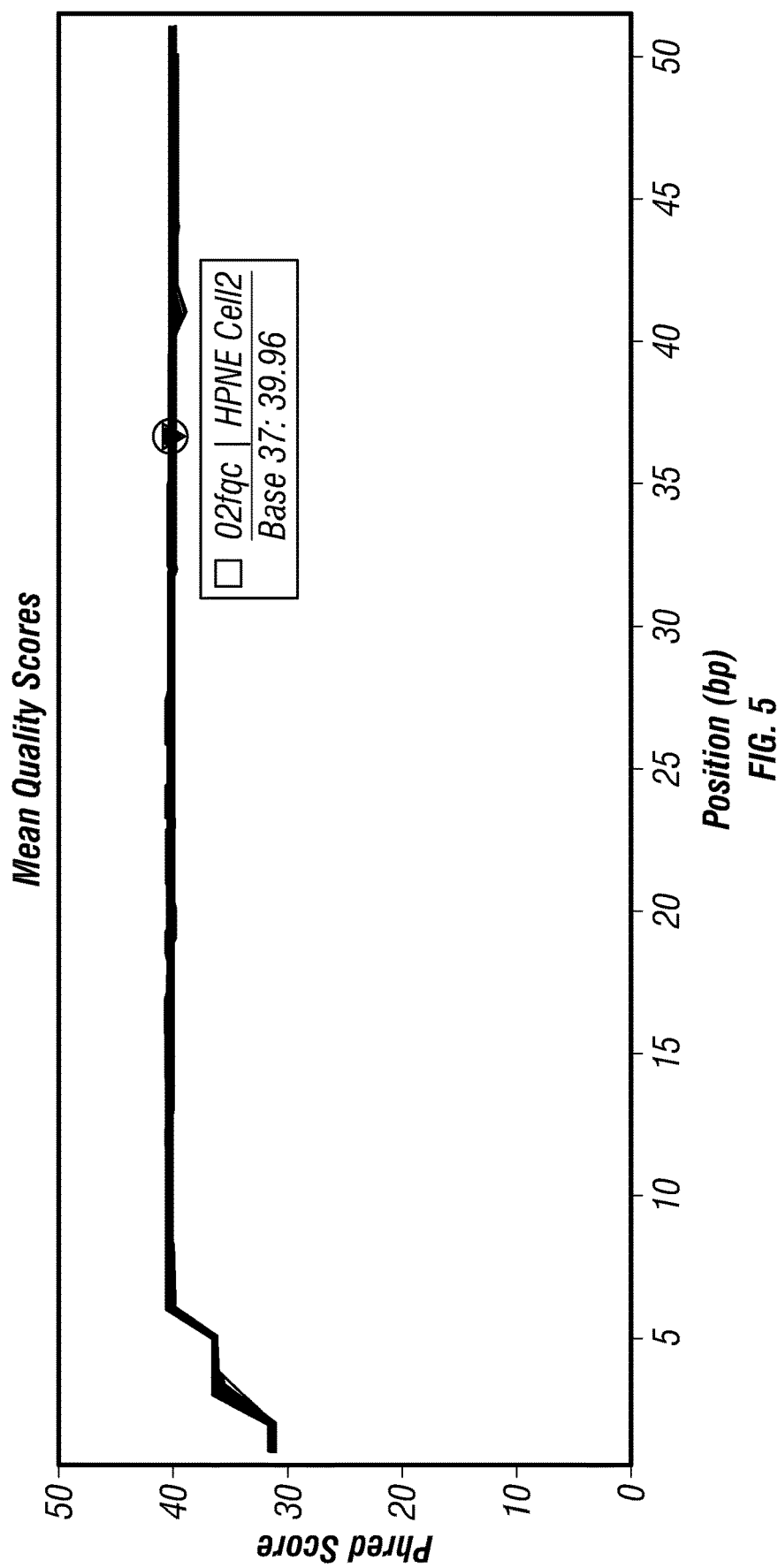
FIG. 5. Reads base qualities graphically represented using FastQC.
Figure 6:
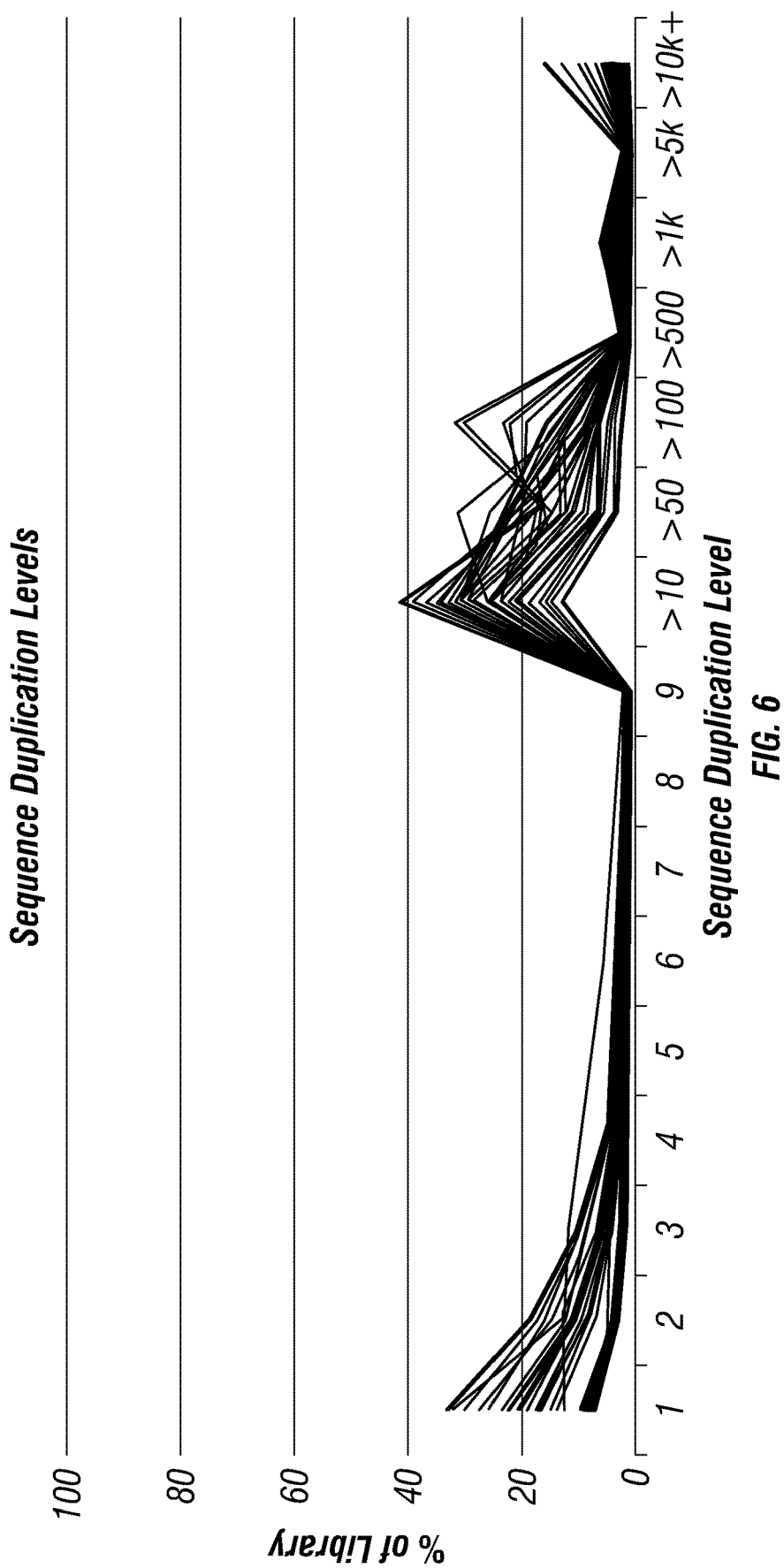
FIG. 6. Sequence duplication levels graphically represented using FastQC.

Next, eight different pancreatic cell lines (tumorigenic cell lines: Panc1, BXPC3, Capan1, T3M4, MiaPaCa2, and PSN1; non-tumorigenic cell lines: HPNE and HPDE) and their exosomes were tested in triplicate. First, quality control analyses were run on all of the samples. Alignment rates were high, providing good coverage for the site-specific analysis of CpG-rich regions (FIG. 4). Second, the read quality was determined to be high, meaning there were fewer sequencing errors and the reads could be accurately analyzed (FIG. 5). Additionally, there was a high duplication level, which was expected with the reduced read sequencing since a primer library was used to amplify specific sites (FIG. 6). It is expected for an RRBS library to feature duplication levels this high since all fragments are expected to line up perfectly at exactly the same genomic location numerous times (e.g., because there are only so many MspI restriction recognition sites in a genome).

Figure 7:
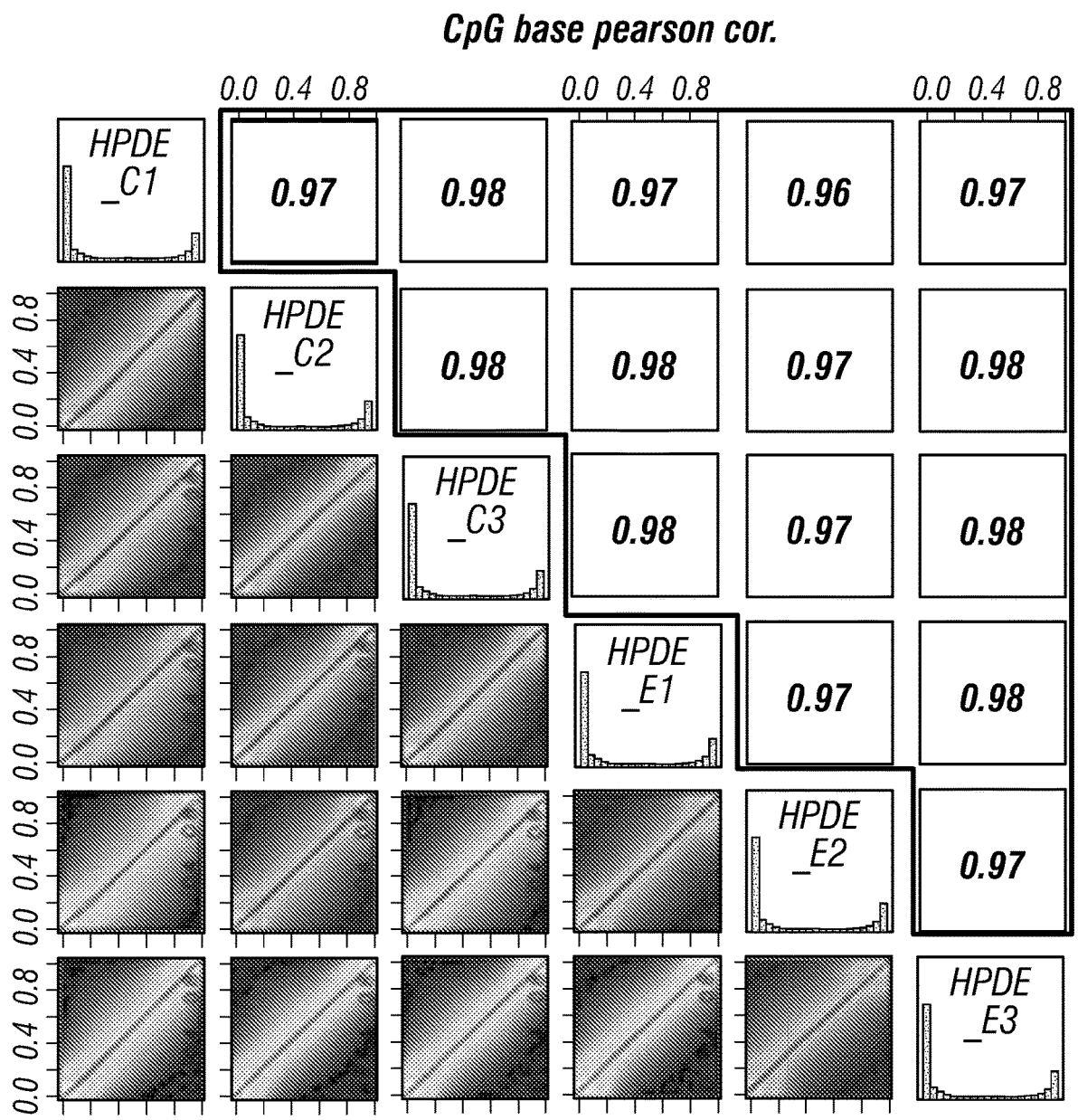
FIG. 7. Analysis of Panc1 vs HPDE correlation among samples.
Figure 7:
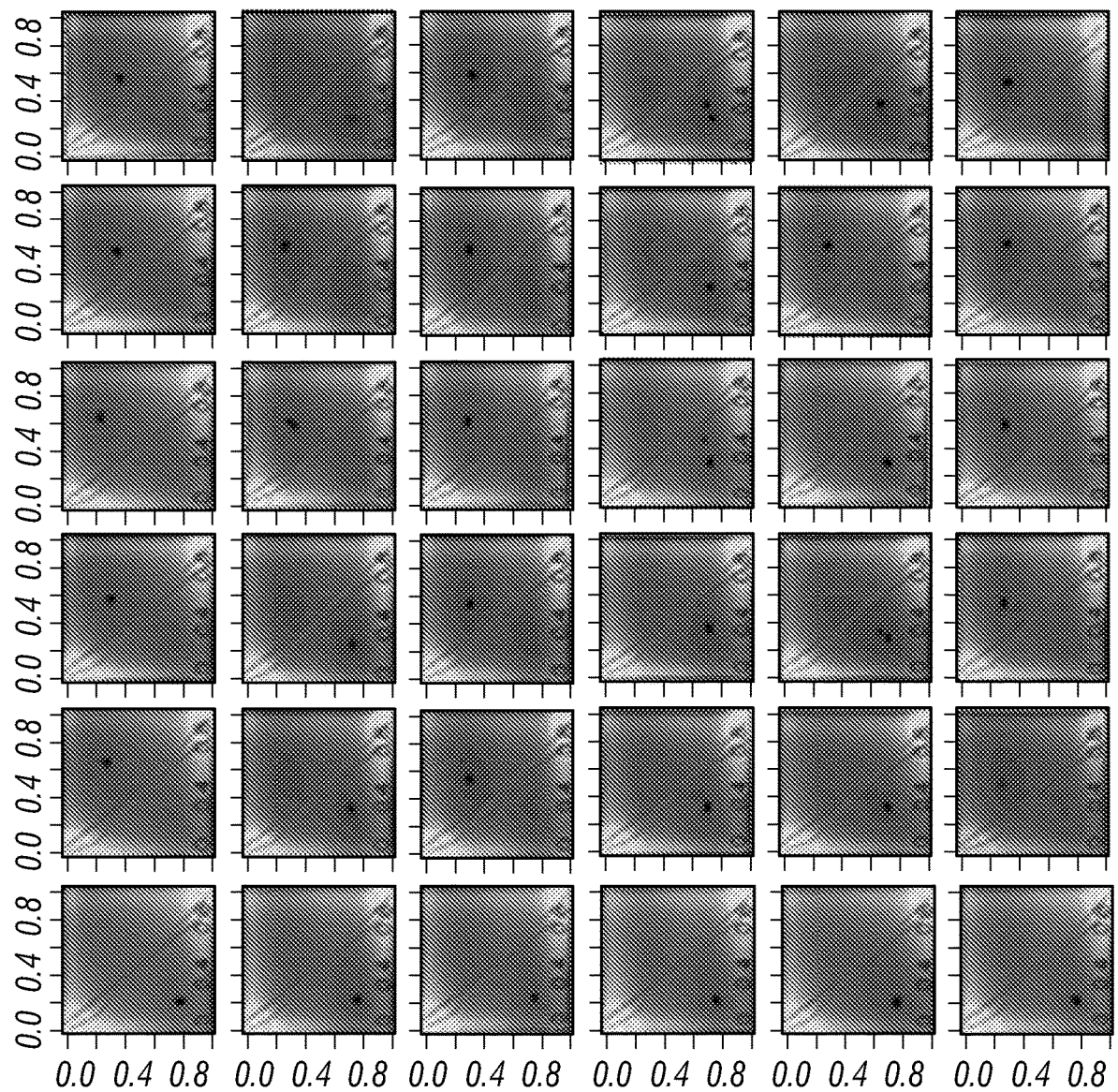
Figure 7:
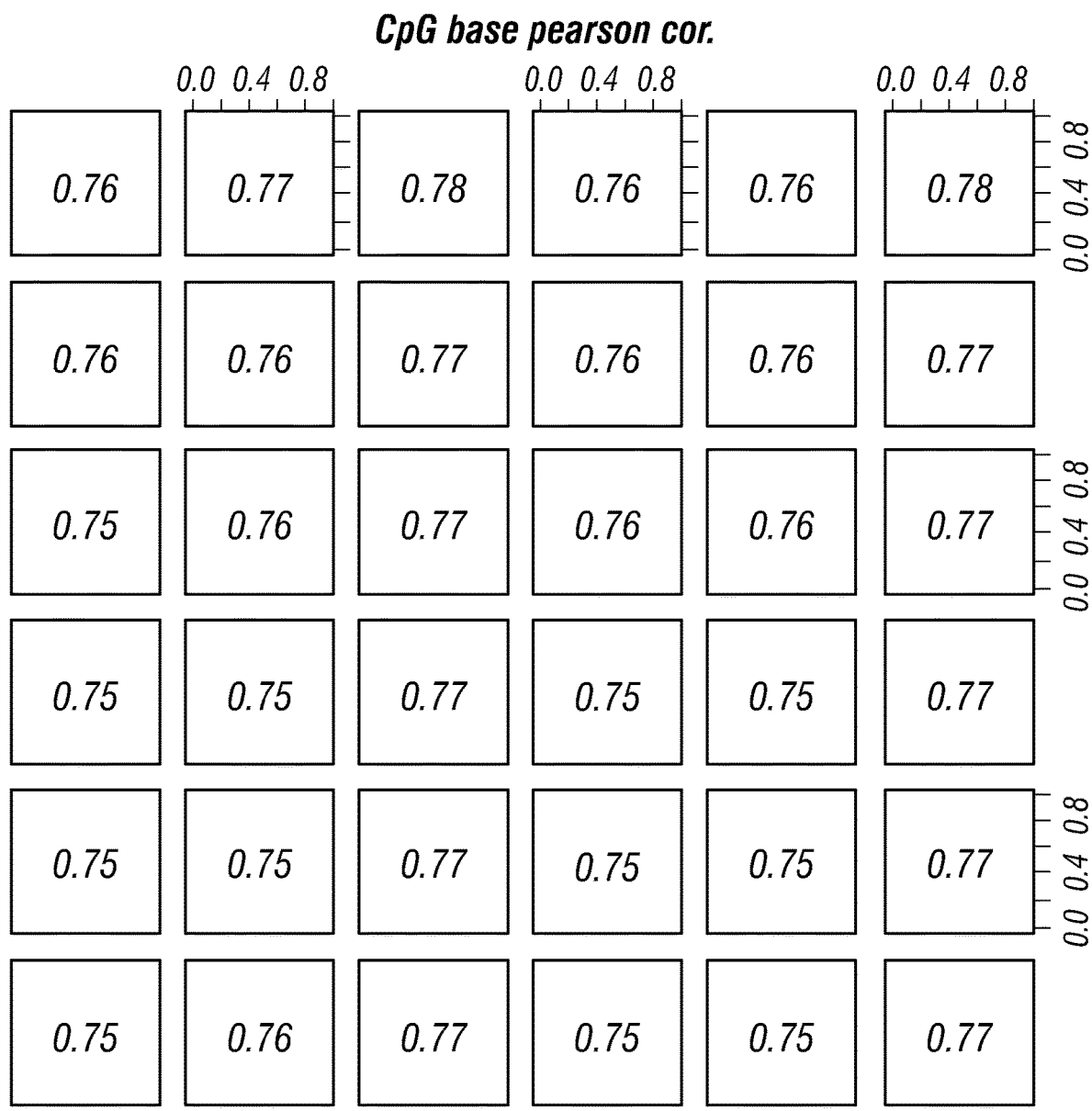
Figure 7:
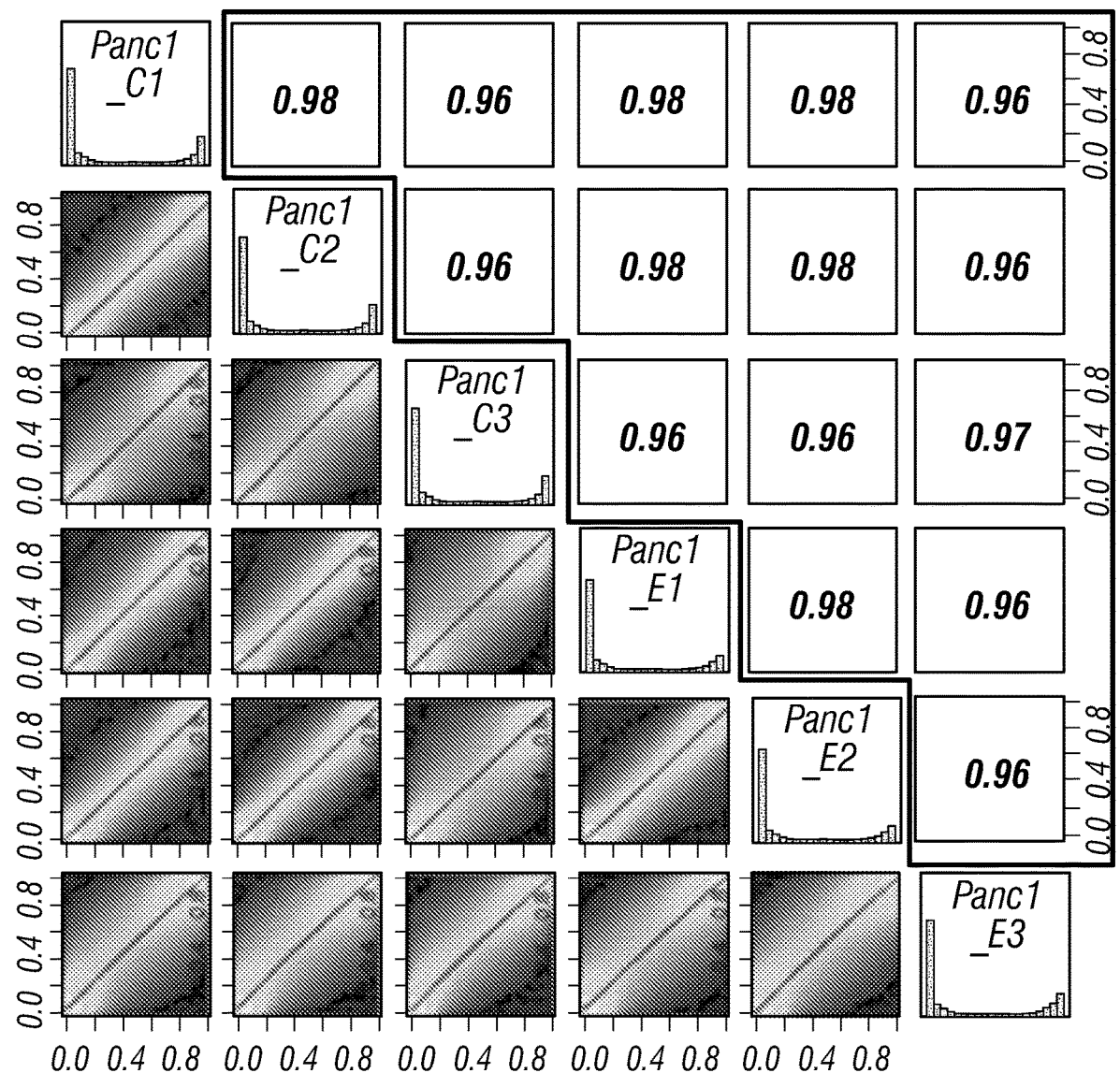

The specific analysis in FIG. 7 provides a comparison between the HPDE and Panc1 samples. As is outlined, the methylation profiles have a much higher correlation rate within each cell type, so the different methylation patterns can be distinguished from the cell lines using both cell and exosomal DNA, and the cell and exosomal DNA from the same cell line have highly correlated methylation patterns, supporting the hypothesis that exosomal DNA maintains the methylation patterns seen in the cells of origin.

Figure 8:
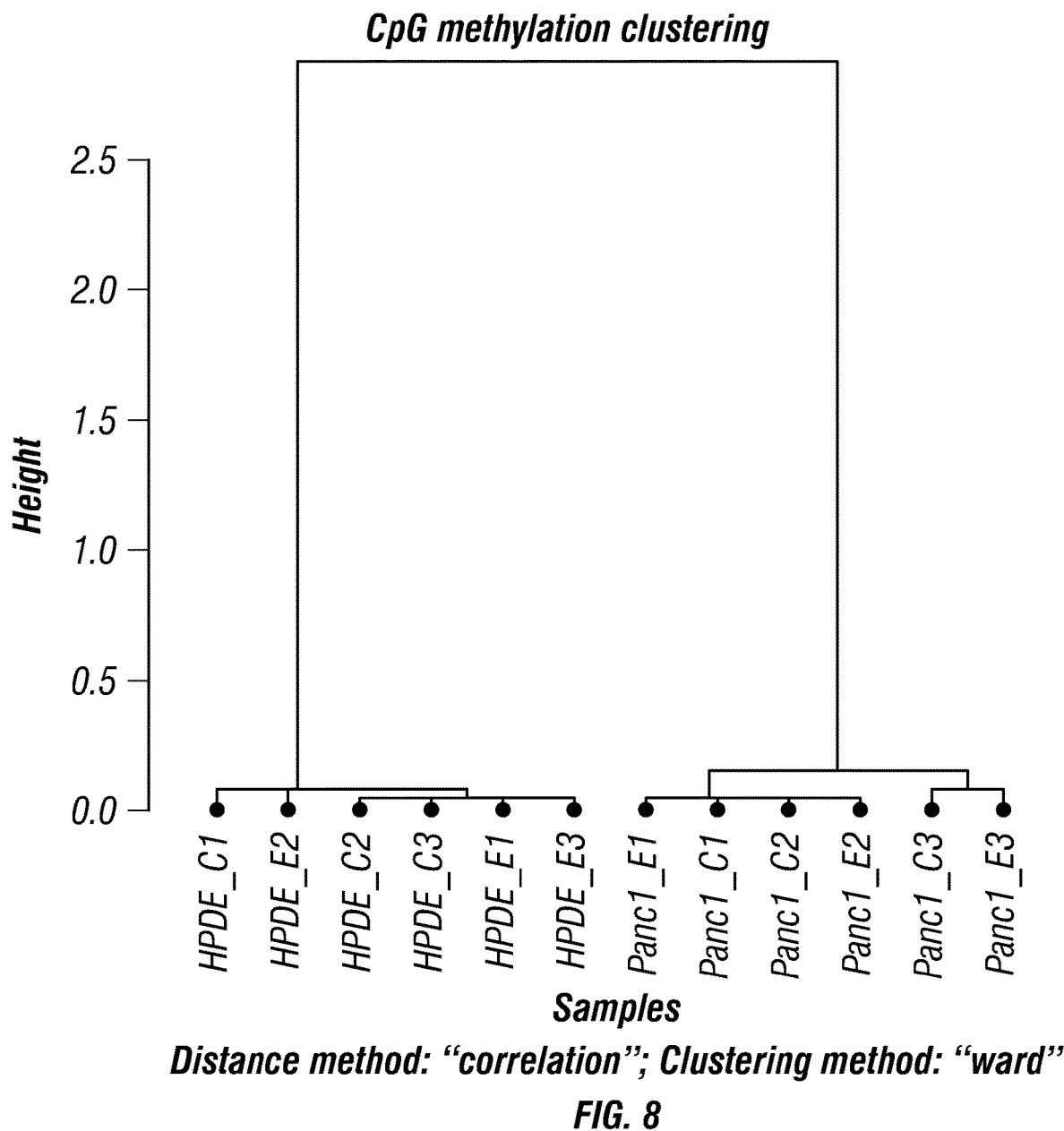
FIG. 8. Samples clustered by CpG methylation.

FIG. 8 provides another way of visualizing the correlation, showing that the samples do segregate by cell type. Each batch of bisulfite conversion can be slightly different. As such, the Panc1 samples from the initial study (Panc1_C3 and Panc1_E3) are a bit different from the other Panc1 replicates, but they still cluster with the cell line.

Figure 9:
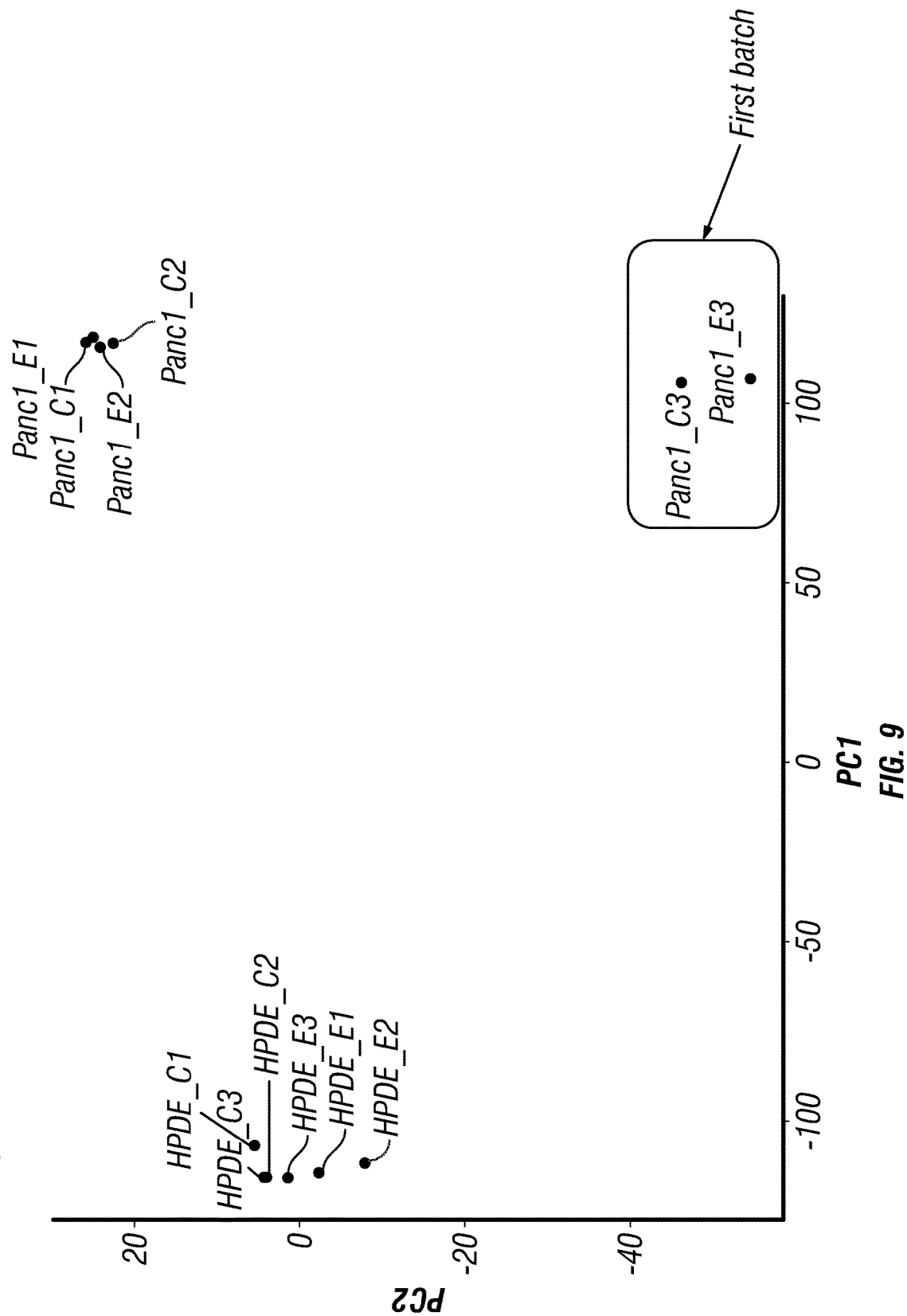
FIG. 9. Principle component analysis.

A further example of the batch segregation is the principle component analysis provided in FIG. 9, which is used to visualize genetic distance and relatedness between populations. The HPDE samples all cluster very closely together.

Figure 10:
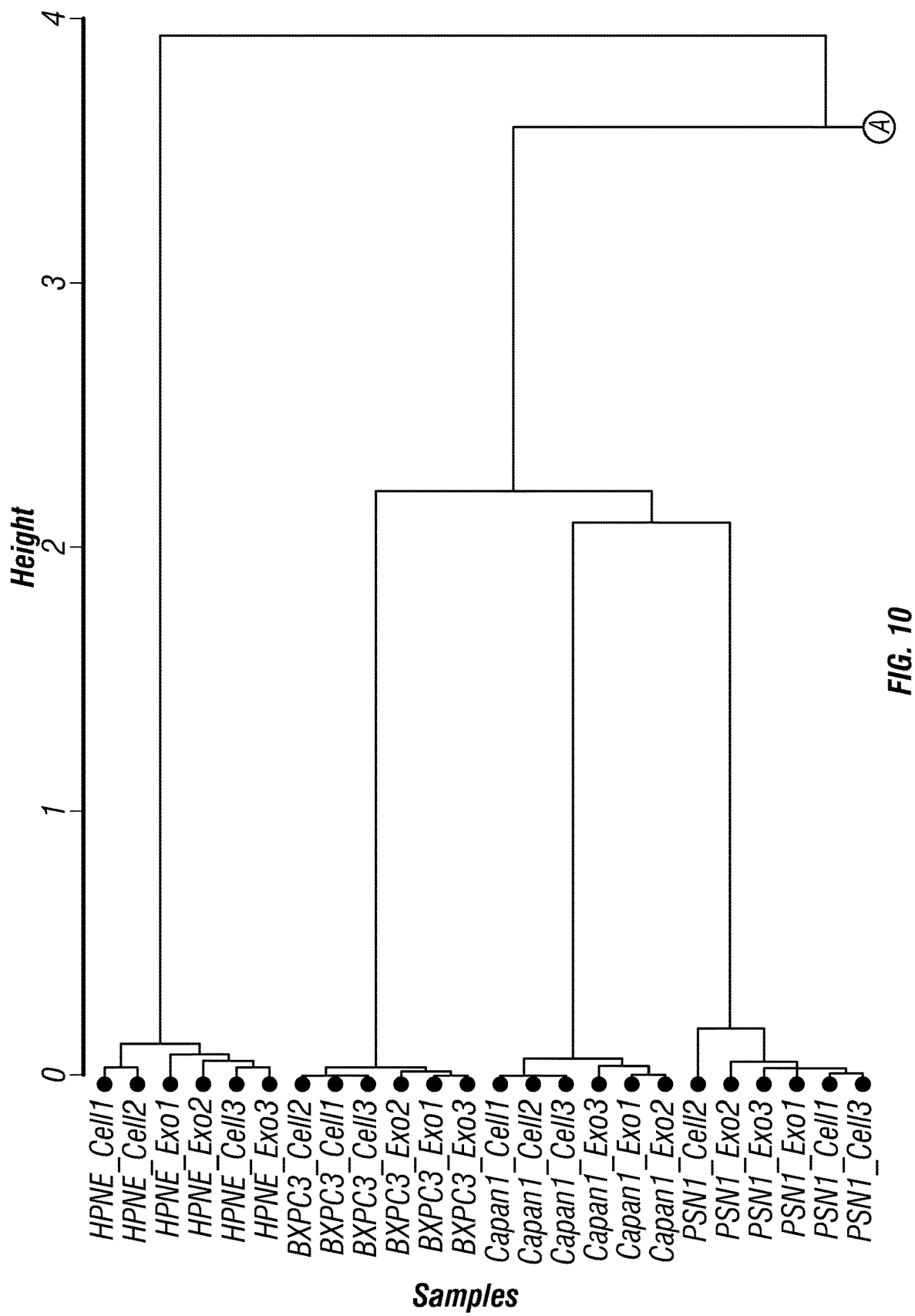
FIG. 10. Samples clustered using the distance method.
Figure 10:
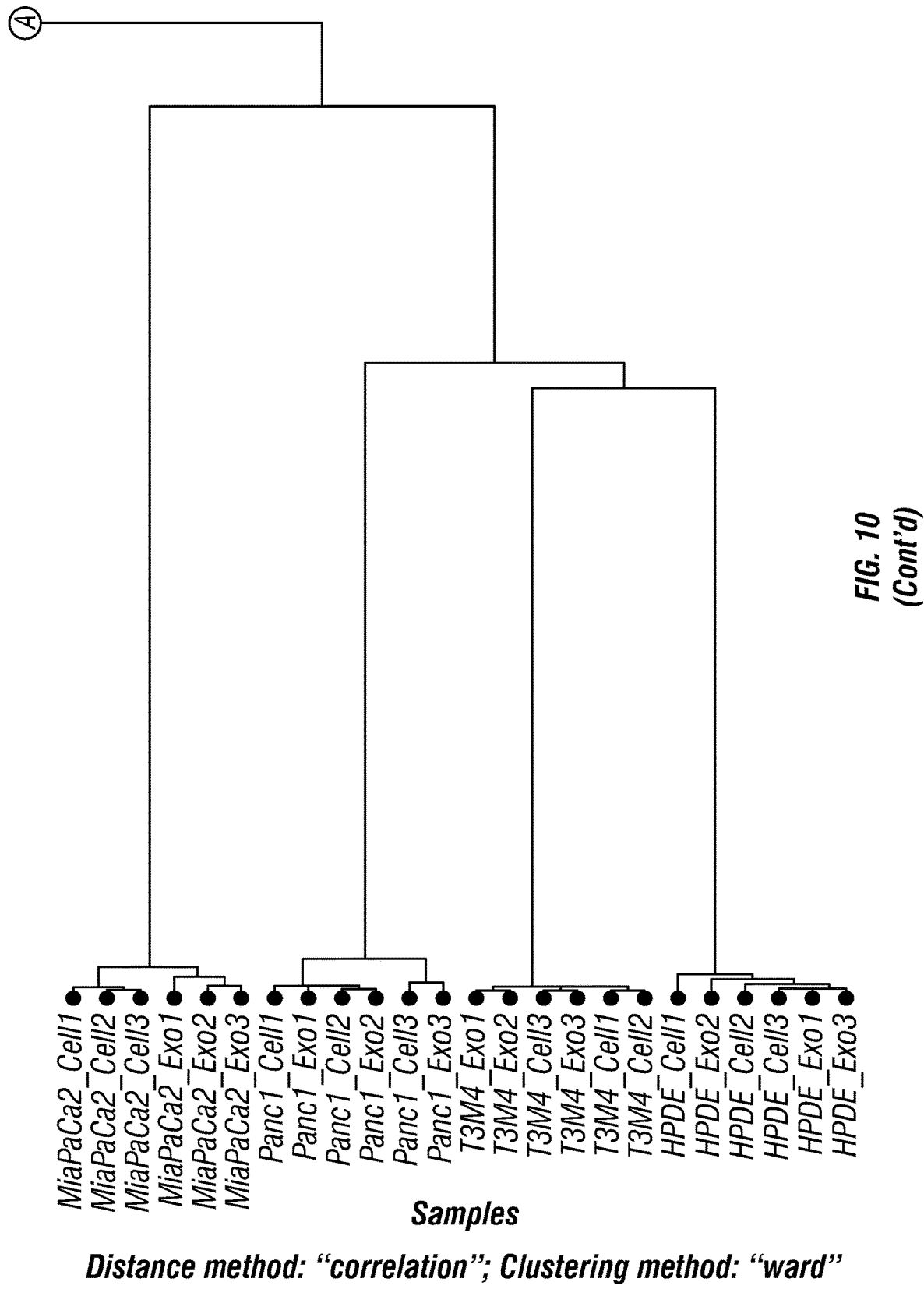
Figure 11A:
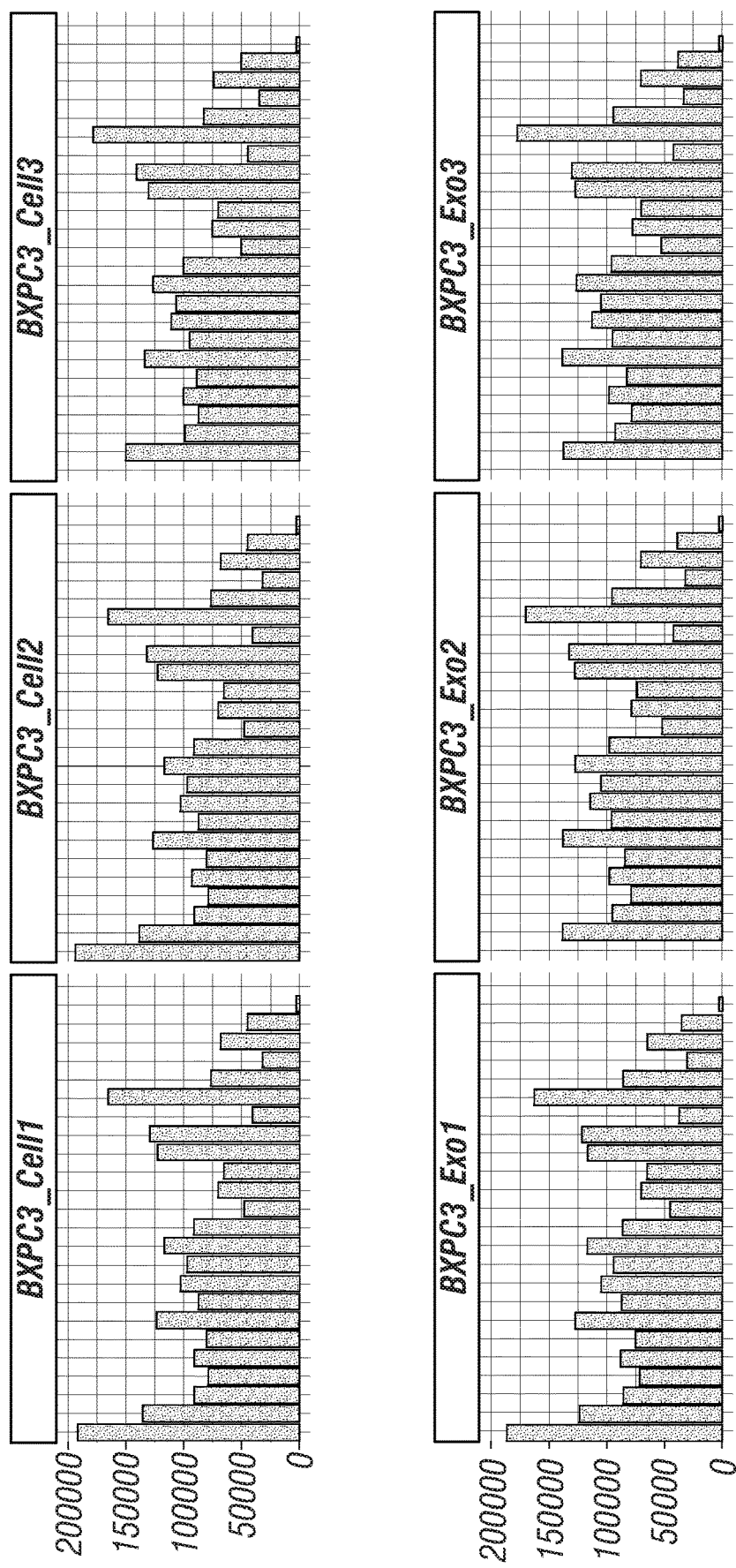
FIGS. 11A-H. Detection of methylation marks on all chromosomes. Each bar represents a chromosome, as shown in FIG. 11H. Each graph represents a sample. The Y-axes represent CpG_num.
Figure 11B:
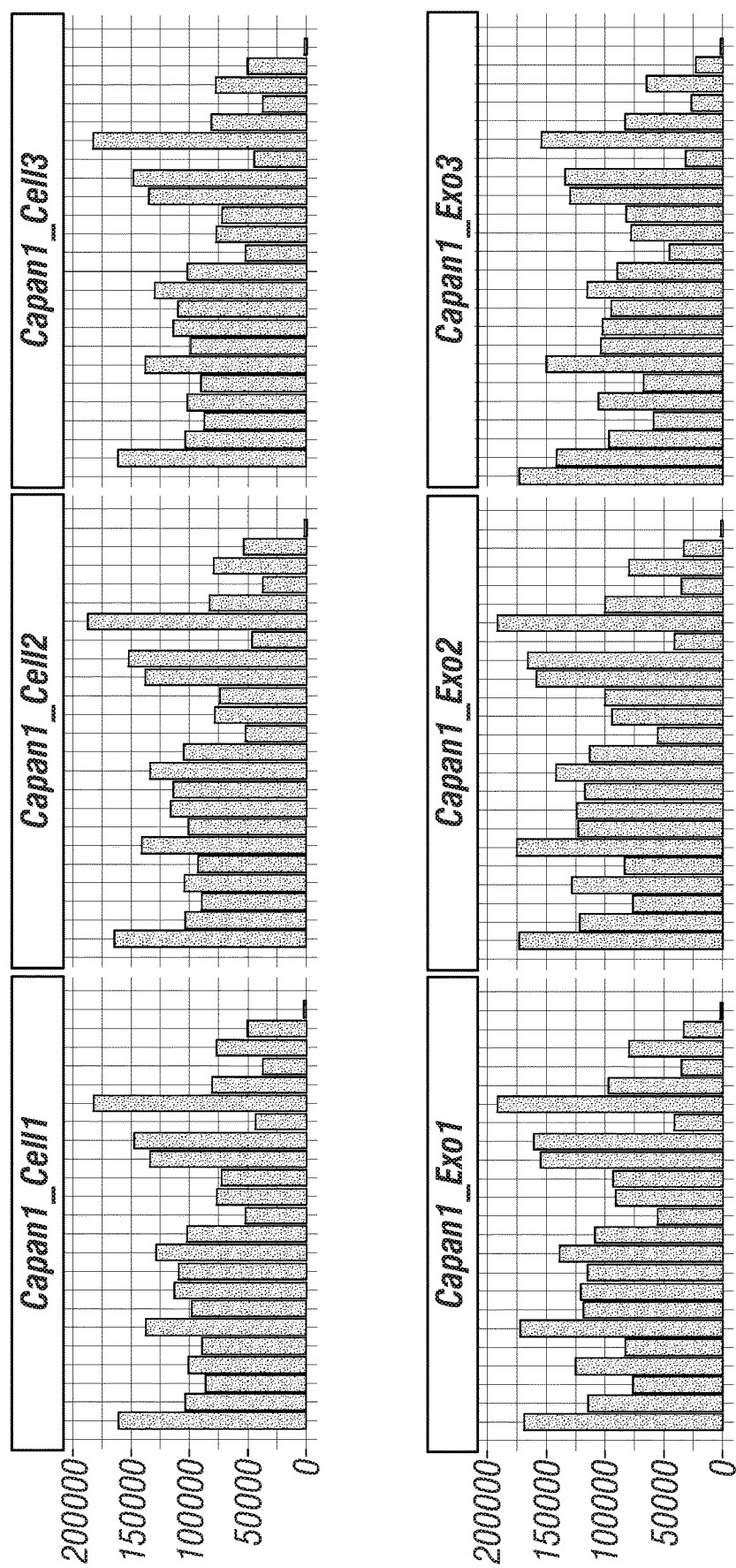
Figure 11C:
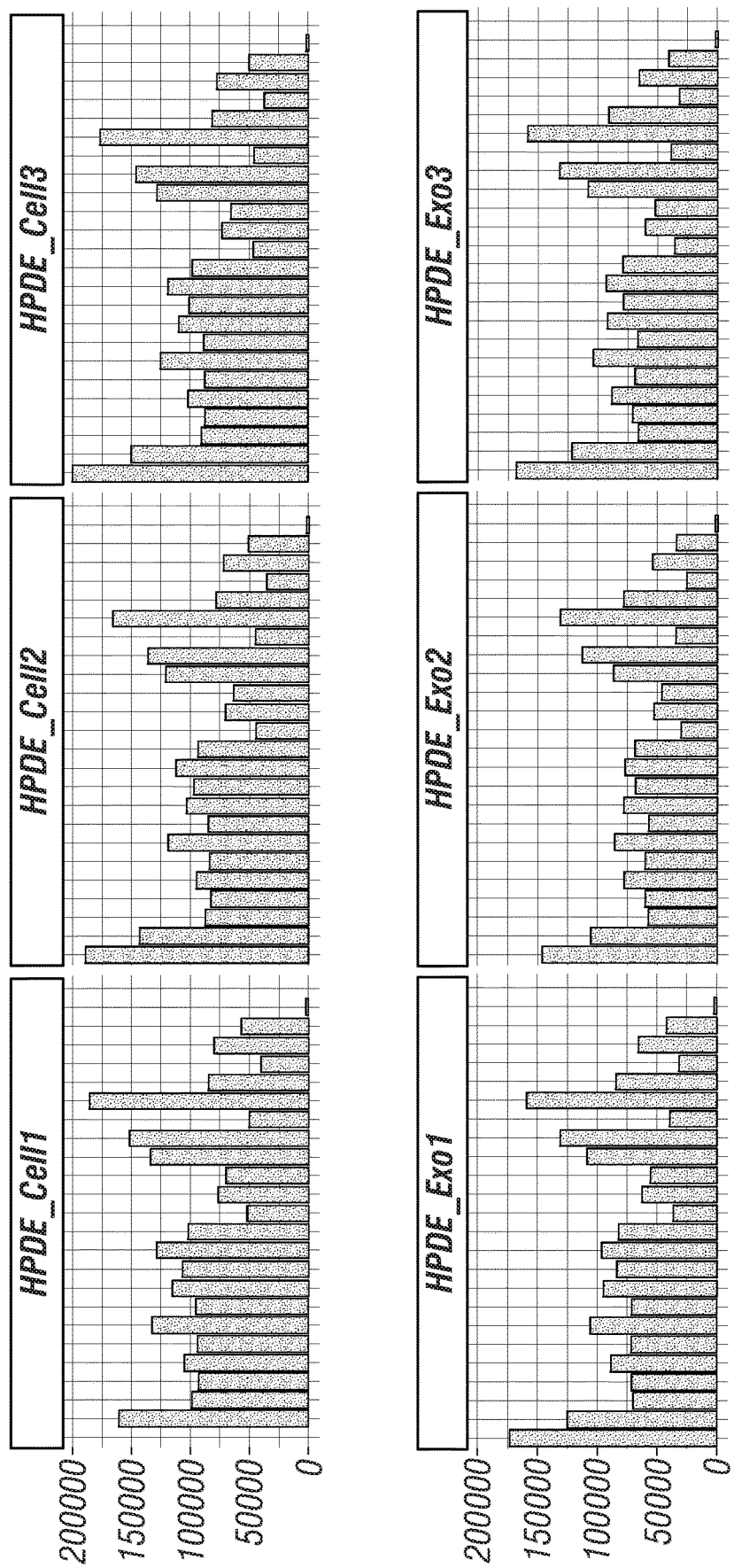
Figure 11D:
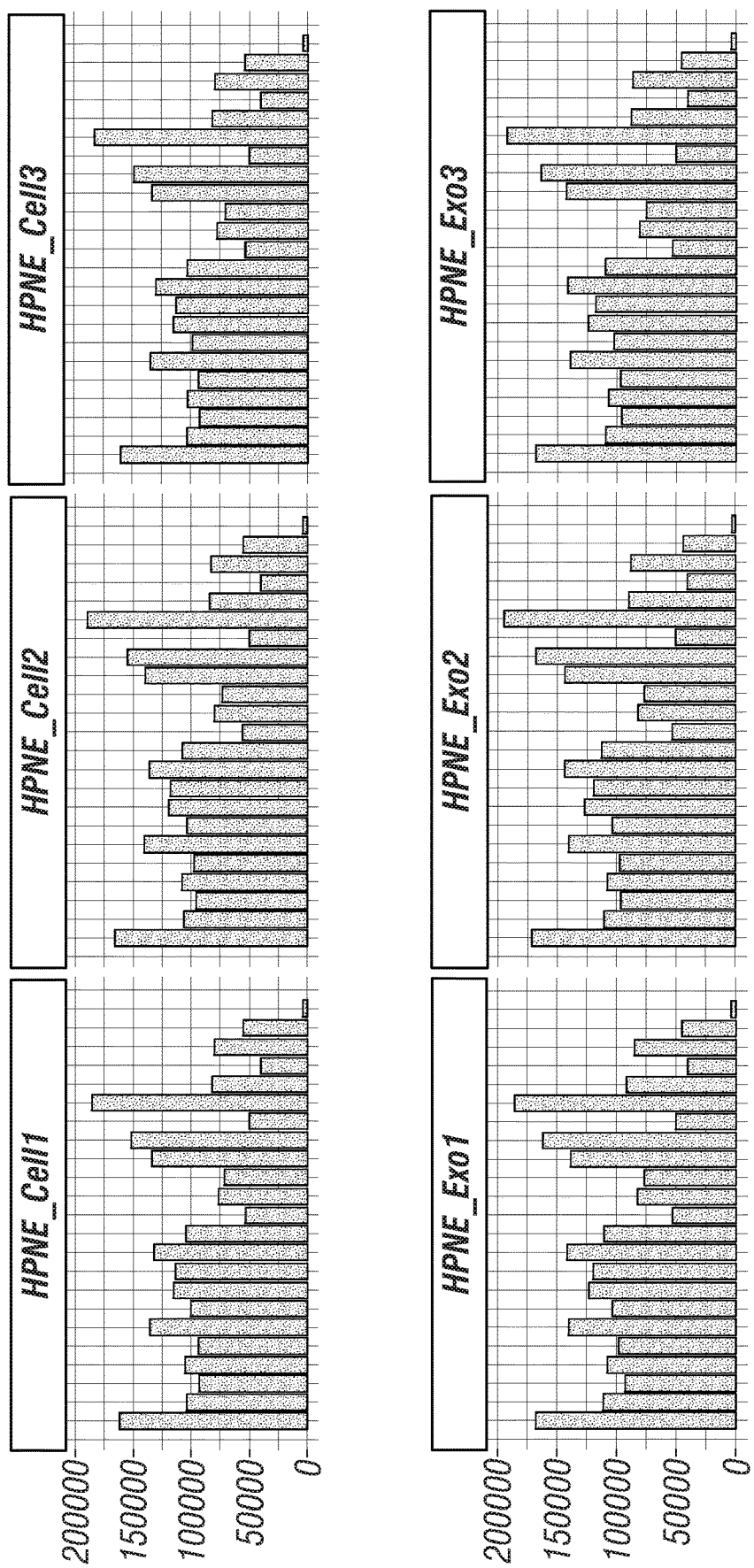
Figure 11E:
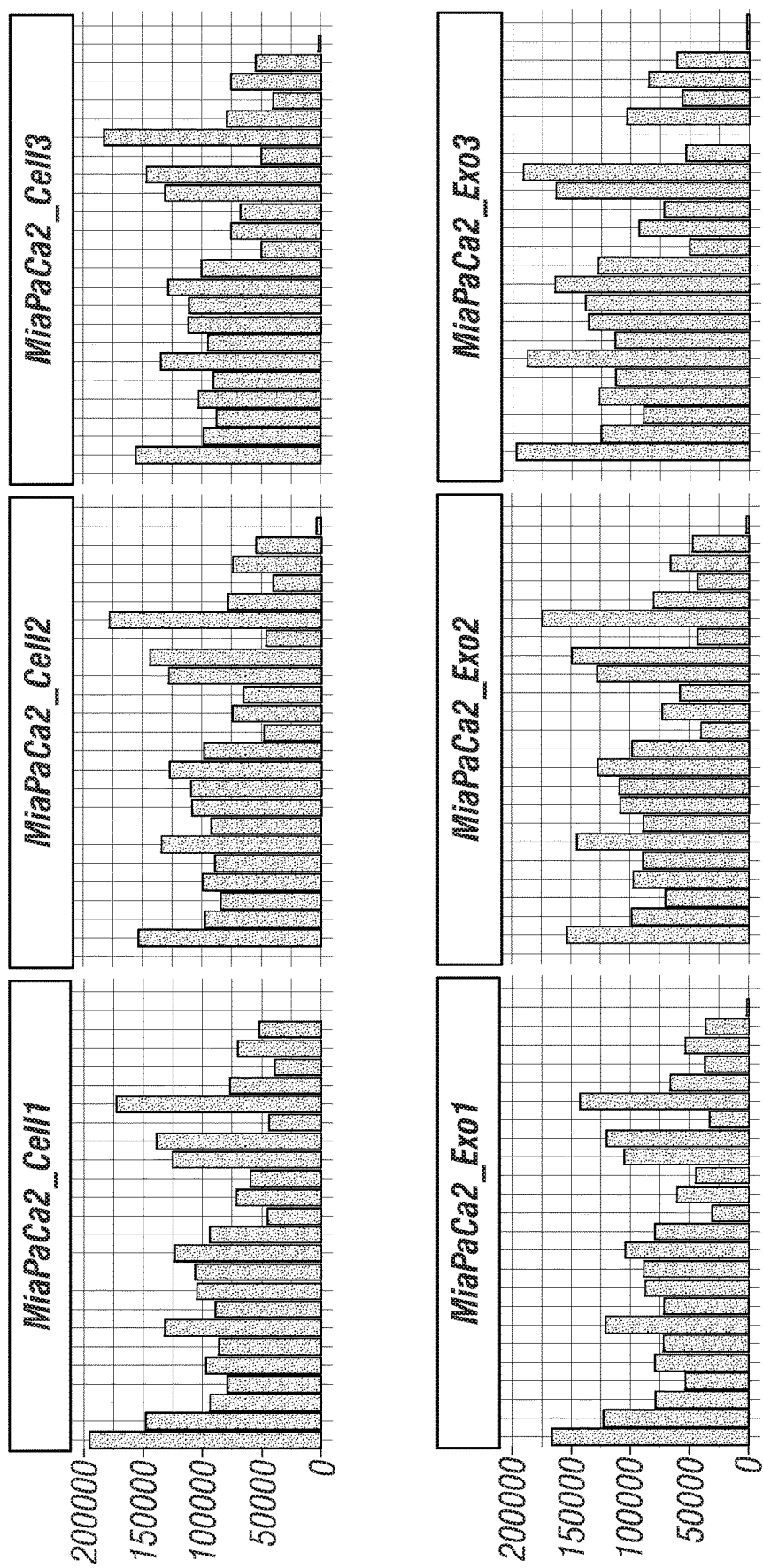
Figure 11F:
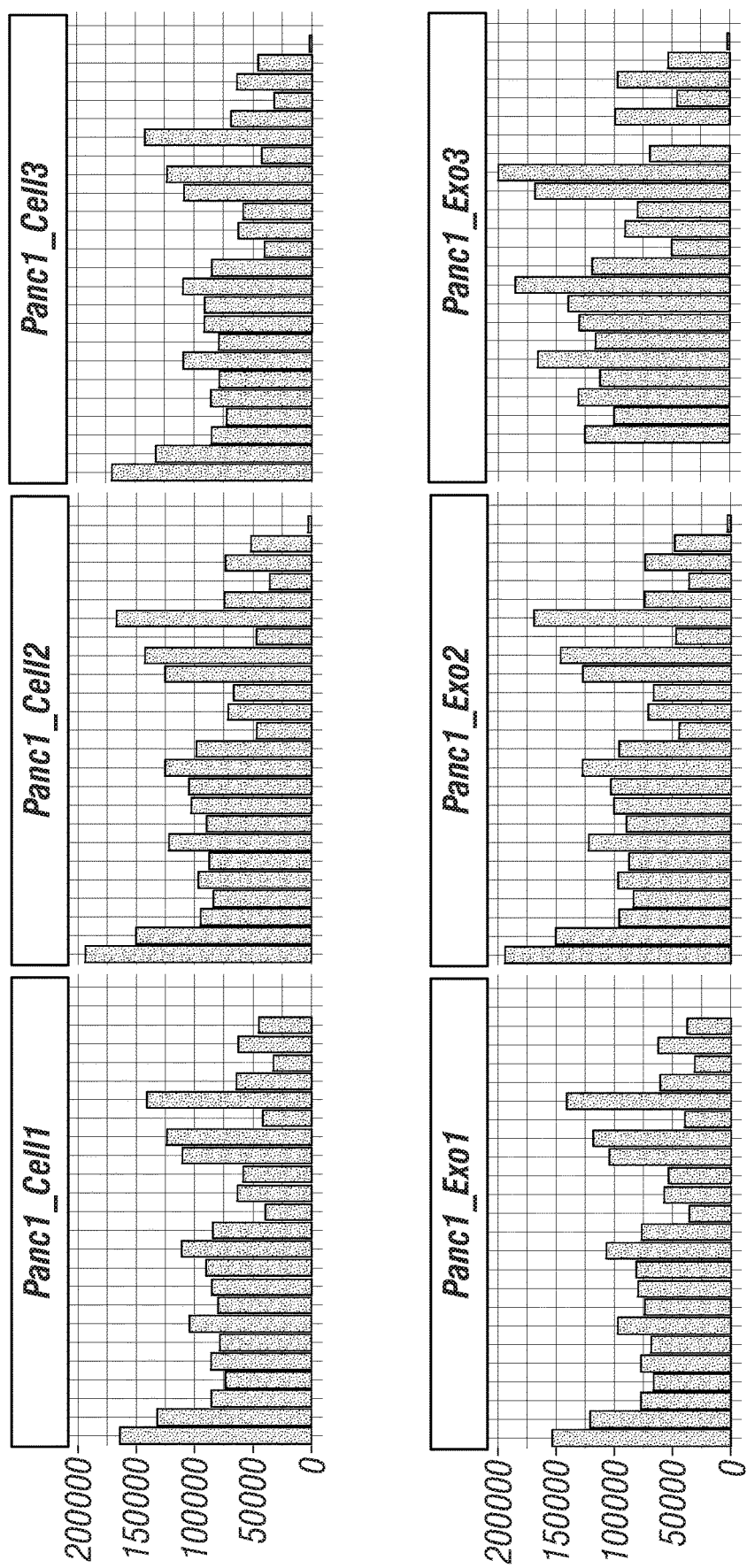
Figure 11G:
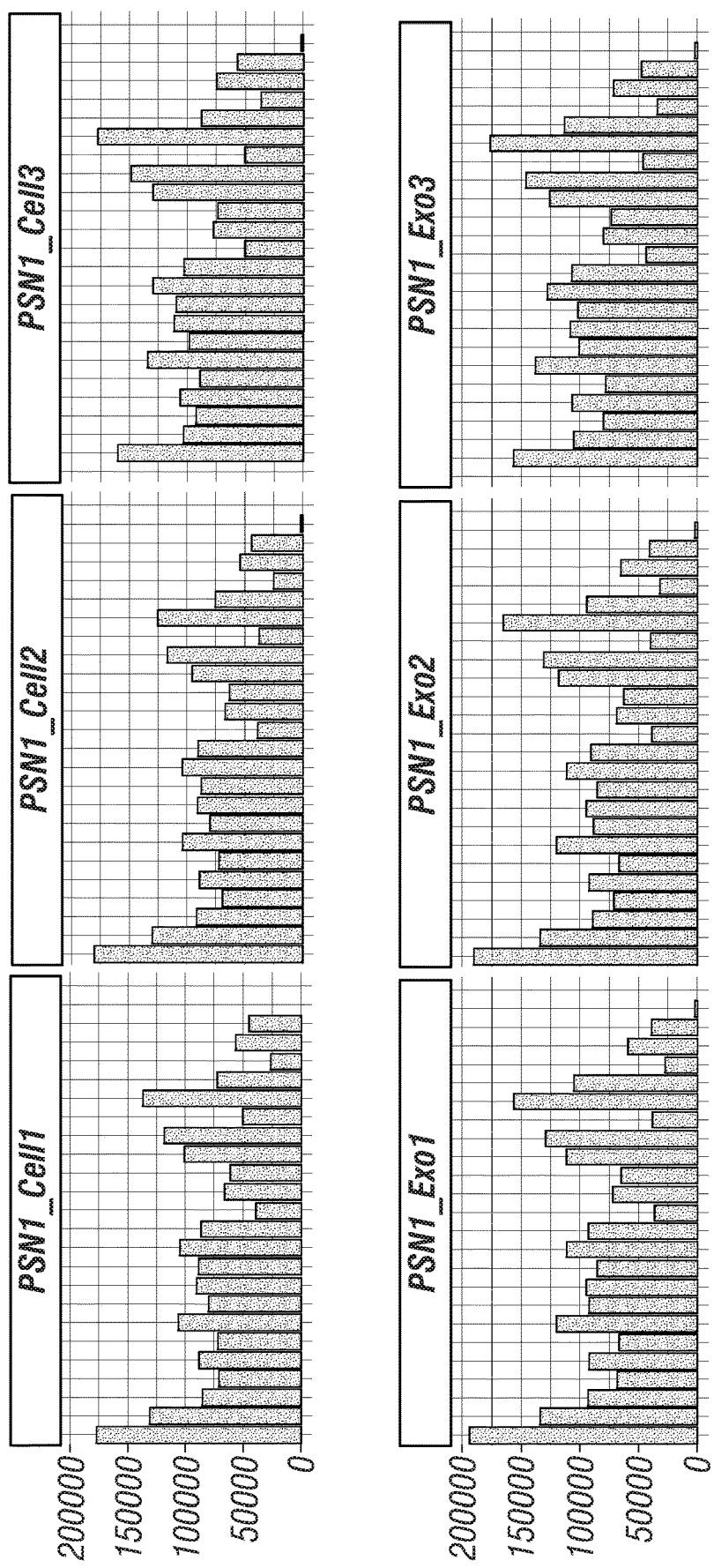
Figure 11H:
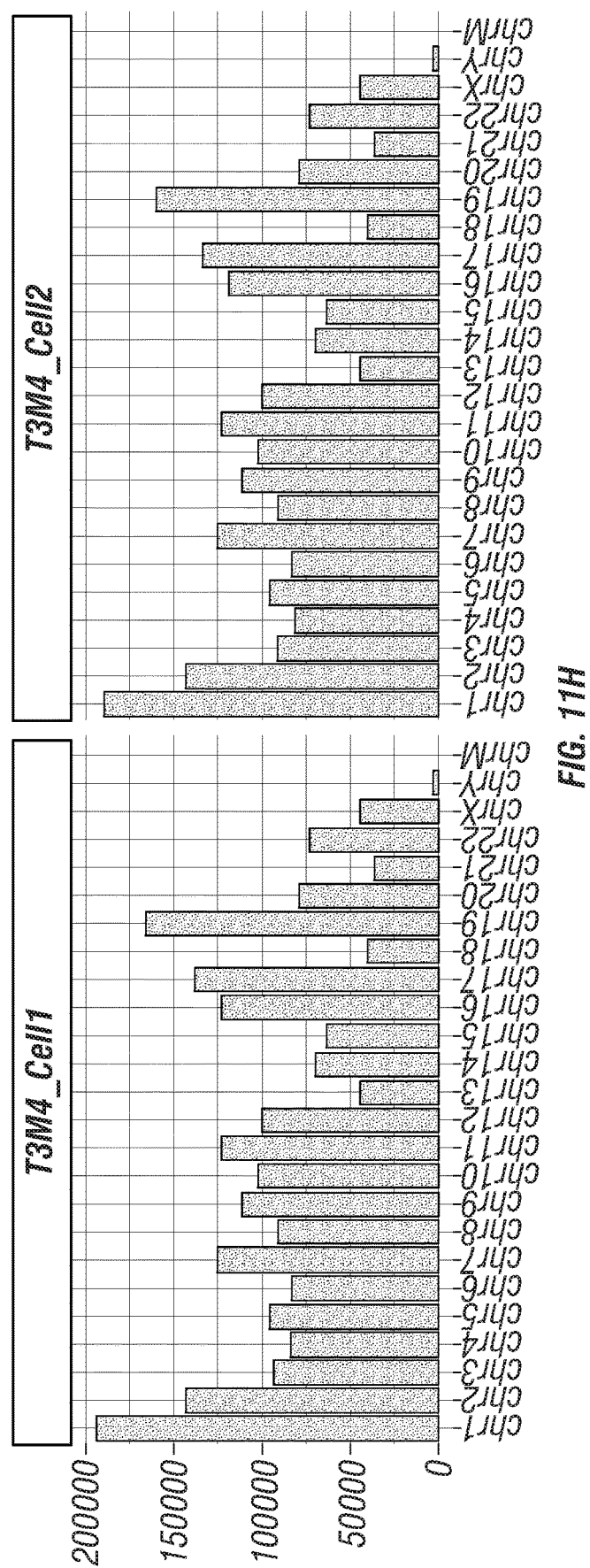
Figure 11H:
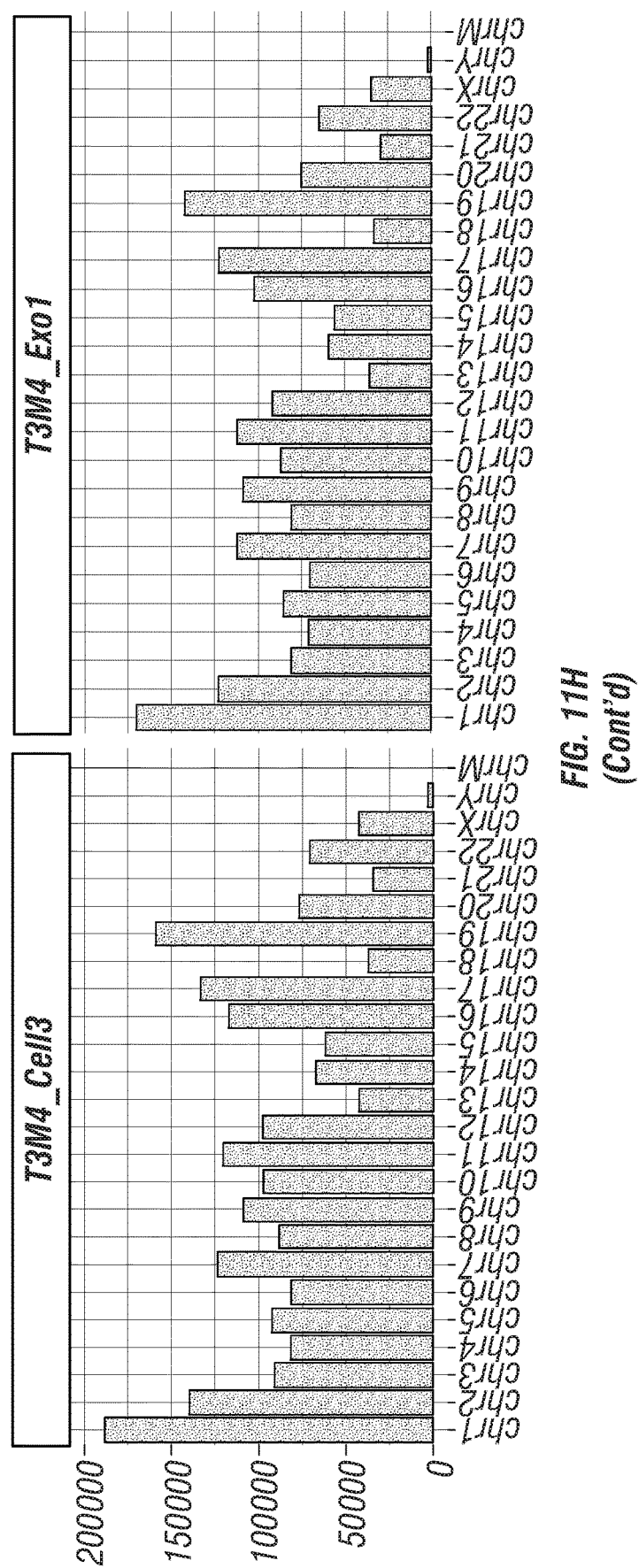
Figure 11H:
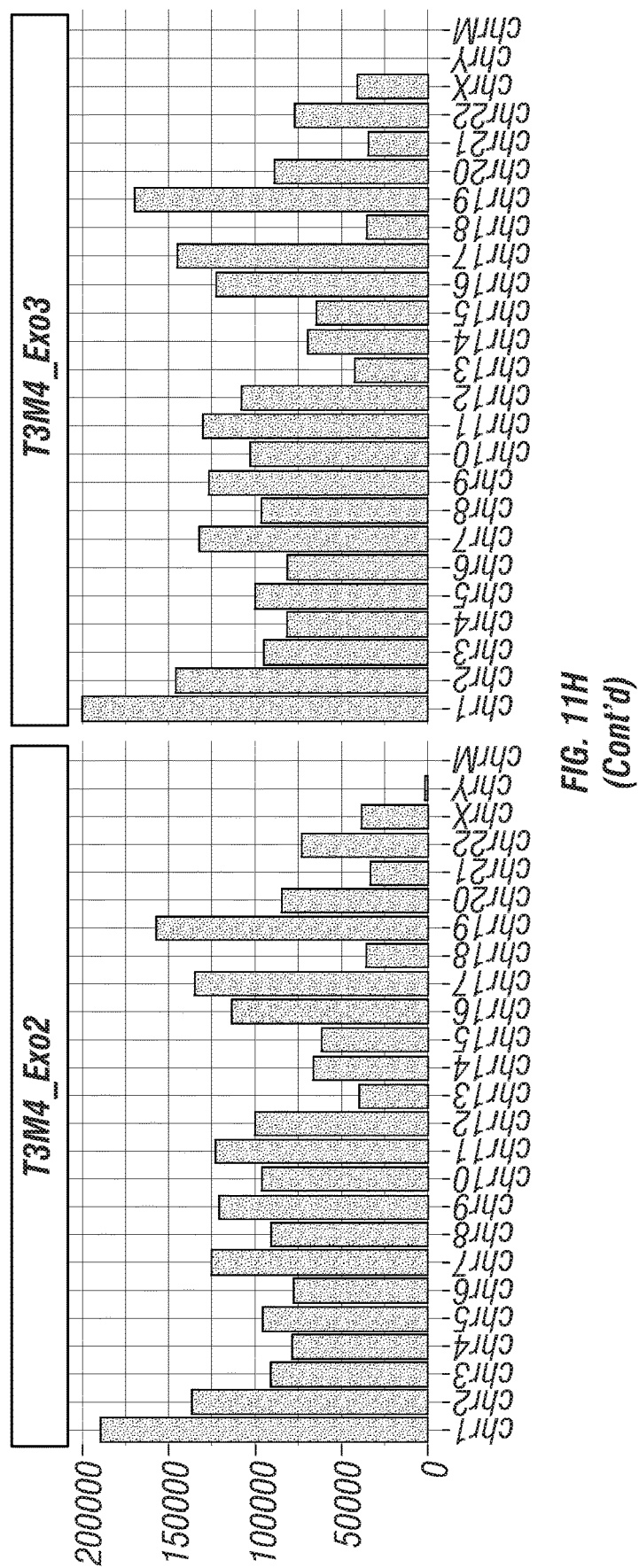

The plot provided in FIG. 10 demonstrates that the samples from each cell line from all 8 lines tested cluster together, showing that the samples do segregate by cell type, regardless of whether the DNA is from cells or exosomes. Here again it can be seen that each batch of bisulfite conversion can be slightly different, so that the Panc1 samples from the pilot study are a bit different from the other Panc replicates, but they still cluster with the cell line. For each sample, the methylation patterns demonstrate coverage over every chromosome (FIGS. 11A-H).

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

U.S. Pat. No. 4,870,287
U.S. Pat. No. 5,739,169
U.S. Pat. No. 5,760,395
U.S. Pat. No. 5,801,005
U.S. Pat. No. 5,824,311
U.S. Pat. No. 5,830,880
U.S. Pat. No. 5,846,945
Almoguera et al., Most human carcinomas of the exocrine pancreas contain mutant c-K-ras genes. *Cell*, 53:549-554, 1988.
Alvarez-Erviti et al., Delivery of siRNA to the mouse brain by systemic injection of targeted exosomes. *Nature Biotechnology*, 29:341-345, 2011.
Austin-Ward and Villaseca, Gene therapy and its applications. *Rev. Med. Chil.*, 126:838-845, 1998.
Baietti et al., Syndecan-syntenin-ALIX regulated the biogenesis of exosomes. *Nat. Cell Biol.*, 14:677-685, 2012.
Biankin et al., Pancreatic cancer genomes reveal aberrations in axon guidance pathway genes. *Nature*, 491:399-405, 2012.
Bukowski et al., Signal transduction abnormalities in T lymphocytes from patients with advanced renal carcinoma: clinical relevance and effects of cytokine therapy. *Clin. Cancer Res.*, 4:2337-2347, 1998.
Chang et al., Pancreatic cancer genomics. *Current Opinion in Genetics & Development*, 24:74-81, 2014.
Christodoulides et al., Immunization with recombinant class 1 outer-membrane protein from *Neisseria meningitidis*: influence of liposomes and adjuvants on antibody avidity, recognition of native protein and the induction of a bactericidal immune response against meningococci. *Microbiology*, 144:3027-3037, 1998.
Clayton et al., Antigen-presenting cell exosomes are protected from complement-mediated lysis by expression of CD55 and CD59. *European Journal of Immunology*, 33:522-531,2003.
Collins et al., Oncogenic Kras is required for both the initiation and maintenance of pancreatic cancer in mice. *The Journal of Clinical Investigation*, 122:639-653, 2012a.
Collins et al., Metastatic pancreatic cancer is dependent on oncogenic Kras in mice. *PLoS One*, 7:e49707, 2012b.
Combes et al., A new flow cytometry method of platelet-derived microvesicle quantitation in plasma, *Thromb. Haemost.*, 77:220, 1997.
Cooper et al., Systemic exosomal siRNA delivery reduced alpha-synuclein aggregates in brains of transgenic mice. *Movement Disorders*, 29:1476-1485, 2014.
Davidson et al., Intralesional cytokine therapy in cancer: a pilot study of GM-CSF infusion in mesothelioma. *J. Immunother.*, 21:389-398, 1998.
Du et al., A systematic analysis of the silencing effects of an active siRNA at all single-nucleotide mismatched target sites. *Nucleic Acids Research*, 33:1671-1677, 2005.
El-Andaloussi et al., Extracellular vesicles: biology and emerging therapeutic opportunities. *Nature Reviews Drug Discovery*, 12:347-357, 2013.
El-Andaloussi et al., Exosome-mediated delivery of siRNA in vitro and in vivo. *Nature Protocols*, 7:2112-2126, 2012.
Eser et al., Oncogenic KRAS signalling in pancreatic cancer. *British Journal of Cancer*, 111:817-822, 2014.
Esteller, *Nat Review Genet* 8: 286-298, 2007.
Feinberg and Fogelstein, *Nature* 301:89-92, 1983.
Gomes-da-Silva et al., Lipid-based nanoparticles for siRNA delivery in cancer therapy: paradigms and challenges. *Accounts of Chemical Research*, 45:1163-1171, 2012.
Gysin et al., Therapeutic strategies for targeting ras proteins. *Genes & Cancer*, 2:359-372, 2011.
Hanibuchi et al., Therapeutic efficacy of mouse-human chimeric anti-ganglioside GM2 monoclonal antibody against multiple organ micrometastases of human lung cancer in NK cell-depleted SCID mice. *Int. J. Cancer*, 78:480-485, 1998.
Hellstrand et al., Histamine and cytokine therapy. *Acta Oncol.*, 37:347-353, 1998.
Hingorani et al., Trp53R172H and KrasG12D cooperate to promote chromosomal instability and widely metastatic pancreatic ductal adenocarcinoma in mice. *Cancer Cell*, 7:469-483,2005.
Hollander, Immunotherapy for B-cell lymphoma: current status and prospective advances. *Front Immunol.*, 3:3, 2013.
Howlader et al., SEER Cancer Statistics Review, 1975-2011, National Cancer Institute. Bethesda, MD. On the World Wide Web at seercancergov/csr/1975_2011/, 2013.
Hruban et al., K-ras oncogene activation in adenocarcinoma of the human pancreas. A study of 82 carcinomas using a combination of mutant-enriched polymerase chain reaction analysis and allele-specific oligonucleotide hybridization. *The American Journal of Pathology*, 143:545-554, 1993.
Hui and Hashimoto, Pathways for Potentiation of Immunogenicity during Adjuvant-Assisted Immunizations with *Plasmodium falciparum* Major Merozoite Surface Protein 1. *Infec. Immun.*, 66:5329-5336, 1998.
Ji et al., Ras activity levels control the development of pancreatic diseases. *Gastroenterology*, 137:1072-1082, 82 e1-6,2009.
Johnsen et al., A comprehensive overview of exosomes as drug delivery vehicles—endogenous nanocarriers for targeted cancer therapy. *Biochimica et Biophysica Acta*, 1846:75-87, 2014.
Jones and Paylin, *Cell* 128:683-692, 2007.
Kahlert et al., Identification of Double Stranded Genomic DNA Spanning all Chromosomes with Mutated KRAS and p53 DNA in the Serum Exosomes of Patients with Pancreatic Cancer. *The Journal of biological chemistry* 2014.
Kowal et al., Biogenesis and secretion of exosomes. *Current Opinion in Cell Biology*, 29:116-125, 2014.
Luga et al., Exosomes mediate stromal mobilization of autocrine Wnt-PCP signaling in breast cancer cell migration. *Cell*, 151:1542-1556, 2012.
Ma et al., Structural basis for overhang-specific small interfering RNA recognition by the PAZ domain. *Nature*, 429:318-322, 2004.

Marcus and Leonard, FedExosomes: Engineering Therapeutic Biological Nanoparticles that Truly Deliver. *Pharmaceuticals* (Basel), 6:659-680, 2013.

Meissner et al., Reduced representation bisulfite sequencing for comparative high-resolution DNA methylation analysis. *Nuc. Acids. Res.*, 33:5868-5877, 2005.

Melo et al., Glypican-1 identifies cancer exosomes and detects early pancreatic cancer. *Nature*, 523:177-182, 2015.

Ozdemir et al., Depletion of carcinoma-associated fibroblasts and fibrosis induces immunosuppression and accelerates pancreas cancer with reduced survival. *Cancer Cell*, 25:719-734, 2014.

Pecot et al., Therapeutic Silencing of KRAS using Systemically Delivered siRNAs. *Molecular Cancer Therapeutics*, 13:2876-2885, 2014.

Peinado et al., Melanoma exosomes educate bone marrow progenitor cells toward a pro-metastatic phenotype through MET. *Nature Medicine*, 18:883-891, 2012.

Poliseno et al., A coding-independent function of gene and pseudogene mRNAs regulates tumour biology. *Nature*, 465:1033-1038, 2010.

Qin et al., Interferon-beta gene therapy inhibits tumor formation and causes regression of established tumors in immune-deficient mice. *Proc. Natl. Acad. Sci. U.S.A.*, 95:14411-14416, 1998.

Rachagani et al., Activated KrasG12D is associated with invasion and metastasis of pancreatic cancer cells through inhibition of E-cadherin. *Br. J. Cancer*, 104:1038-1048, 2011.

Rejiba et al., K-ras oncogene silencing strategy reduces tumor growth and enhances gemcitabine chemotherapy efficacy for pancreatic cancer treatment. *Cancer Science*, 98:1128-1136, 2007.

Robertson, *Nat Review Genet* 6:597-610, 2005.

Siegel et al., Cancer statistics, 2014. *CA: A cancer journal for clinicians*, 64:9-29, 2014.

Simoes et al., Cationic liposomes for gene delivery. *Expert Opinion on Drug Delivery*, 2:237-254, 2005.

Smakman et al., Dual effect of Kras(D12) knockdown on tumorigenesis: increased immune-mediated tumor clearance and abrogation of tumor malignancy. *Oncogene*, 24:8338-8342, 2005.

Sun et al., Characterization of the mutations of the K-ras, p53, p16, and SMAD4 genes in 15 human pancreatic cancer cell lines. *Oncology Reports*, 8:89-92, 2001.

Thery et al., Exosomes: composition, biogenesis and function. *Nature Reviews Immunology*, 2:569-579, 2002.

Valadi et al., Exosome-mediated transfer of mRNAs and microRNAs is a novel mechanism of genetic exchange between cells. *Nature Cell Biology*, 9:654-659, 2007.

van den Boorn et al., Exosomes as nucleic acid nanocarriers. *Advanced Drug Delivery Reviews*, 65:331-335, 2013.

van der Meel et al., Extracellular vesicles as drug delivery systems: Lessons from the liposome field. *Journal of Controlled Release*, 195:72-85, 2014.

Wahlgren et al., Plasma exosomes can deliver exogenous short interfering RNA to monocytes and lymphocytes. *Nucleic Acids Research*, 40:e130, 2012.

Xue et al., Small RNA combination therapy for lung cancer. *Proceedings of the National Academy of Sciences USA*, 111:E3553-3561, 2014.

Ying et al., Oncogenic Kras maintains pancreatic tumors through regulation of anabolic glucose metabolism. *Cell*, 149:656-670, 2012.

Yuan et al., Development of siRNA payloads to target KRAS-mutant cancer. *Cancer Discovery*, 4:1182-1197, 2014.

Zorde Khvalevsky et al., Mutant KRAS is a druggable target for pancreatic cancer. *Proceedings of the National Academy of Sciences USA*, 110:20723-20728, 2013.

The invention claimed is:

1. A method of treating a cancer in a patient, the method comprising:
   obtaining a biopsy from the patient;
   isolating exosomes from the patient biopsy;
   performing reduced representation bisulfite sequencing of DNA from the isolated exosomes for determining a global DNA methylation fingerprint of the isolated exosome DNA; and
   administering an anti-cancer therapy to the patient when the global DNA methylation fingerprint corresponds to a cancer state.

2. The method of claim 1, wherein determining the global DNA methylation fingerprint further comprises comparing the global DNA methylation fingerprint to a global DNA methylation fingerprint known to be associated with the cancer.

3. The method of claim 1, wherein the cancer comprises recurrent cancer.

4. The method of claim 1, wherein the exosomes comprise glypican 1-containing exosomes.

5. The method of claim 1, wherein the cancer comprises a breast cancer, lung cancer, head & neck cancer, prostate cancer, esophageal cancer, tracheal cancer, brain cancer, liver cancer, bladder cancer, stomach cancer, pancreatic cancer, ovarian cancer, uterine cancer, cervical cancer, testicular cancer, colon cancer, rectal cancer, or skin cancer.

6. The method of claim 1, wherein the patient is a human.

7. The method of claim 1, wherein the cancer is pancreatic cancer.

8. The method of claim 7, wherein the pancreatic cancer is a pancreatic ductal adenocarcinoma.

9. The method of claim 1, wherein the anti-cancer therapy comprises chemotherapy, immunotherapy, radiotherapy, or surgery.

* * * * *